(12) United States Patent
Blum et al.

(10) Patent No.: US 10,222,633 B2
(45) Date of Patent: Mar. 5, 2019

(54) ELECTRONIC EYEGLASSES AND METHODS OF MANUFACTURING

(71) Applicant: Mitsui Chemicals, Inc., Tokyo (JP)

(72) Inventors: Ronald D. Blum, Roanoke, VA (US); Sophie Adams, Forest, VA (US); David Boyd, Roanoke, VA (US); Richard Clompus, Roanoke, VA (US); Mark Graham, Leesburg, VA (US); Joshua Haddock, Roanoke, VA (US); Robert Hall, Roanoke, VA (US); Venki Iyer, Roanoke, VA (US); William Kokonaski, Gig Habor, WA (US); Charles Willey, Roanoke, VA (US); Yongping Wang, Philadelphia, PA (US); Claudio Dalla Longa, Valdobbiadene-TV (IT)

(73) Assignee: Mitsui Chemicals, Inc., Tokyo (JP)

( * ) Notice: Subject to any disclaimer, the term of this patent is extended or adjusted under 35 U.S.C. 154(b) by 17 days.

(21) Appl. No.: 15/226,621

(22) Filed: Aug. 2, 2016

(65) Prior Publication Data
US 2017/0031181 A1 Feb. 2, 2017

Related U.S. Application Data

(63) Continuation of application No. 13/916,480, filed on Jun. 12, 2013, now Pat. No. 9,442,305.
(Continued)

(51) Int. Cl.
*G02C 1/00* (2006.01)
*G02C 7/08* (2006.01)
(Continued)

(52) U.S. Cl.
CPC .............. *G02C 7/083* (2013.01); *B29D 12/02* (2013.01); *G02C 5/14* (2013.01); *G02C 5/143* (2013.01);
(Continued)

(58) Field of Classification Search
CPC .......... G02C 11/10; G02C 5/14; G02C 5/146; G02C 5/143
(Continued)

(56) References Cited

U.S. PATENT DOCUMENTS 3,809,829 A * 5/1974 Vignini .................. G02C 11/06
381/327
3,853,393 A * 12/1974 Fila ......................... B29D 12/02
351/111

(Continued)

FOREIGN PATENT DOCUMENTS

FR 1180905 A 6/1959
JP 56-102200 U 8/1981
(Continued)

OTHER PUBLICATIONS

International Search Report and Written Opinion in corresponding PCT/US13/45953 application, dated Dec. 23, 2015, 9 pages.
(Continued)

*Primary Examiner* — Hung Dang
(74) *Attorney, Agent, or Firm* — Sterne, Kessler, Goldstein & Fox P.L.L.C.

(57) ABSTRACT

Disclosed herein are devices and methods for the design and manufacturing of electronic eyeglasses and associated components thereof. Electronic eyeglasses consist of electroactive lenses, receiving electrical signals that turn them on and off from an electronic control module. The electronic control module is embedded within a temple of the eyeglass frame, and is powered by a removable power source pack residing at a temple tip through a flexible cable. Various methods describe the interconnection schemes between the components of the electronic eyeglasses.

19 Claims, 85 Drawing Sheets

Related U.S. Application Data

(60) Provisional application No. 61/701,395, filed on Sep. 14, 2012, provisional application No. 61/674,123, filed on Jul. 20, 2012, provisional application No. 61/670,180, filed on Jul. 11, 2012, provisional application No. 61/665,404, filed on Jun. 28, 2012, provisional application No. 61/665,394, filed on Jun. 28, 2012, provisional application No. 61/659,672, filed on Jun. 14, 2012.

(51) Int. Cl.
| | | |
|---|---|---|
| *G02C 5/22* | (2006.01) | |
| *G02C 11/00* | (2006.01) | |
| *G02C 5/14* | (2006.01) | |
| *G02C 7/10* | (2006.01) | |
| *B29D 12/02* | (2006.01) | |
| *H01R 33/945* | (2006.01) | |
| *H01R 33/955* | (2006.01) | |
| *H02J 7/00* | (2006.01) | |

(52) U.S. Cl.
CPC .............. *G02C 5/146* (2013.01); *G02C 5/22* (2013.01); *G02C 7/081* (2013.01); *G02C 7/101* (2013.01); *G02C 11/10* (2013.01); *H01R 33/945* (2013.01); *H01R 33/955* (2013.01); *H02J 7/0052* (2013.01); *G02C 2200/08* (2013.01); *H02J 2007/0062* (2013.01)

(58) Field of Classification Search
USPC ................... 351/111, 117, 158, 41; 381/327
See application file for complete search history.

(56) References Cited

U.S. PATENT DOCUMENTS

| | | | |
|---|---|---|---|
| 3,941,461 A | 3/1976 | Lambert | |
| 4,756,605 A | 7/1988 | Okada et al. | |
| 6,163,926 A | 12/2000 | Watanabe | |
| 6,168,341 B1 | 1/2001 | Chene et al. | |
| 6,879,443 B2 | 4/2005 | Spitzer | |
| 7,500,747 B2 | 3/2009 | Howell et al. | |
| 7,527,374 B2 | 5/2009 | Chou | |
| 8,801,174 B2 | 8/2014 | Willey | |
| 8,894,201 B2 | 11/2014 | Pugh et al. | |
| 9,980,810 B2 | 5/2018 | Humphreys et al. | |
| 2008/0273166 A1 | 11/2008 | Kokonaski et al. | |
| 2010/0109175 A1 | 5/2010 | Pugh et al. | |
| 2010/0177277 A1 | 7/2010 | Kokonaski et al. | |
| 2012/0075578 A1 | 3/2012 | Matsui | |
| 2012/0287397 A1 | 11/2012 | Sone et al. | |
| 2013/0215376 A1 | 8/2013 | Guo et al. | |
| 2013/0258275 A1 | 10/2013 | Toner et al. | |

FOREIGN PATENT DOCUMENTS

| | | |
|---|---|---|
| JP | S56-152497 U | 8/1981 |
| JP | S61-177428 A | 8/1986 |
| JP | H07-306386 A | 11/1995 |
| JP | 2000-513424 A | 10/2000 |
| JP | 2009-523263 A | 6/2009 |
| JP | 2009-237450 A | 10/2009 |
| JP | 2011-516927 | 5/2011 |
| WO | WO97-9735085 A1 | 9/1997 |
| WO | WO 2001-035159 A1 | 5/2001 |
| WO | WO 2009/081542 A1 | 7/2009 |
| WO | WO 2010/080999 A1 | 7/2010 |
| WO | WO 2011/050166 A2 | 4/2011 |
| WO | WO 2012/036638 A1 | 3/2012 |

OTHER PUBLICATIONS

Office Action with English language translation issued in Japanese Patent Application No. 2017-141124 dated May 22, 2018.
Office Action with English language translation issued in Japanese Patent Application No. 2017-141126 dated May 22, 2018.
Office Action dated May 14, 2018, in U.S. Appl. No. 15/341,764, Blum et al., filed Nov. 2, 2016.
Office Action dated Jun. 13, 2018, in U.S. Appl. No. 15/391,406, Blum et al., filed Dec. 27, 2016.
Japanese Office Action dated May 15, 2018 in corresponding Japanese Patent Application 2017-141125.
Office Action dated Jan. 8, 2019, in U.S. Appl. No. 15/391,406, Blum et al., filed Dec. 27, 2016.

* cited by examiner

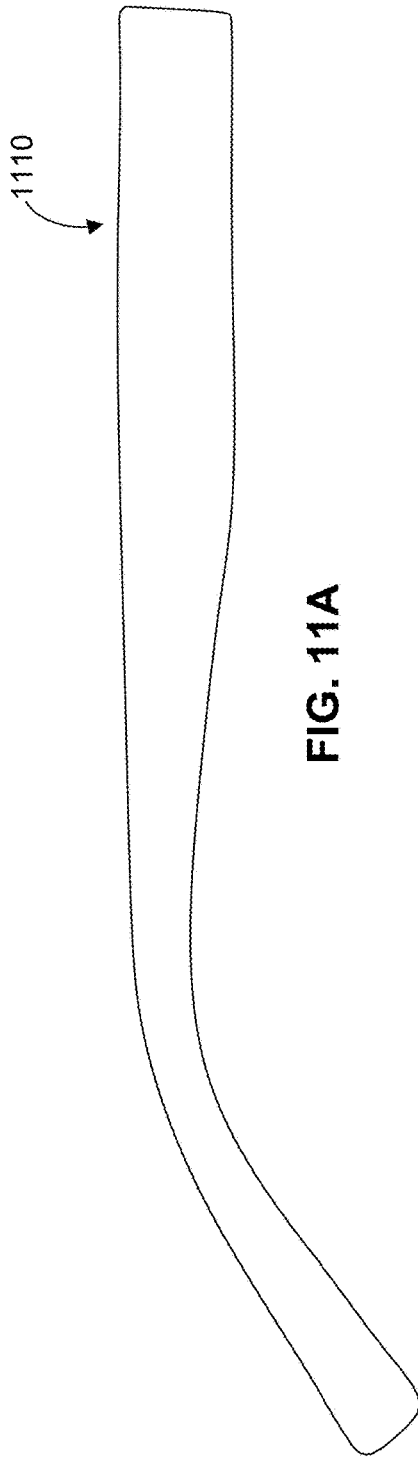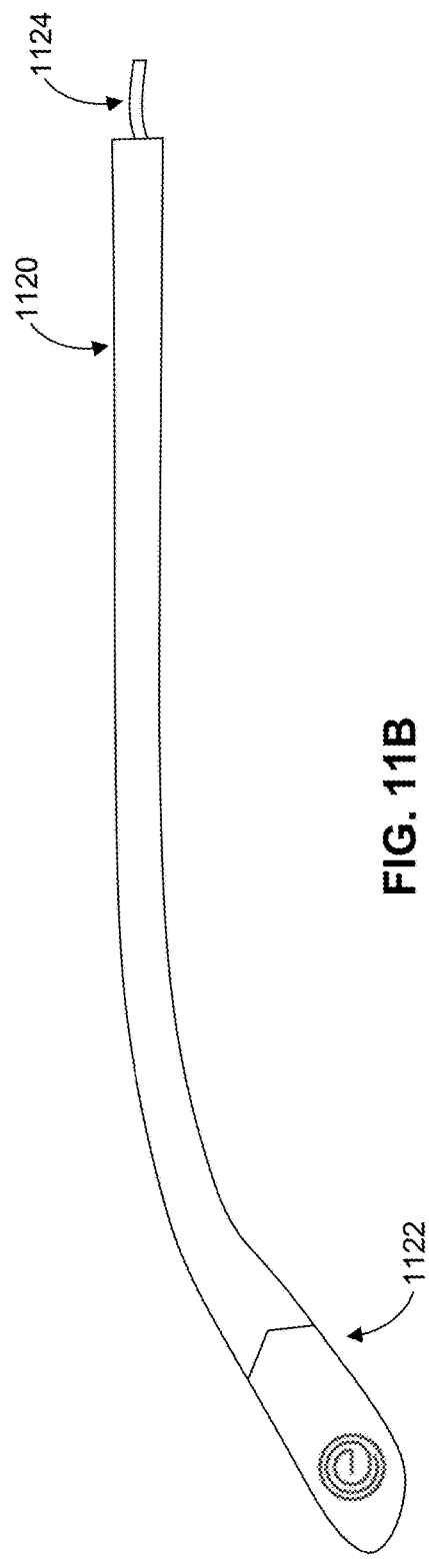
FIG. 11A
FIG. 11B

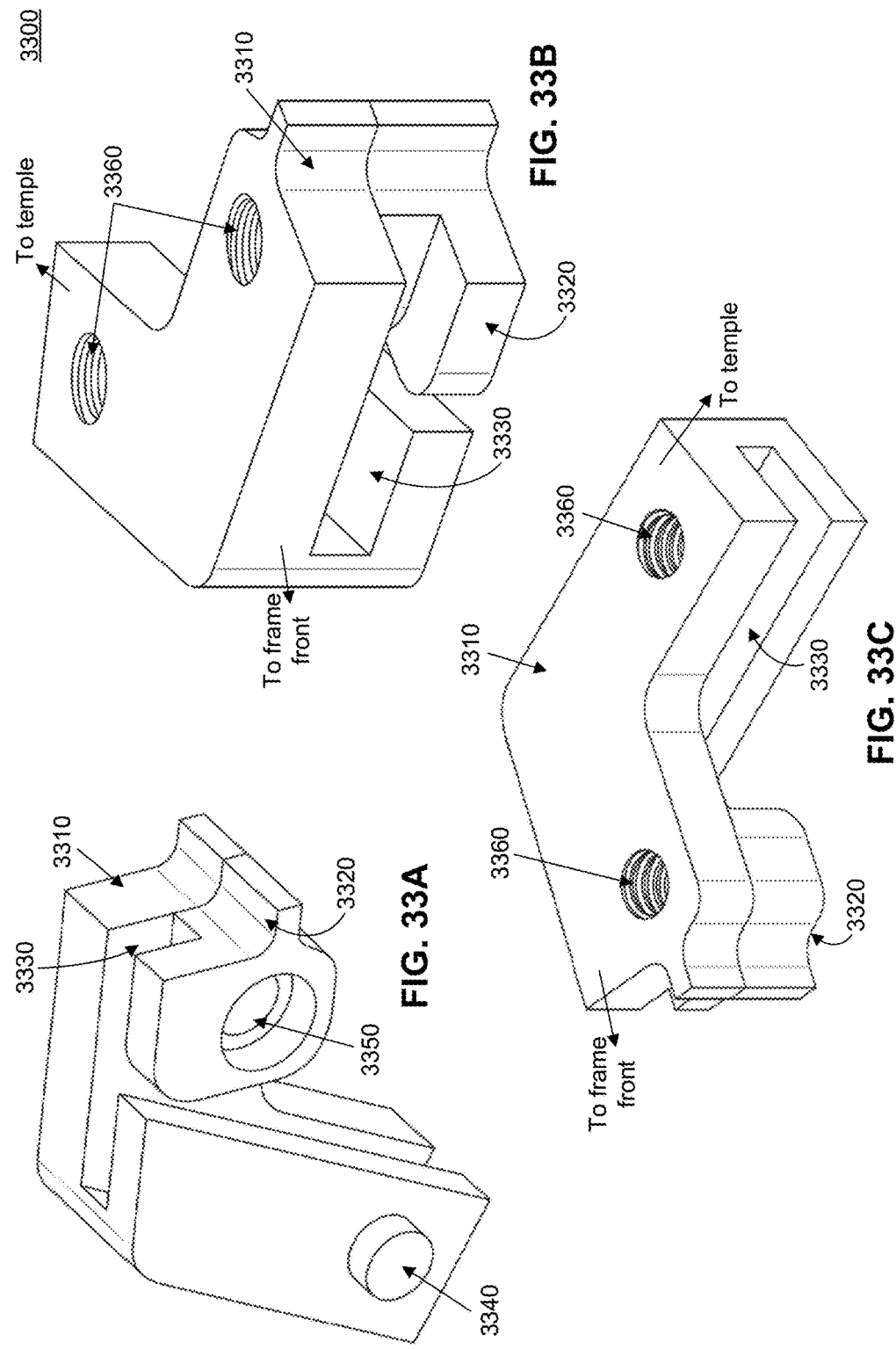

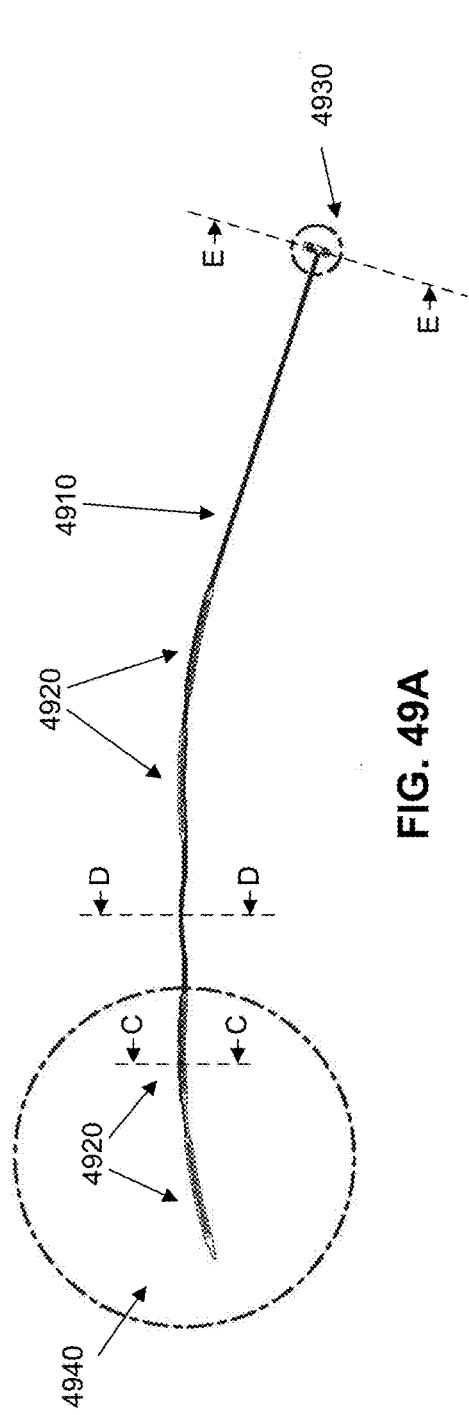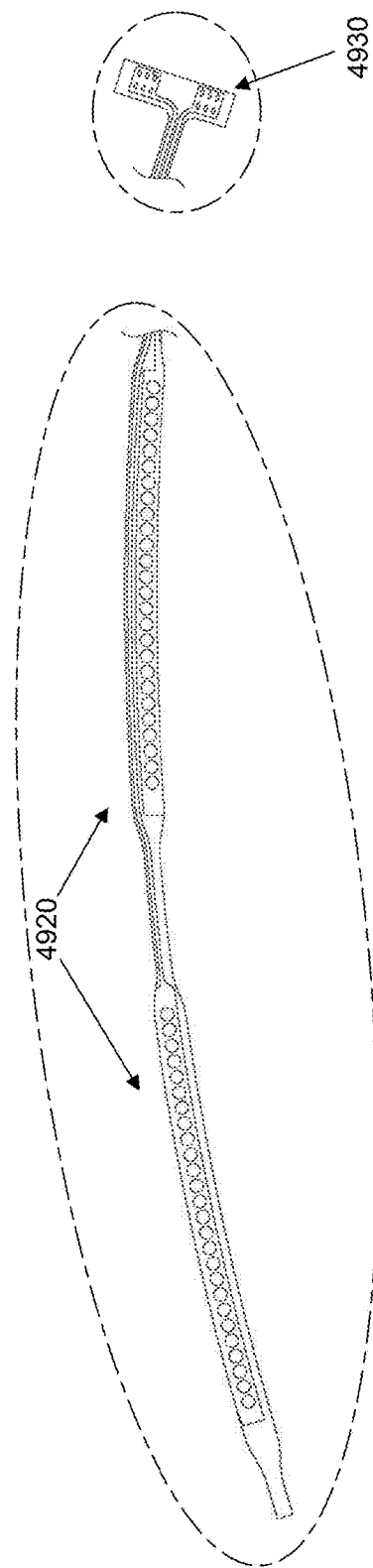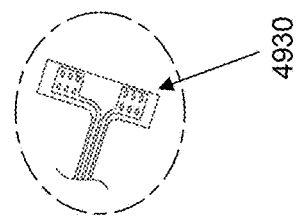

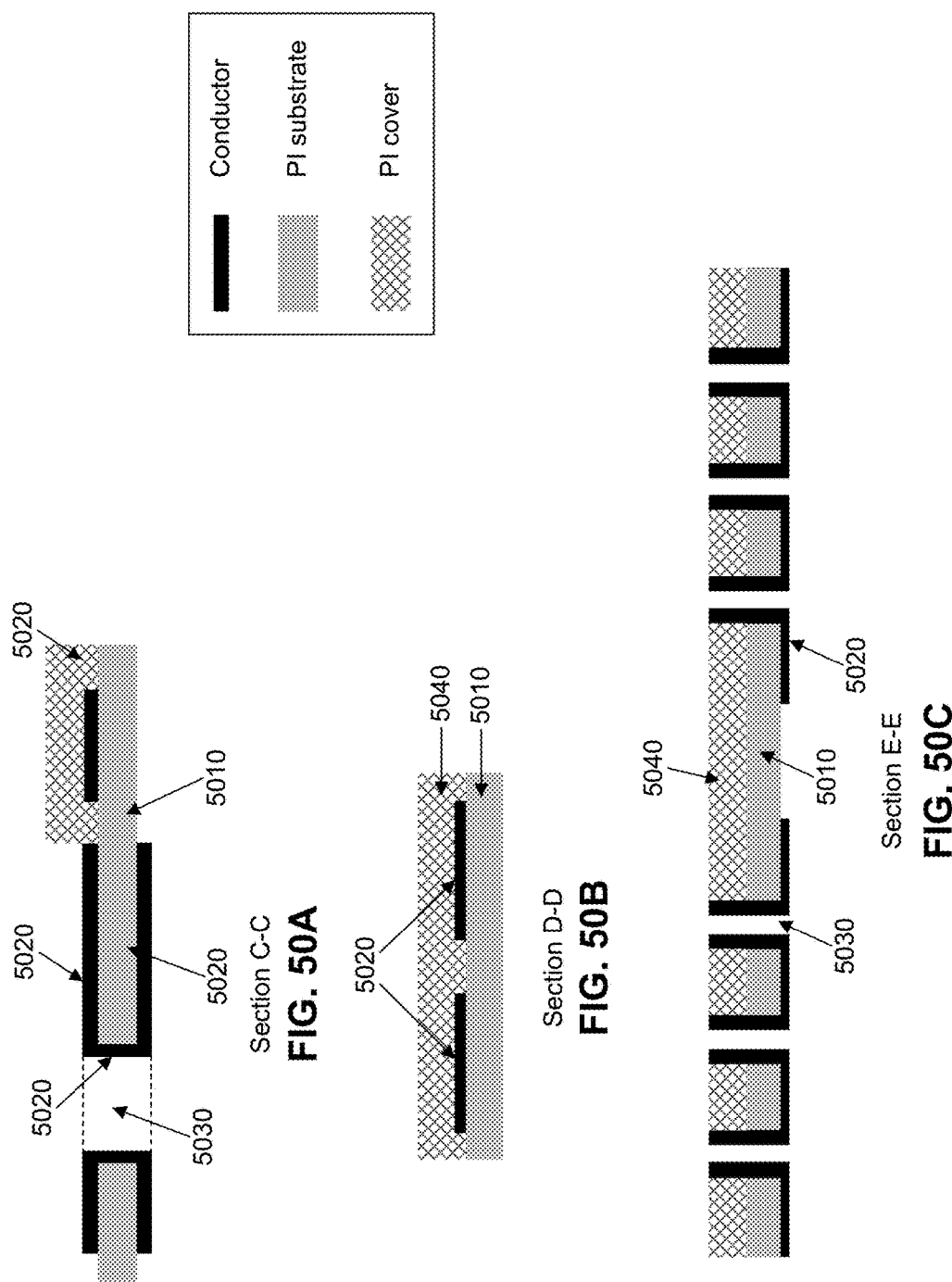

ELECTRONIC EYEGLASSES AND METHODS OF MANUFACTURING

CROSS-REFERENCE TO RELATED APPLICATIONS

The following non-provisional and provisional applications are incorporated herein by reference in their entirety:
U.S. application Ser. No. 13/916,480, filed on Jun. 12, 2013; now U.S. Pat. No. 9,442,305;
  U.S. Appl. No. 61/659,672, filed on Jun. 14, 2012;
  U.S. Appl. No. 61/665,394, filed on Jun. 28, 2012;
  U.S. Appl. No. 61/665,404, filed on Jun. 28, 2012;
  U.S. Appl. No. 61/670,180, filed on Jul. 11, 2012;
  U.S. Appl. No. 61/674,123, filed on Jul. 20, 2012; and
  U.S. Appl. No. 61/701,395, filed on Sep. 14, 2012;

FIELD OF THE INVENTION

The present invention generally relates to electronic eyeglasses. More specifically, the present invention provides electronic apparatuses, eyeglass frame apparatuses and methods of manufacturing combinations and sub-combinations thereof, for assembling electronic eyeglasses compatible with any frame type, style, or size.

BACKGROUND

Electro-active lenses generally provide a region of adjustable optical power by changing the refractive index of an electro-active material (e.g., a liquid crystal material) by the application and removal of electrical power. Conventional electro-active lenses and spectacles fail to provide cosmetically acceptable and practical mechanisms for: (a) providing electrical connectivity between controlling electronics and the electro-active lenses, (b) recharging the electro-active lenses, and (c) reducing the weight of components thereof to improve the comfort of the wearer's experience.

Accordingly, what is needed are light-weight, integrated electronic apparatuses for connecting to and controlling electro-active lenses that can be housed in any type of frame in a cosmetically acceptable and easily implantable manner. Furthermore, convenient power charging devices are also needed.

SUMMARY

A device is provided. The device has a hinge for an eyeglass frame adapted to rotatably attach a temple to a frame front. The hinge has an axis of rotation. The hinge has a top rotatable connection. The top rotatable connection has a first top part rotatably connected to a second top part, rotatable around the axis of rotation. The hinge also has a bottom rotatable connection. The bottom rotatable connection has a first bottom part rotatably connected to a second bottom part, rotatable around the axis of rotation. A gap is disposed along the axis of rotation and between the top rotatable connection and the bottom rotatable connection. An electrical conductor runs through the gap.

In one embodiment, the first top part and the second top part are rotatably connected by a first screw, while the first bottom part and the second bottom part are rotatably connected by a second screw. The second screw has opposite handed threads relative to the first screw.

In one embodiment, the first bottom part has a pin and the second bottom part has a hole, such that the pin rotatably fits into the hole. In another embodiment, the first top part has a pin and the second top part has a hole such that the pin rotatably fits into the hole.

In one embodiment, the device is an eyeglass frame. The eyeglass frame has a temple and a frame front rotatably connected to each other by the hinge. The hinge has an open position, corresponding to a position of the frame front and the temple when a pair of eyeglasses is worn by user, and a closed position, corresponding to a position of the frame front and the temple when a pair of eyeglasses is folded. For the open position, the closed position, and all rotational positions in between, there is a path for the electrical conductor to run from the temple to the frame front through an axis of rotation of the hinge in the gap.

In one embodiment, the first top part and the second bottom part are rigidly connected to each other and to the frame front. The second top part and the second bottom part are rigidly connected to each other and to the temple.

In one embodiment, the electrical conductor crosses the gap in an orientation within 10° of perpendicular to the axis of rotation of the hinge.

In one embodiment, the electrical conductor is a wire. In another example, the electrical conductor is a flex cable. In one embodiment, the electrical conductor, wire or flex cable has a service loop.

In one embodiment, the eyeglass frame has a lens supported by the frame front

The lens has a first electrical component and a second electrical component, also supported by the temple. The electrical component may be housed within the temple, or attached to the temple.

In one embodiment, the electrical conductor provides a conducting path between the first electrical component and the second electrical component. By doing so, it provides an electrical signal to the first electrical component of the lens.

In one embodiment, the first electrical component has electrical contacts disposed along a top edge of the lens.

In one embodiment, the second electrical component has an electronic control module coupled to a power source.

In one embodiment, the lens is an electronic lens.

In one embodiment, the eyeglass frame includes a rim-lock. The rim-lock has a first rim-lock part coupled to a lower portion of the frame-front, and a second rim-lock part coupled to an upper portion of the frame front. The first rim-lock part is integrably connected to the first top part and the first bottom part of the hinge.

In one embodiment, a device is provided. The device includes a first eyeglass lens having a top edge and a first electrical contact disposed along the top edge of the first lens. The first electrical contact is electrically connected to a first conductive path within the first lens. The device also has a second electrical contact disposed along the top edge of the first lens. The second electrical contact is electrically connected to a second conductive path within the first lens.

In one embodiment, the first and second conductive paths are within 10° of being parallel to each other and within 10° of being perpendicular to a horizontal.

In an embodiment, the first conductive path is located between 8 and 15 mm to a first side of a fitting point of the lens, and the second conductive path is located between 8 and 15 mm to a second side of a fitting point of the lens.

In one embodiment, the angle between the first and second conductive paths is between 10° and 30° with respect to a vertical line.

In one embodiment, the first and second conductive paths extend from the top edge towards a center of the lens.

In one embodiment, the device is an eyeglass lens.

In one embodiment, the device is an eyeglass. The eyeglass has a frame front, and a first temple rotatably attached to the frame front. The eyeglass also has a second temple rotatably attached to the frame front. The first lens is supported by the frame front and a second lens, which has a top edge, and is also supported by the frame front. The second lens further includes a third electrical contact disposed along the top edge of the second lens. The third electrical contact is electrically connected to a third conductive path within the second lens. The second lens has a fourth electrical contact disposed along the top edge of the second lens. The fourth electrical contact is electrically connected to a fourth conductive path within the second lens.

In one embodiment, the eyeglass includes electronics housed in or on the first temple. The eyeglass also includes a first conductive path between the electronics and the first electrical contact, and a second conductive path between the electronics and the second electrical contact.

In one embodiment, the first conductive path is between the electronics, the first electrical contact, and the third electrical contact. The second conductive path is between the electronics, the second electrical contact, and the fourth electrical contact.

In one embodiment, the first and second conductive paths are provided by discrete lines in a flex cable. In one embodiment, the flex cable further comprises first, second, third, and fourth tabs adapted to electrically connect to the first, second, third, and fourth contacts, respectively. In one embodiment, the first and second conductive paths are provided by a first wire and a second wire.

In one embodiment, the device is an eyeglass and the first and second lenses are electronic lenses.

In one embodiment, a method for connecting an electrical cable to electrical connectors is provided. The method includes providing a first electrical cable having a first exposed conductive region, a frame front having a cavity, and a first lens having a first electrical contact on an edge of the first lens. The method includes placing the first electrical cable in the cavity, and placing the edge of the lens in the cavity so that that the first electrical contact and the first exposed conductive region are in proximity. A first portion of a conductive sealant is applied to couple the first electrical contact to the first exposed conductive region.

In one embodiment, coupling the first electrical contact to the first exposed conductive region involves sealing and electrically and mechanically connecting the first electrical contact to the first exposed conductive region.

In one embodiment, the first electrical cable has a second exposed conductive region. It also has a first tab that contains the first exposed region and a second tab that contains the second exposed region In one embodiment, the first and second tabs are through-holes.

In one embodiment, the first lens is supported by the frame front.

In one embodiment, a second lens having a second electrical contact on an edge of the second lens is also supported by the frame front.

In one embodiment, the method further includes applying a second portion of a conductive sealant to couple the second electrical contact to the second exposed region.

In one embodiment, the first portion of the conductive sealant is applied through holes in the frame prior to placing the first lens in the cavity.

In one embodiment, the first portion of the conductive sealant is applied through holes in the frame front after placing the first lens in the cavity.

In one embodiment, the conductive sealant is a conductive caulk

In one embodiment, the method further includes curing the conductive sealant.

In one embodiment, the method further includes the steps of applying and curing a primer to the first electrical contact prior to applying the conductive sealant. In one embodiment, the method further includes applying a conductive paint to the first electrical contact after applying the primer and before applying the conductive sealant.

In one embodiment, the primer is a similar material to the material of the electrical contact.

In one embodiment, the electrical cable is a flex cable.

In one embodiment, the first lens is an electronic lens.

In one embodiment, a device which has an integrated electronics assembly is provided. The integrated electronics assembly includes an electronic control module and a first conducting link adapted to couple the electronic control module to a connector adapted to connect to a power source. The integrated electronics assembly also includes a second conducting link coupled to the electronic control module. The second conducting link has an insulating material and a first and a second exposed conductive regions in the insulating material.

In one embodiment, the first and second conducting links are integrably attached to the electronic control module In one embodiment, the first and second conducting links are flex cables. In one embodiment, the first and second conducting links are placed between first and second insulating layers in flex cables.

In one embodiment, the first conducting link has a conducting tube encased by an insulating material, a first electrical connector coupled to the power source, and a second electrical connector coupled to the electronic control module. The electronic control module is integrably attached to a flex cable.

In one embodiment, the first conducting link, the electronic control module, and the second conducting link are made of high temperature resistant materials In one embodiment, the power source includes one or more power source devices In one embodiment, the electronic control module is powered by the power source.

In one embodiment, the device is configured to be integrated into a pair of eyeglasses In one embodiment, the device is a pair of eyeglasses. In one embodiment, the eyeglasses have a temple configured to house the power source, a frame front rotatably attached to the temple by a hinge, and a lens. The lens has a plurality of electrical connectors disposed along a top edge of the lens.

In one embodiment, the first conducting link runs through the temple and couples the power source to the electronic control module.

In one embodiment, the second conducting link runs through the temple and the frame front and couples the electronic control module to the plurality of electrical connectors of the lens. The second conducting link may provide a plurality of electrical signals to the lens.

In one embodiment, the first and second conducting links have respective first and second service loops.

In one embodiment, the first conducting link, the electronic control module and the second conducting link are injection molded into the temple during manufacturing of the temple.

In one embodiment, the power source is removable and rechargeable.

In one embodiment, he lens is an electronic lens.

In one embodiment, the integrated electronics assembly is sealed inside a cavity of the temple with a cover. According to various embodiments, the cover is snap-fit into the cavity of the temple, ultrasonically welded onto the temple, laser welded onto the temple, or glued onto the temple.

A process is provided. A spectacle lens substrate is provided. The spectacle lens substrate has at least one internal electrode. The spectacle lens substrate is edged to expose an end of the at least one internal electrode. After edging, excess non-conductive material is removed from the end of the at least one internal electrode using a laser source In one embodiment, the laser source is a pulsed laser source.

In one embodiment, edging the spectacle lens involves forming the spectacle lens into a shape to fit a spectacle lens frame. The spectacle lens may be mounted into the spectacle lens frame after removing excess non-conductive material.

In one embodiment, edging the spectacle lens involves using at least one tool from the group consisting of cutting tools and grinding tools.

In one embodiment, removing excess non-conductive material includes focusing the pulsed laser source onto a spot size of approximately 200 micrometers, over the end of the at least one electrode In one embodiment, a groove is formed on the edge of the spectacle lens during edging.

In one embodiment, removing excess non-conductive material includes rasterizing a beam of the pulsed laser source into a raster pattern. In one embodiment, removing excess non-conductive material further includes using the raster pattern to conduct overlapping passes parallel to a groove present along an edge of the spectacle lens.

In various embodiments, removing excess non-conductive material includes using a pulsed excimer laser source, a pulsed carbon dioxide laser source, a pulsed nitrogen laser or a pulsed neodymium-based laser source.

In one embodiment, the method further includes the steps of applying a conductive material to an edge of the spectacle lens. The application of conductive material involves applying an electrically-conductive primer, an electrically-conductive paint, electrically-conductive adhesives, or an electrically-conductive sealant.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIGS. 11A and 11B illustrate temples for electronic eyeglasses.

FIGS. 33A, 33B and 33C illustrate a rim-lock coupling a temple to a frame front in accordance with an aspect of the present invention.

Figure 36A:
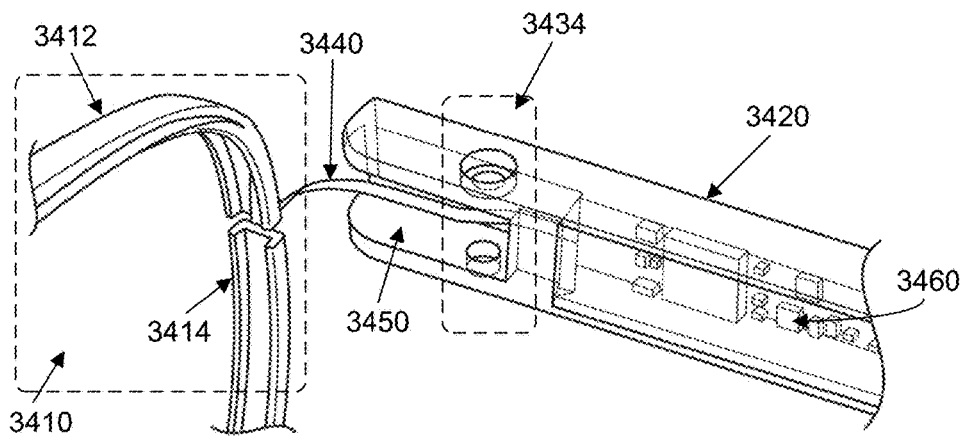
Figure 36B:
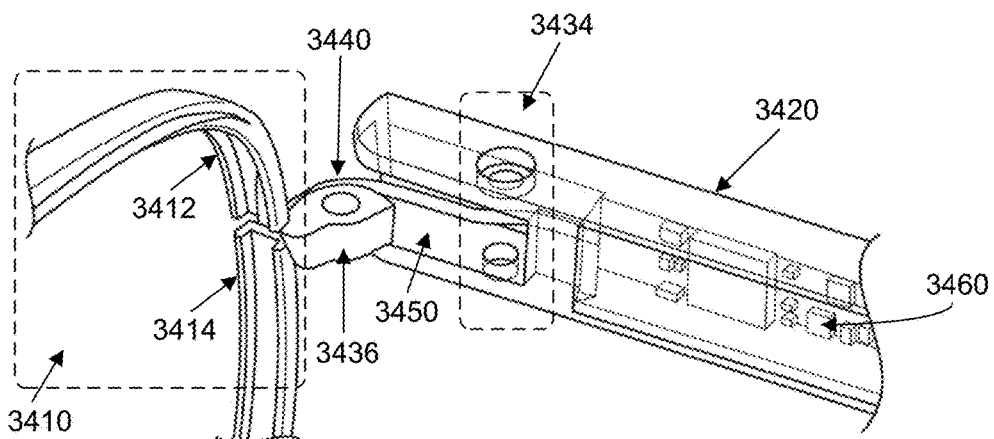

FIGS. 36A, 36B, and 36 C illustrate various orthogonal views of a hinge and rim-lock assembly coupling a temple to a frame front in accordance with an aspect of the present invention.

Figure 36C:
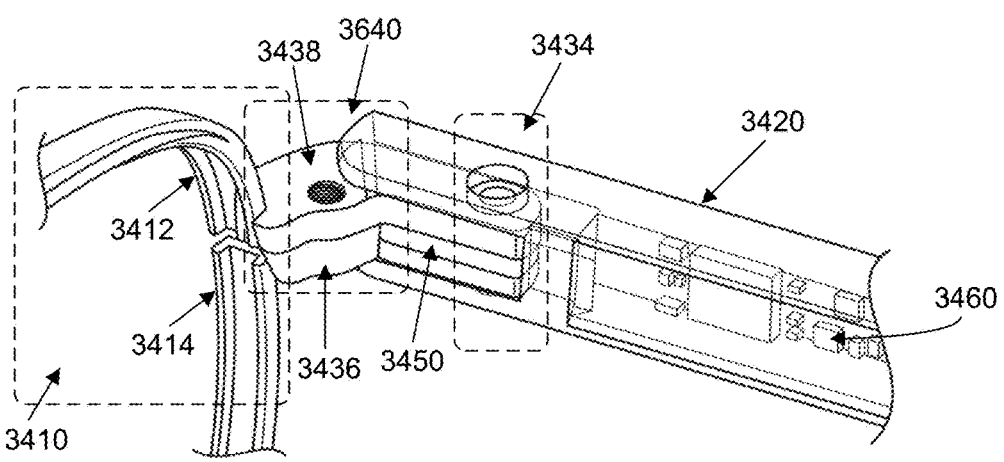
Figure 37A:
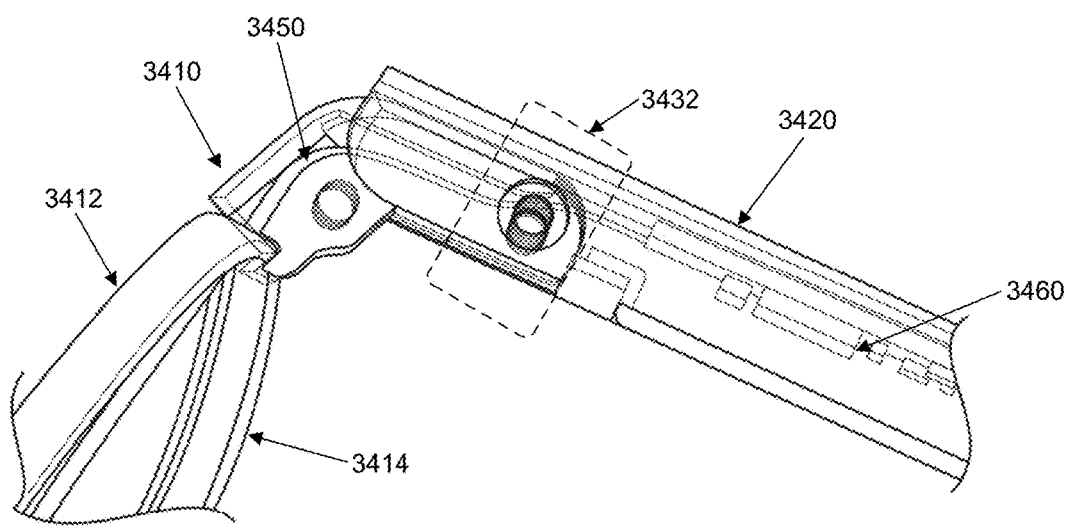
Figure 37B:
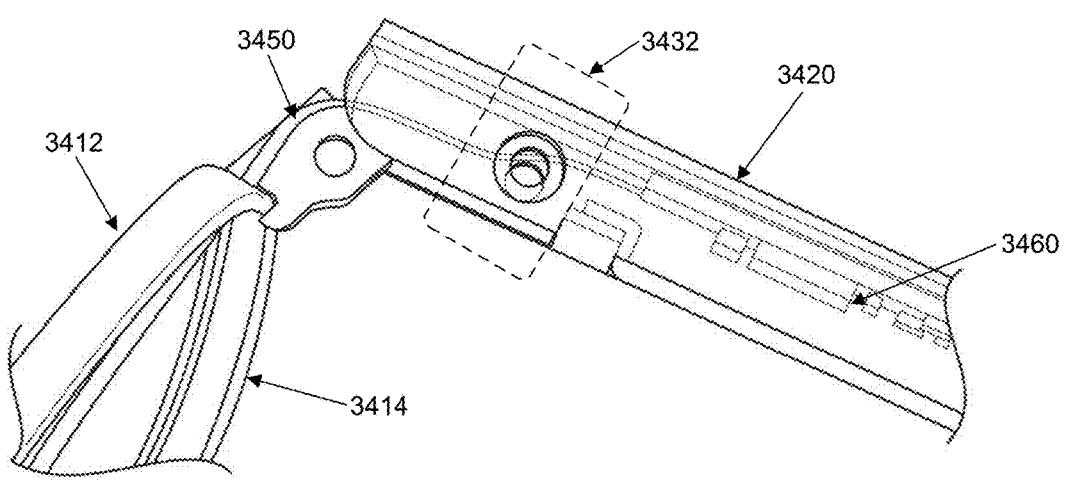

FIGS. 37A and 37B illustrate an orthogonal view of a flex cable running through the hinge of FIGS. 36A-C that couples a temple to a frame front in accordance with an aspect of the present invention.

Figure 38:
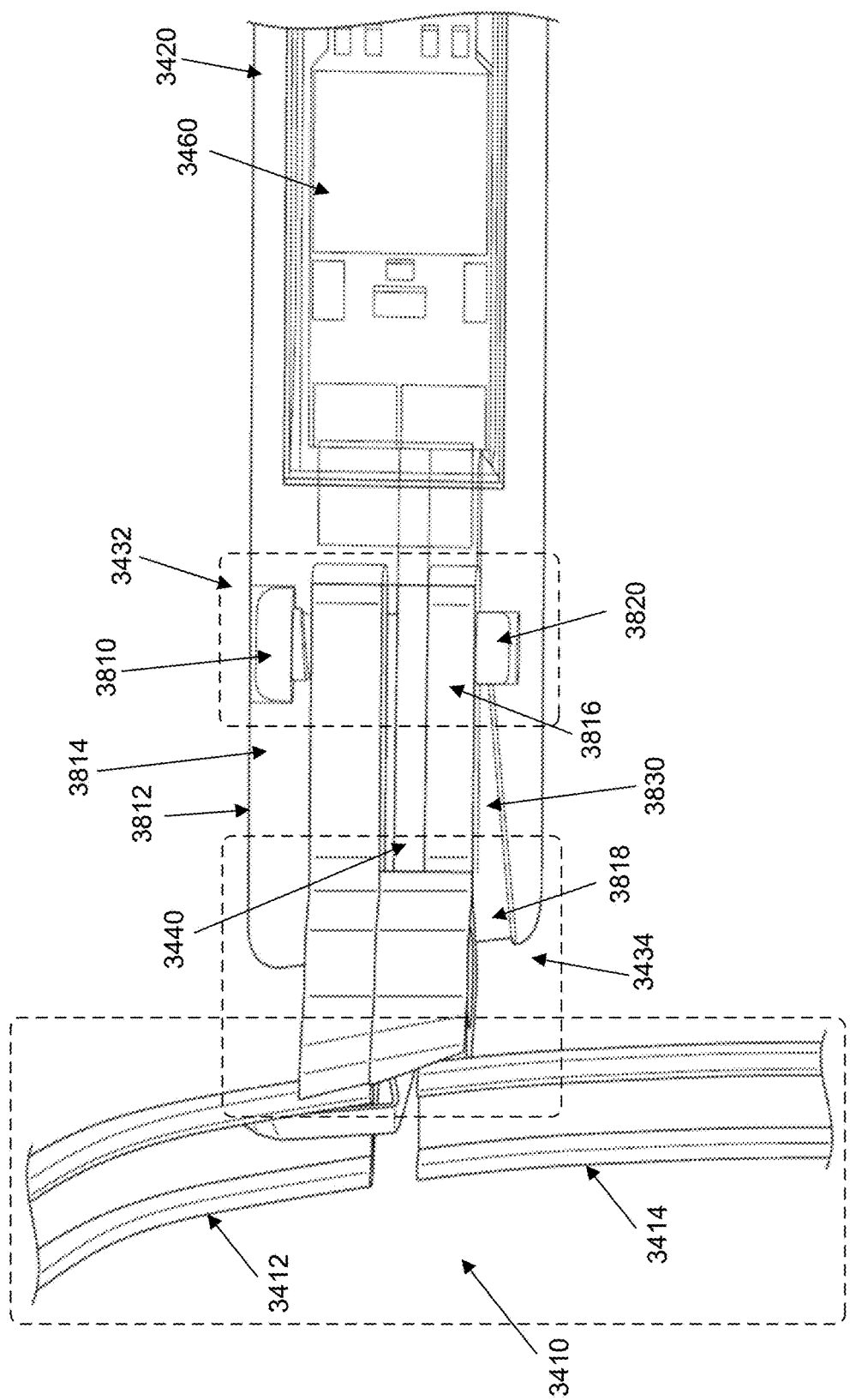

FIG. 38 illustrates another view of the hinge and rim-lock assembly of FIG. 36 in accordance with an aspect of the present invention.

Figure 39:
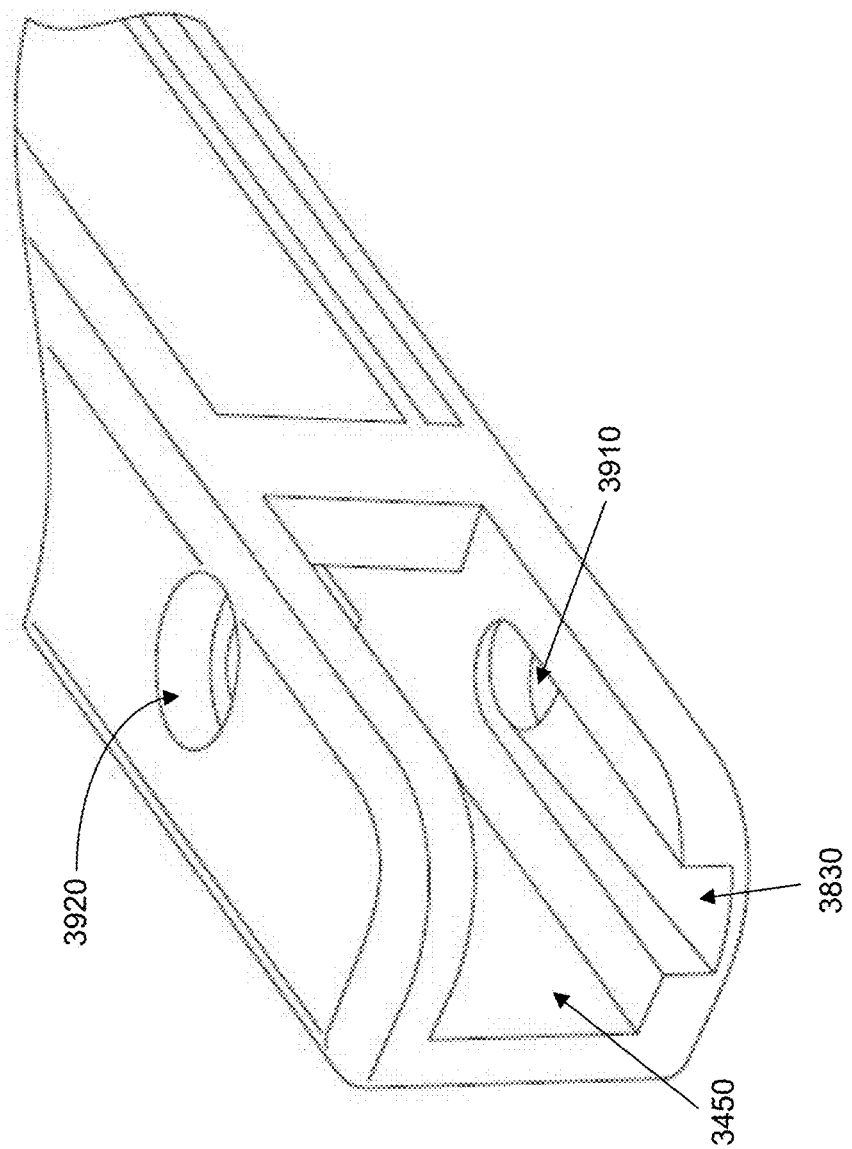

FIG. 39 illustrates a portion of the temple of FIG. 36 in accordance with an aspect of the present invention.

Figure 40:
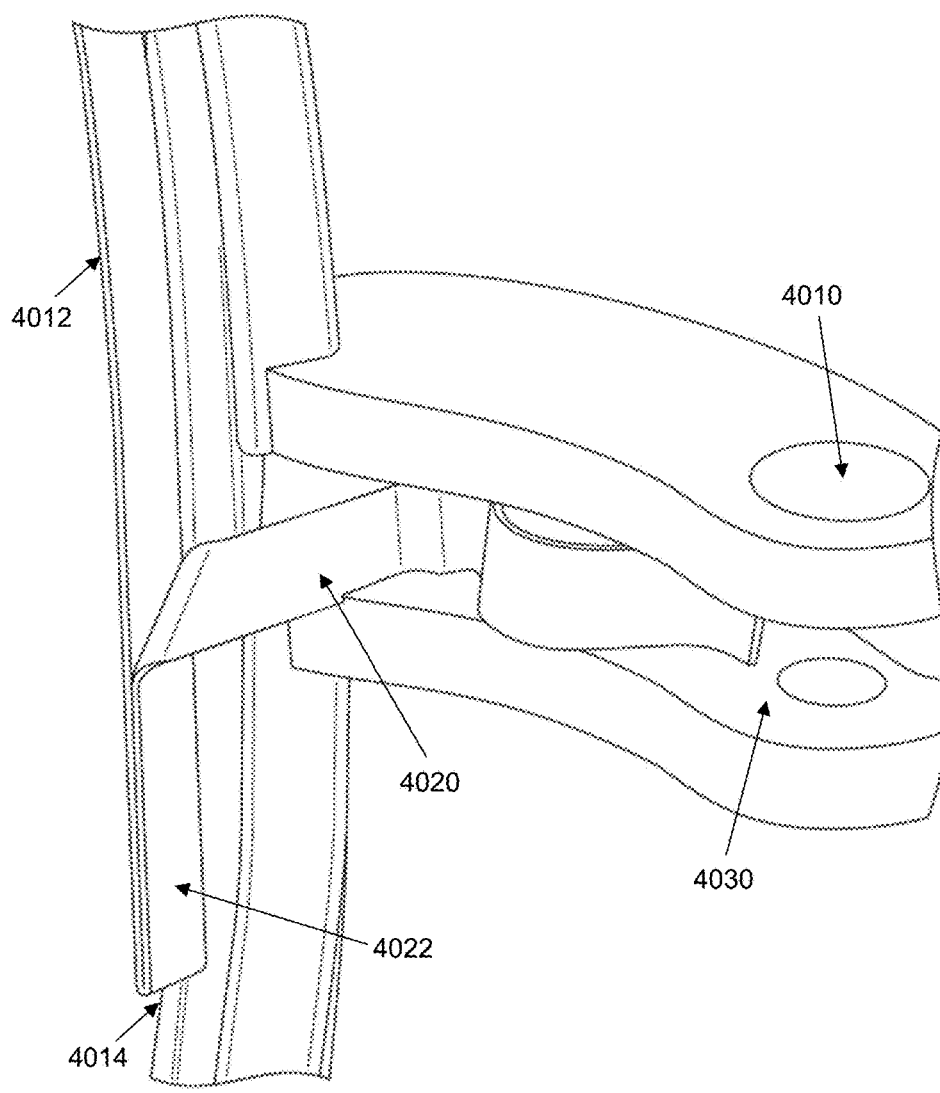

FIG. 40 illustrates another hinge and a flex cable running to a frame front through the hinge in accordance with an aspect of the present invention.

Figure 41:
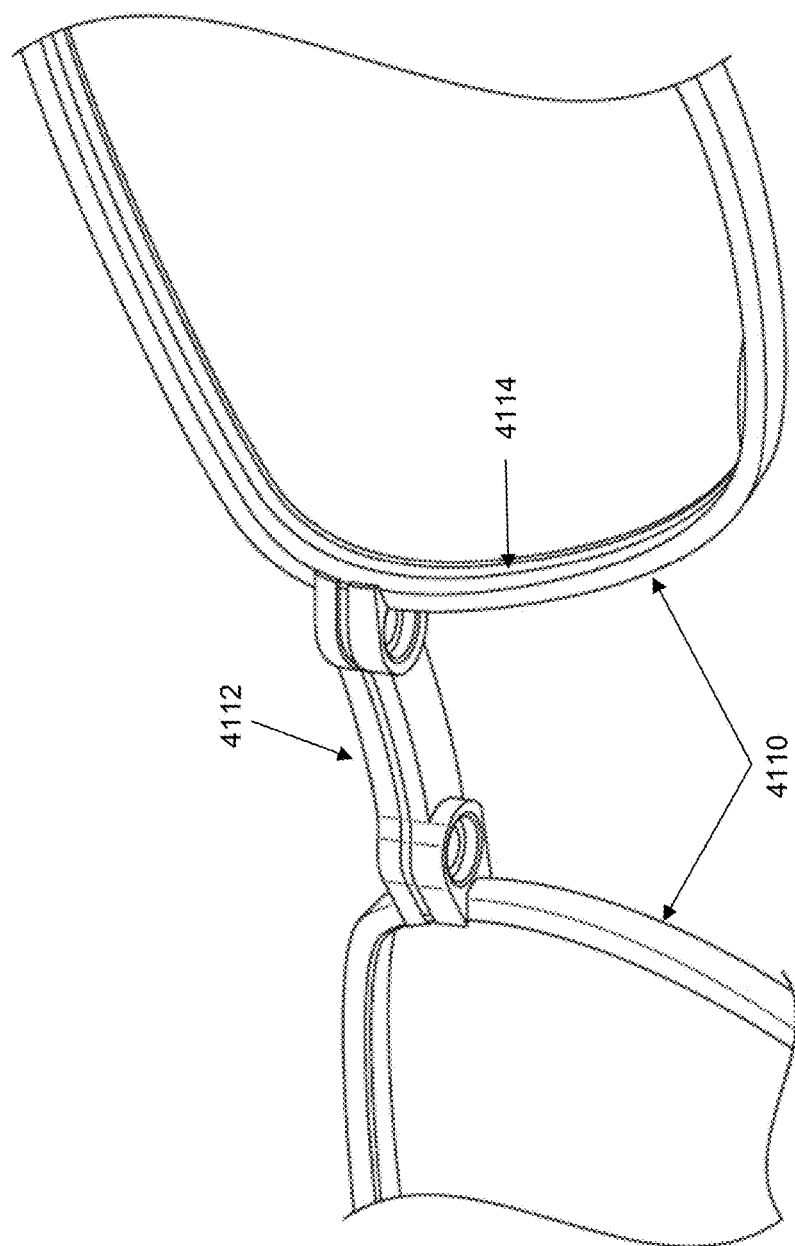

FIG. 41 illustrates a frame front for electronic eyeglasses in accordance with an aspect of the present invention.

Figure 42:
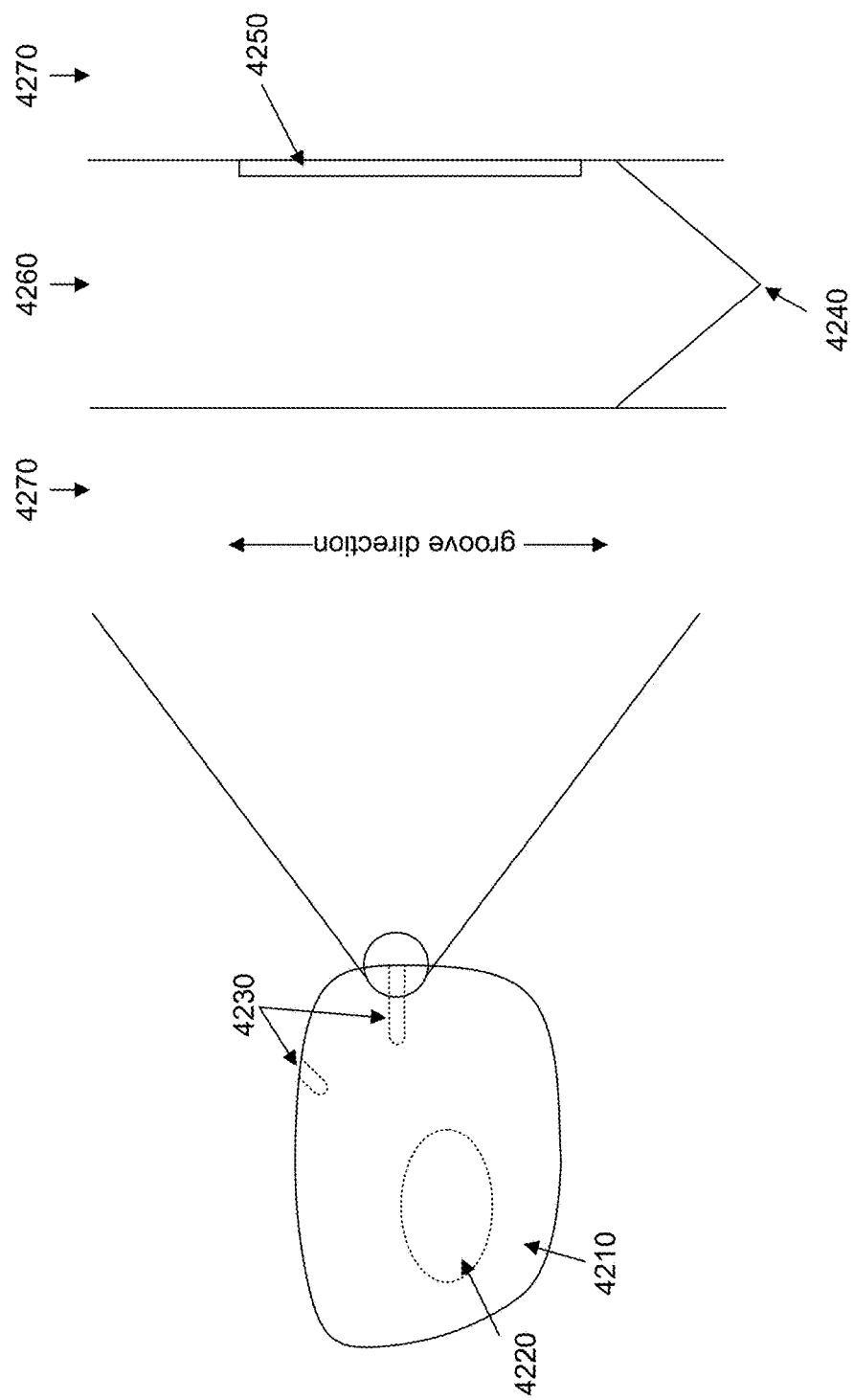

FIGS. 42A and 42B illustrate an electro-active lens and a cross-sectional view of the various layers of the lens in accordance with an aspect of the present invention.

Figure 43:
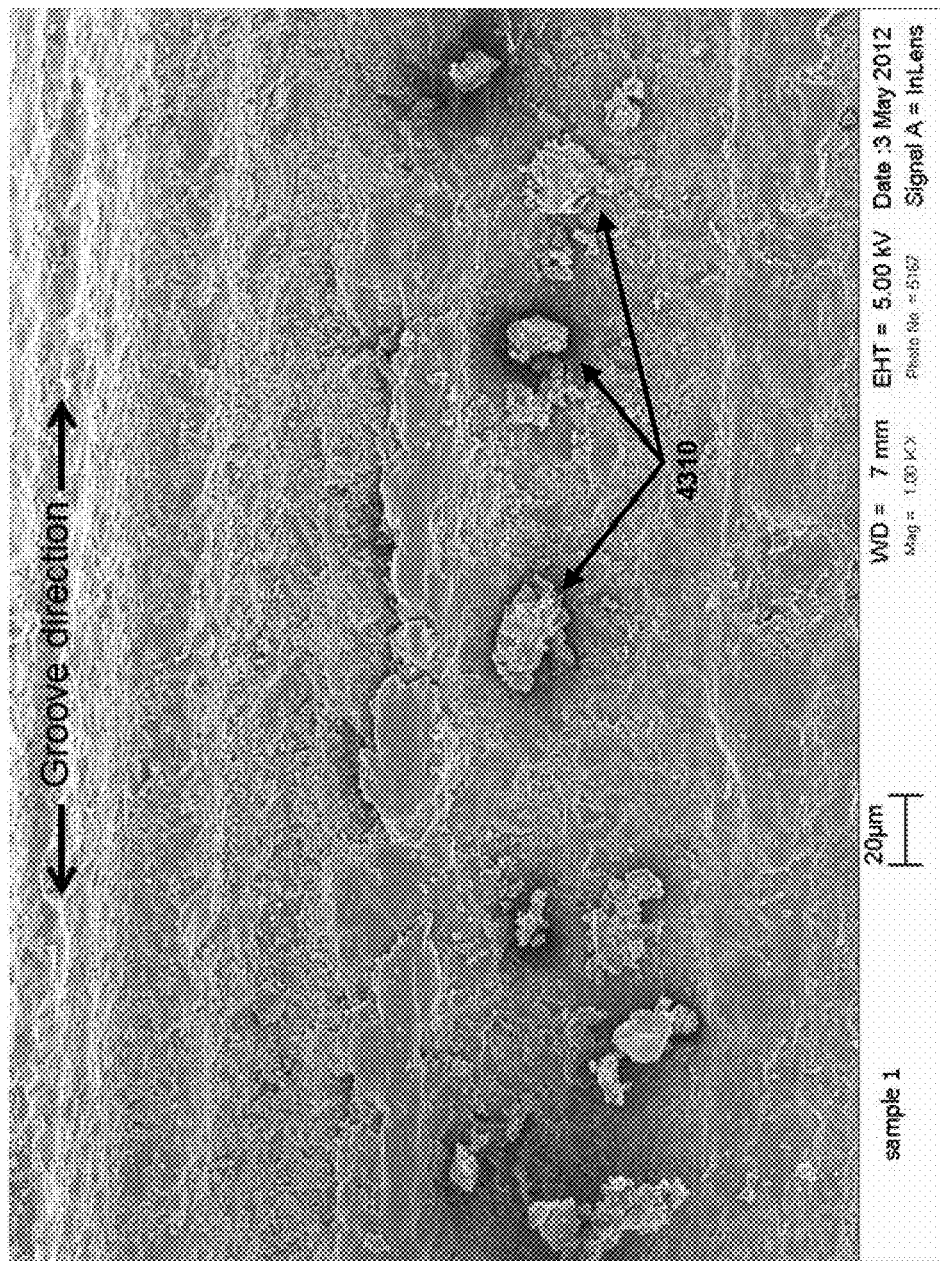

FIG. 43 illustrates a scanning electron microscope image of the cross-sectional view of the lens of FIGS. 42A-B in accordance with an aspect of the present invention.

Figure 44:
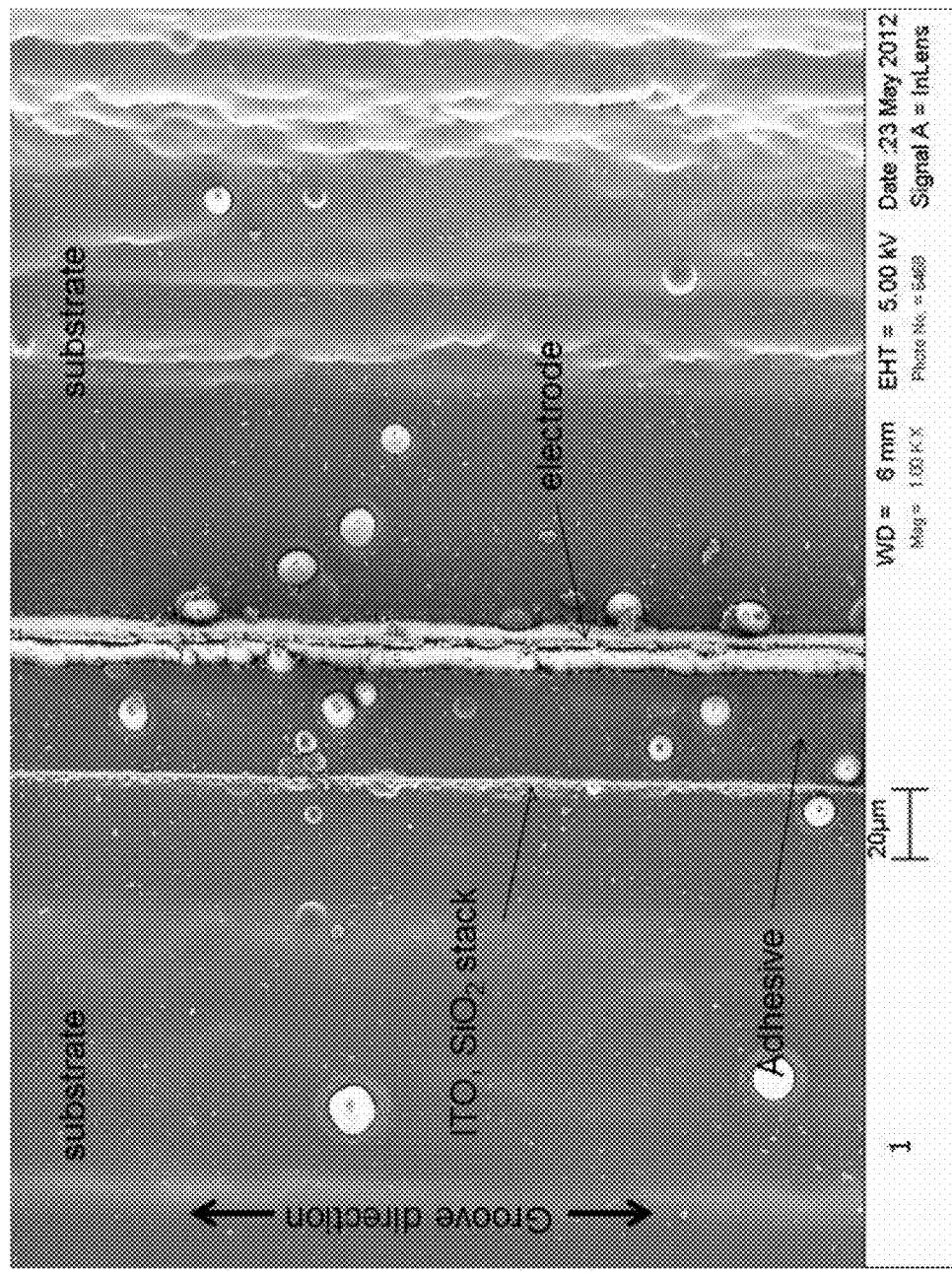

FIG. 44 illustrates a scanning electron microscope image of the cross-sectional view of the lens of FIGS. 42A-B in accordance with an aspect of the present invention.

Figure 45:
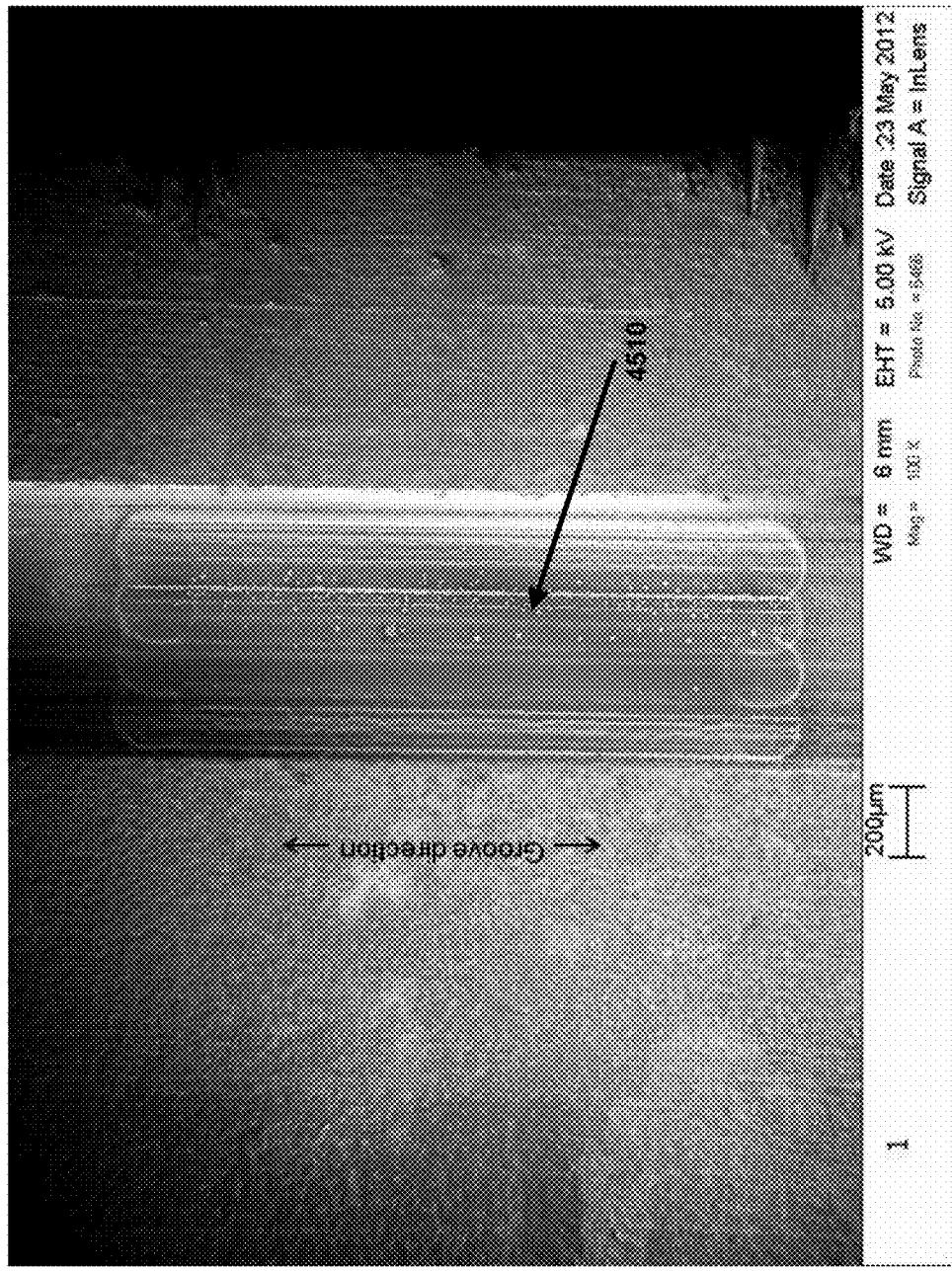

FIG. 45 illustrates a scanning electron microscope image of the cross-sectional view of the lens of FIGS. 42A-B in accordance with an aspect of the present invention.

FIGS. 46A-E illustrate various process steps for the formation of electrical connectivity to an electro-active lens in accordance with an aspect of the present invention.

Figure 46A:
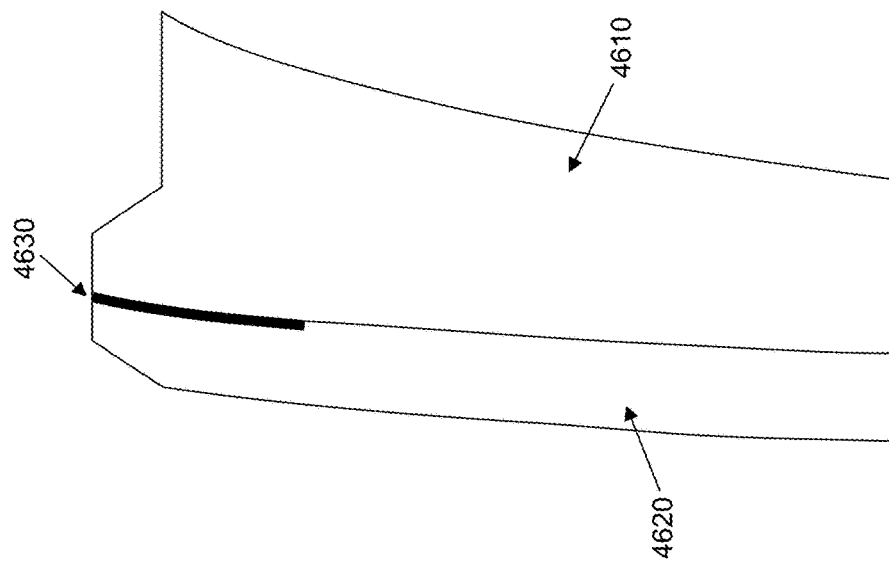
Figure 46B:
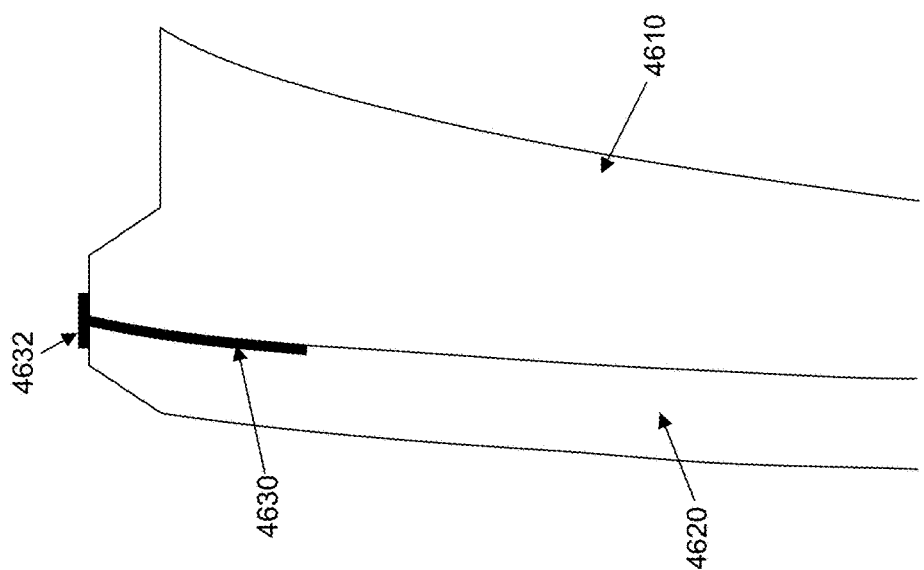
Figure 46C:
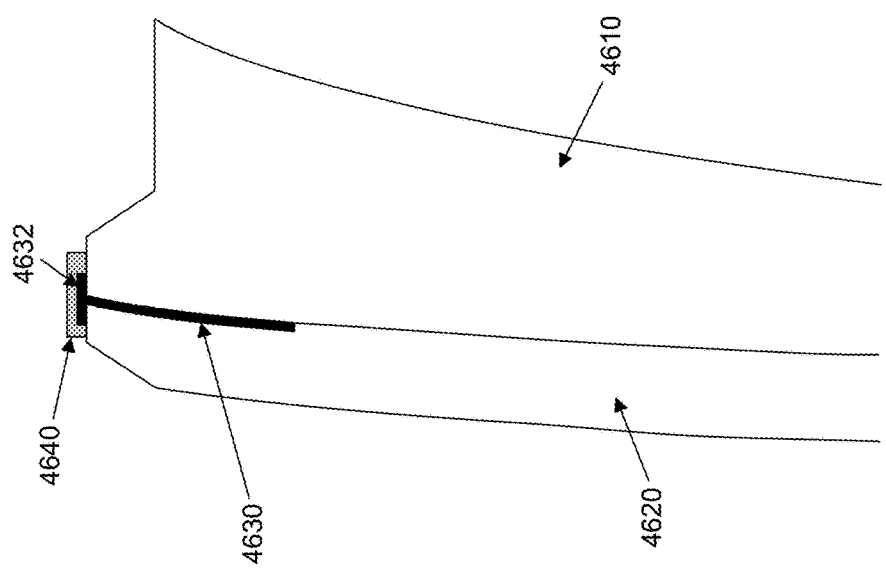
Figure 46D:
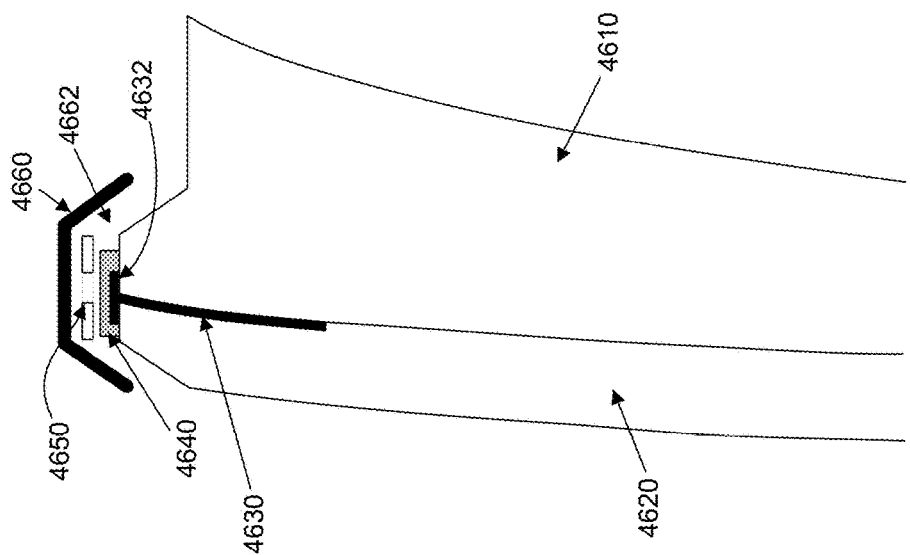
Figure 46E:
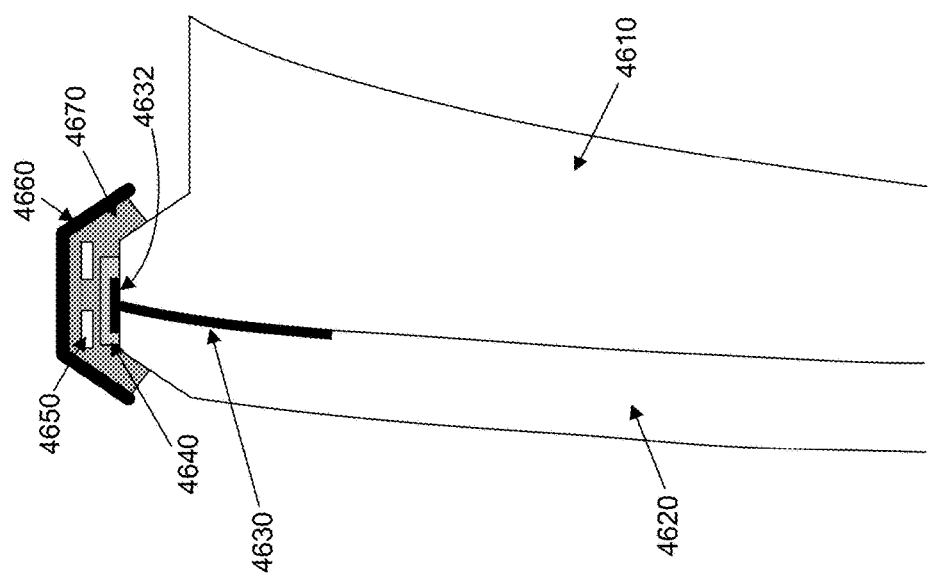
Figure 47:
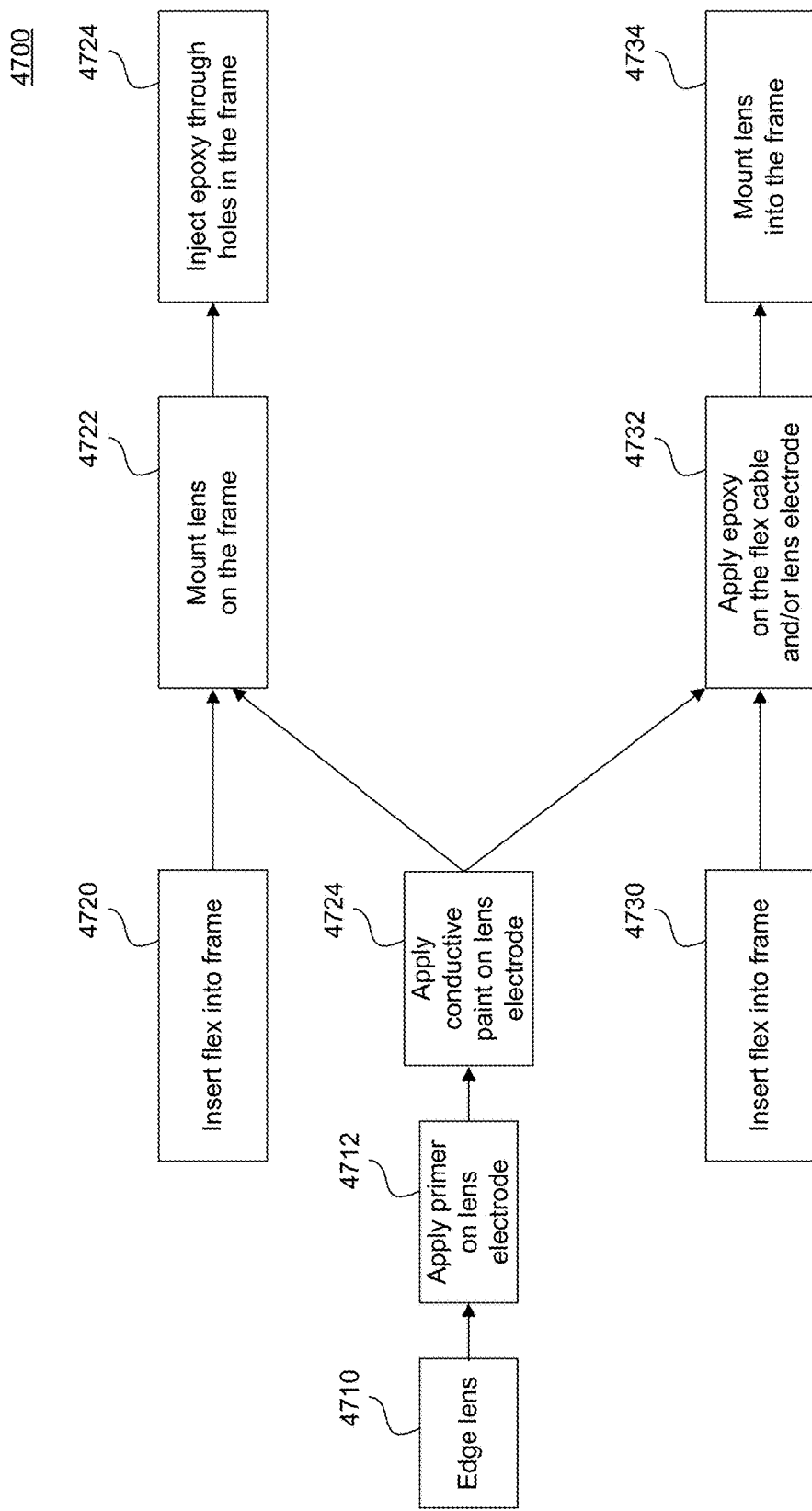

FIG. 47 illustrates a flow-chart describing the method for the formation of electrical connectivity to the electro-active lens of FIGS. 46A-E in accordance with an aspect of the present invention.

Figure 48:
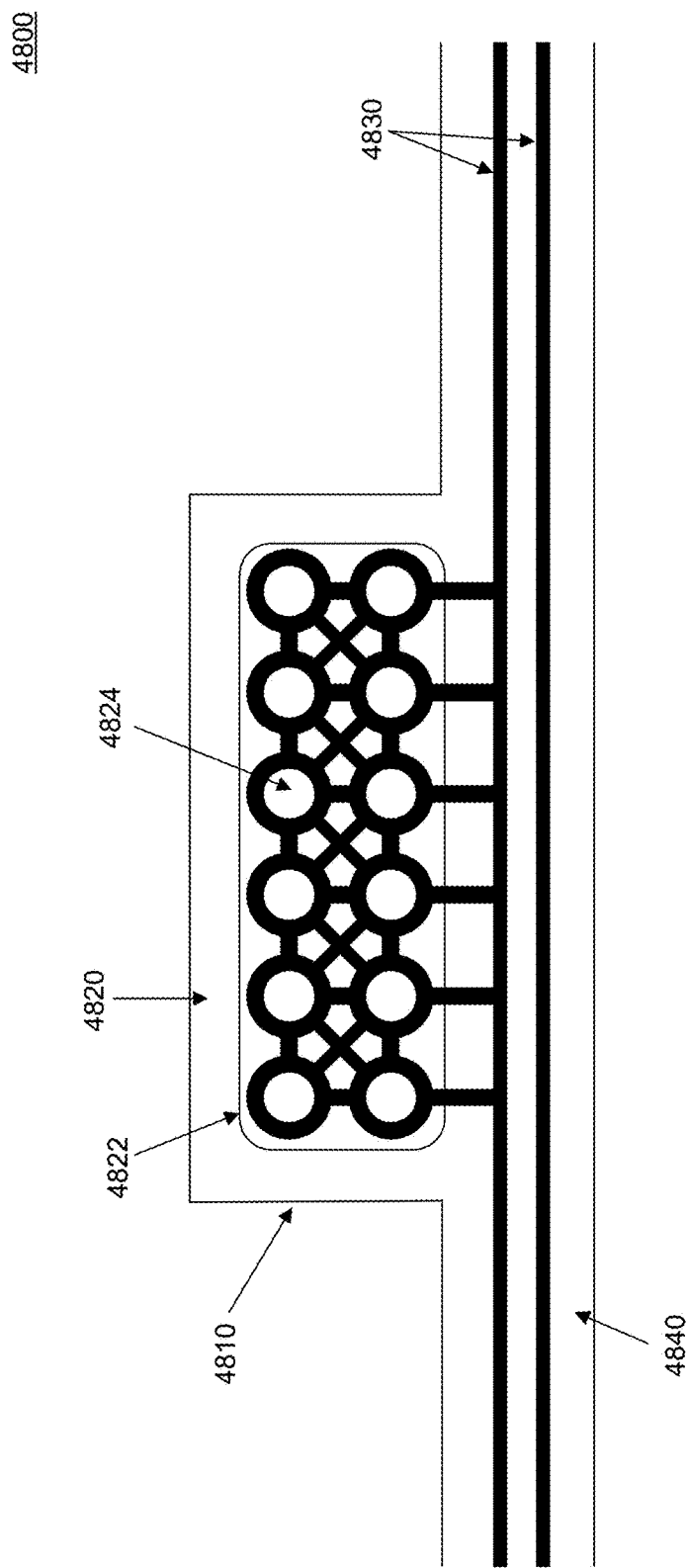

FIG. 48 illustrates a top-down view of a portion of a flex cable and the structure of a connection tab in accordance with an aspect of the present invention.

FIGS. 49A, 49B and 49C illustrate a portion of a flex cable and exploded views of various components thereof in accordance with an aspect of the present invention.

FIGS. 50A, 50B and 50C illustrate cross-sectional drawings of the layer structure of the components of the flex cable of FIGS. 49A-C in accordance with an aspect of the present invention.

Figure 51B:
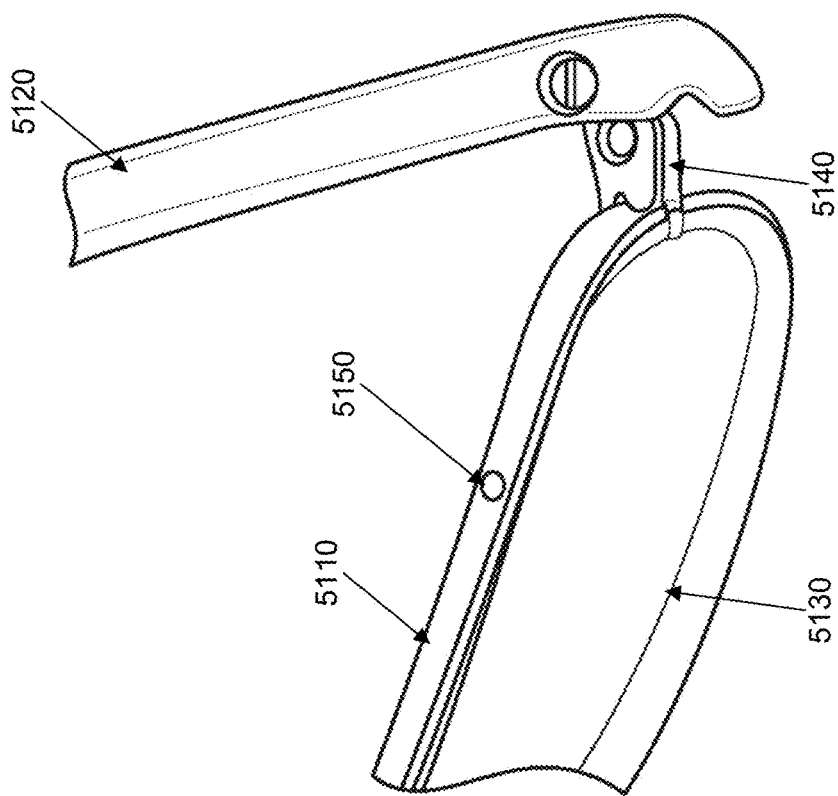
Figure 51A:
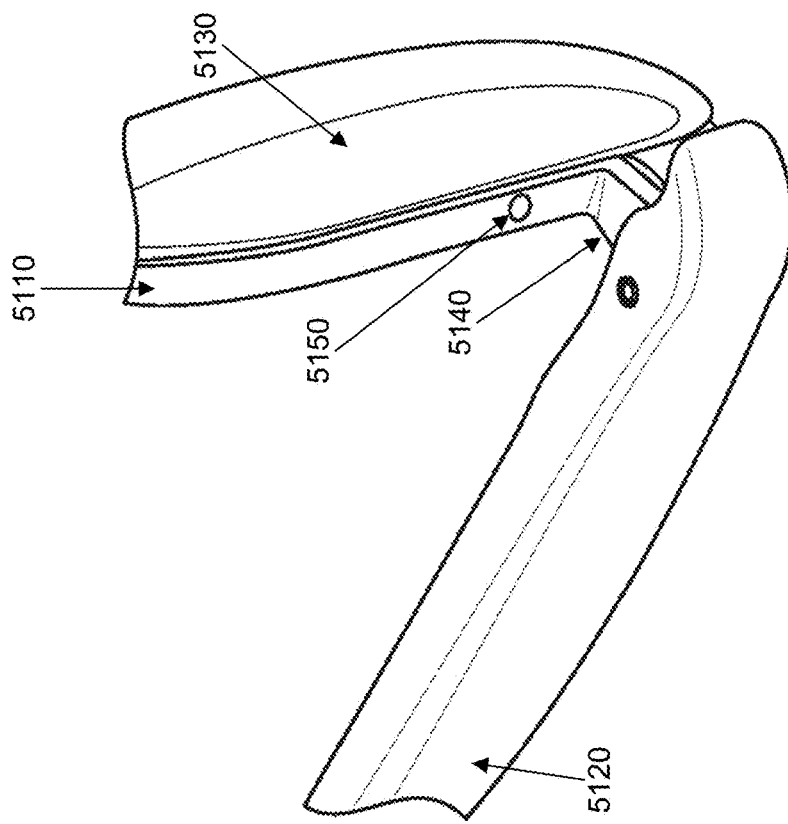

FIGS. 51A and 51B illustrate conductive sealant ports in a frame front of electronic eyeglasses in accordance with an aspect of the present invention.

Figure 52:
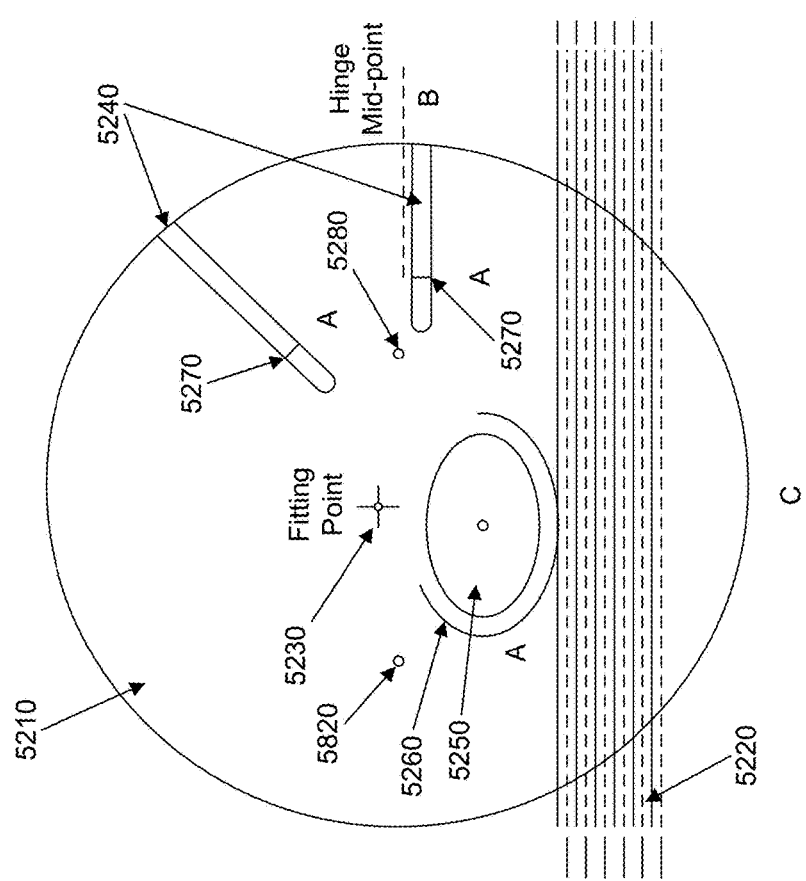

FIG. 52 illustrates a schematic of a lens fitting cut-out.

Figure 53:
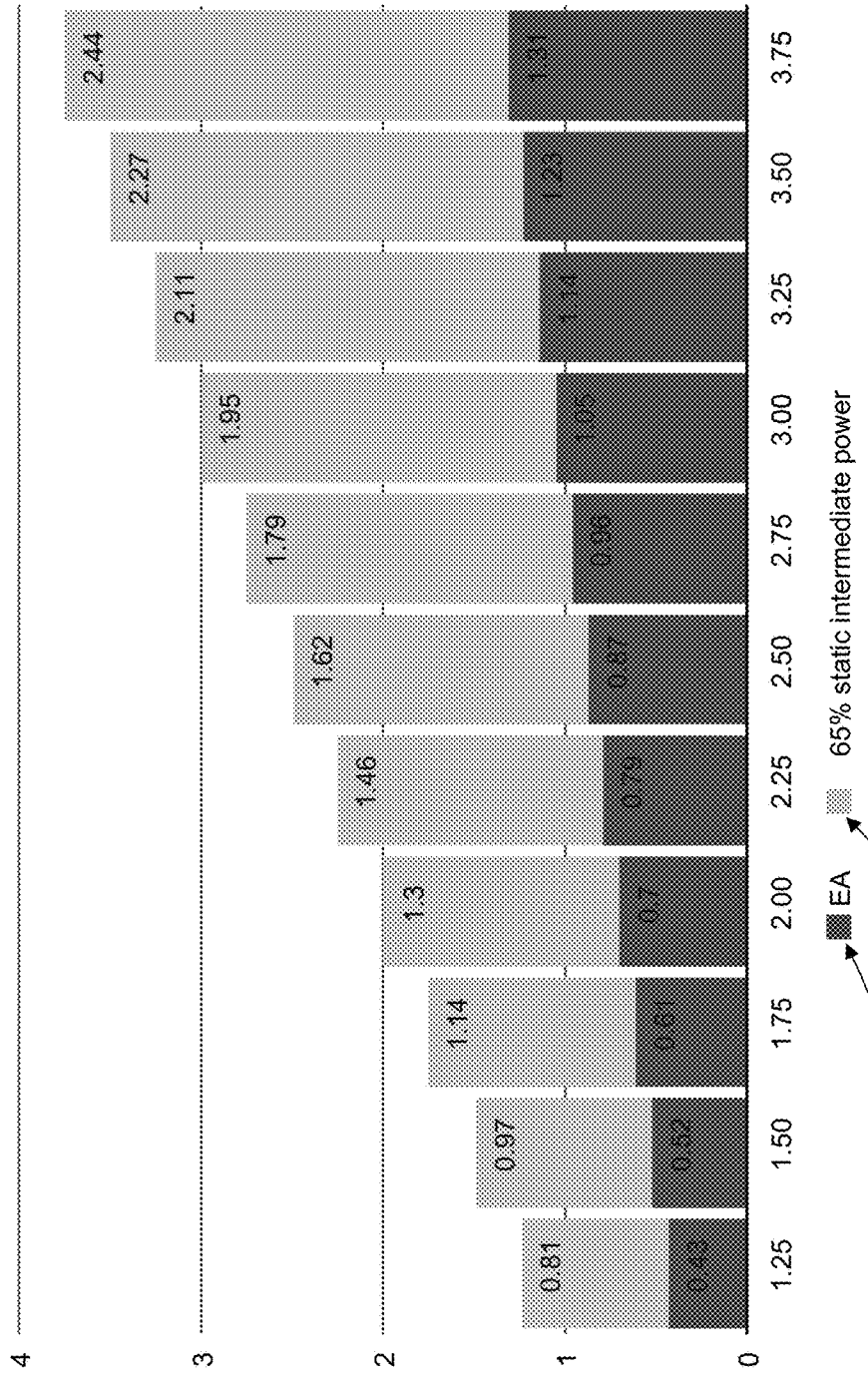

FIG. 53 illustrates a bar graph of optimal optical power distribution in accordance with an aspect of the present invention.

Figure 54:
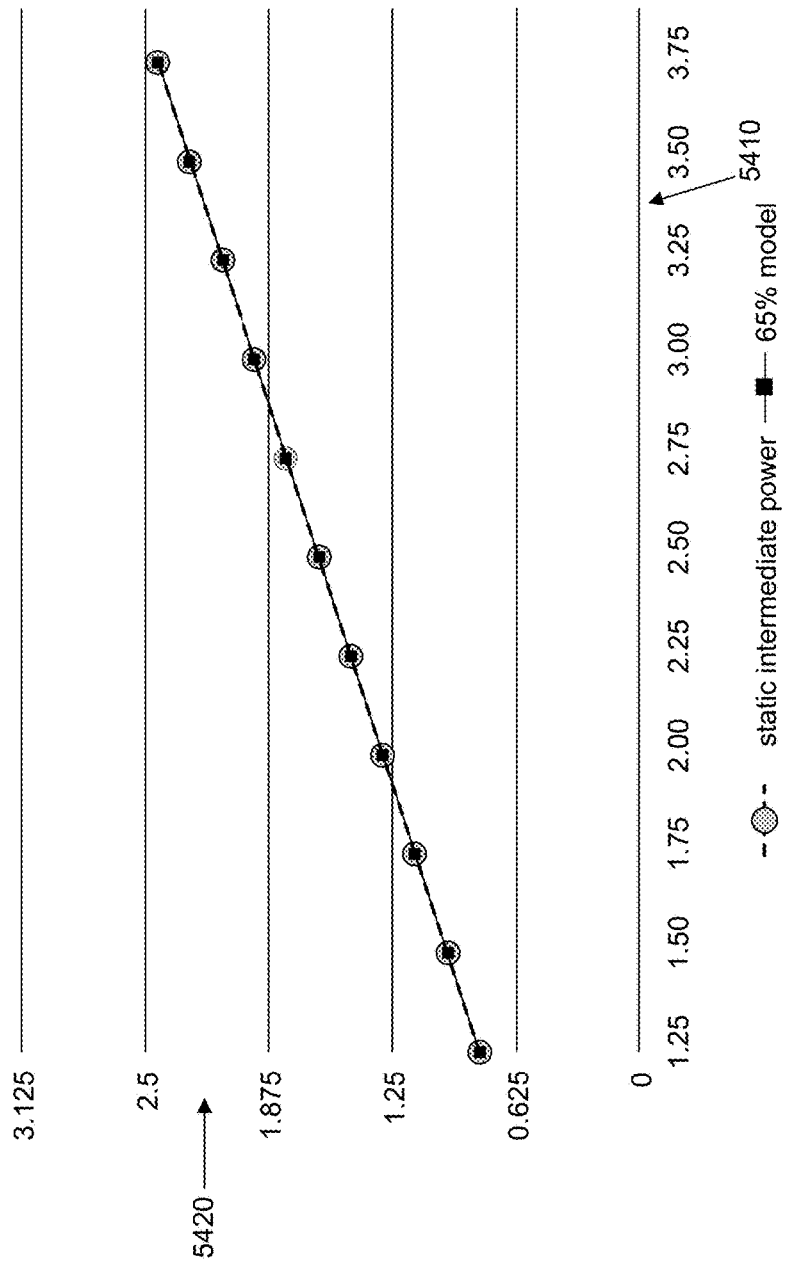

FIG. 54 illustrates a graph of optimal optical power in accordance with an aspect of the present invention.

Figure 55:
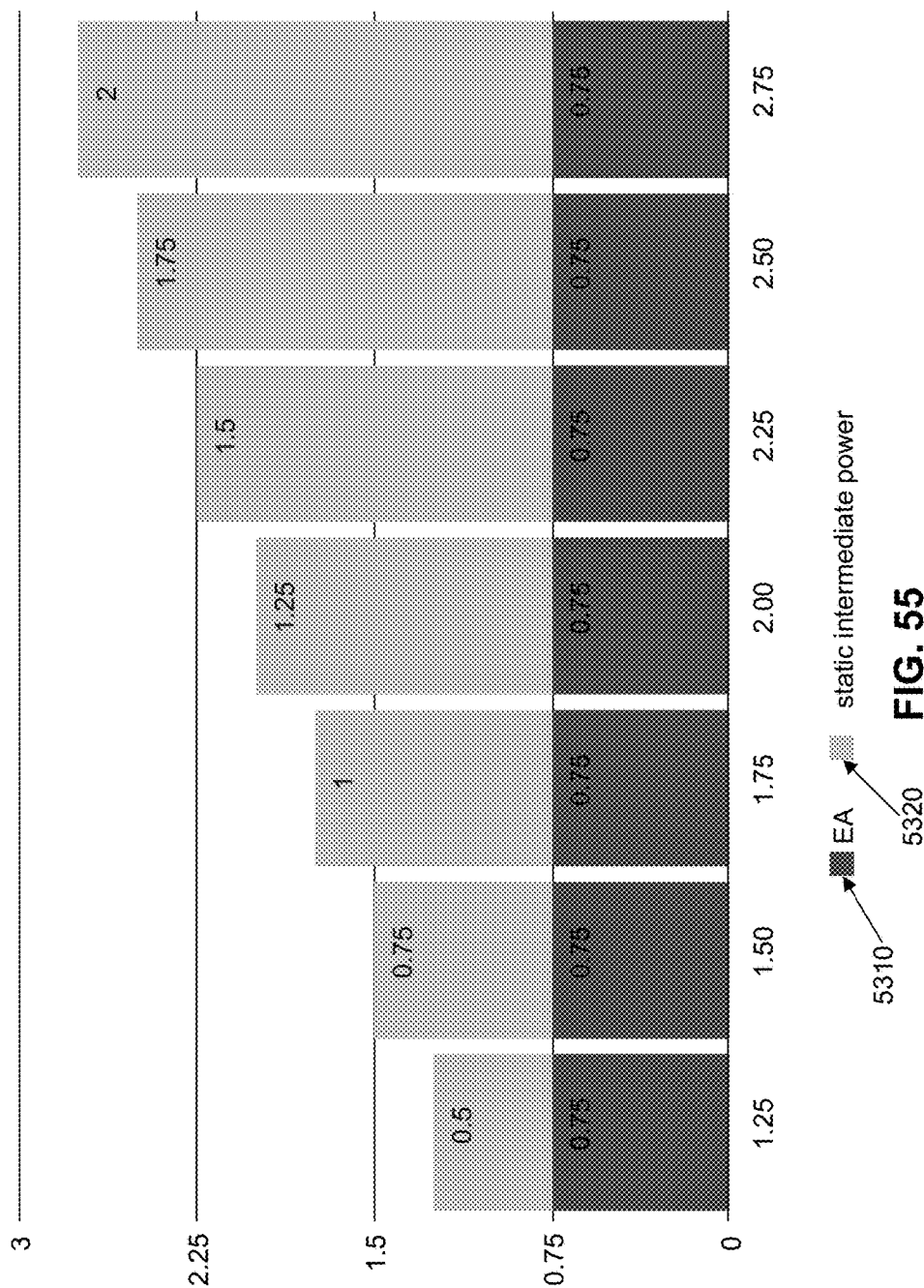

FIG. 55 illustrates a typical bar graph of optical power distribution.

Figure 56:
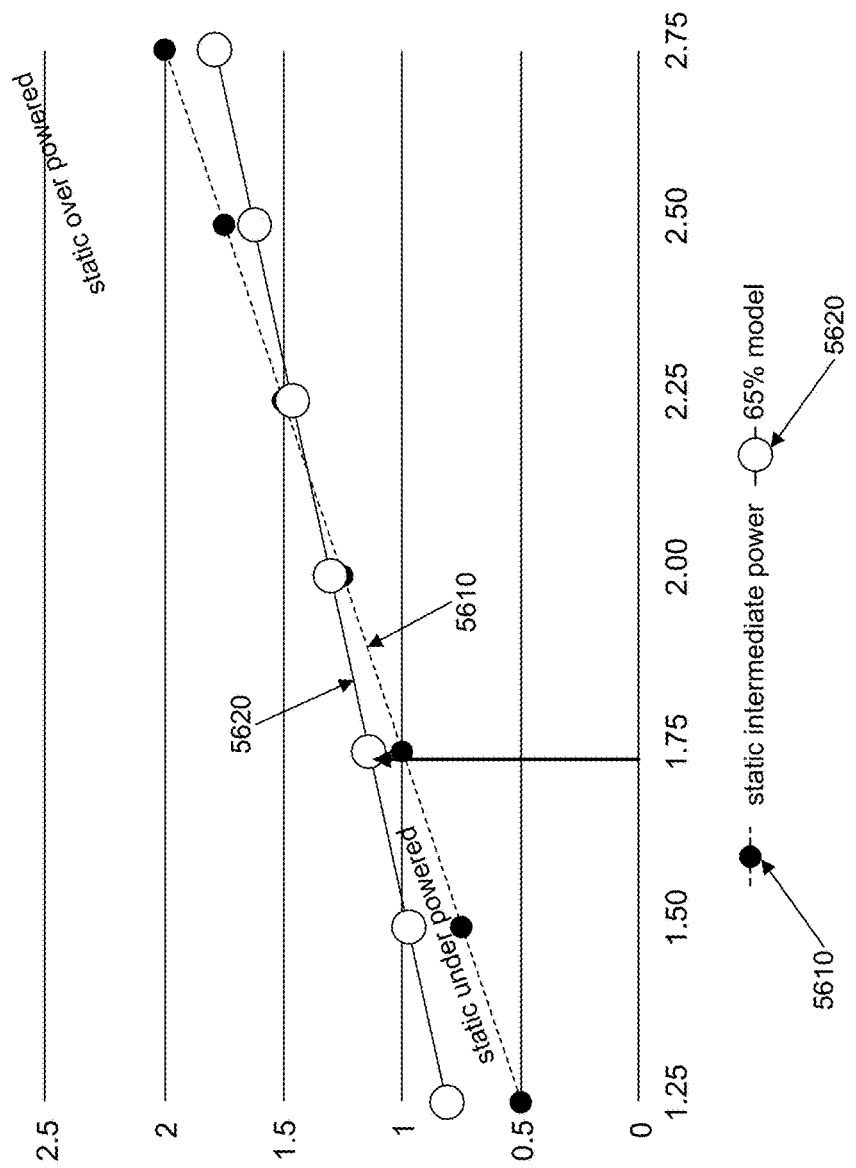

FIG. 56 illustrates a typical graph of optical power variation.

Figure 57:
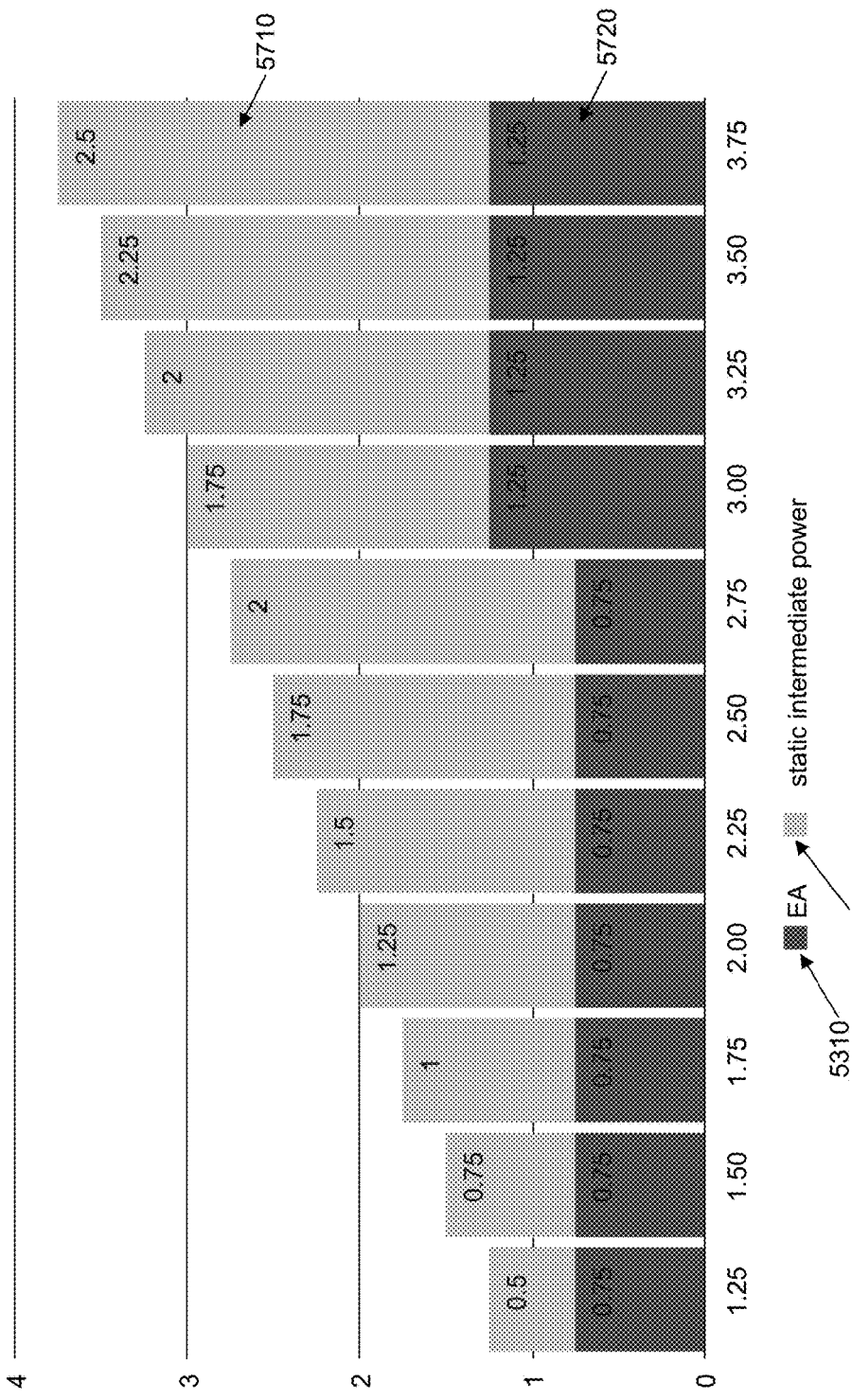

FIG. 57 illustrates a bar graph of optical power distribution in accordance with an aspect of the present invention.

Figure 58:
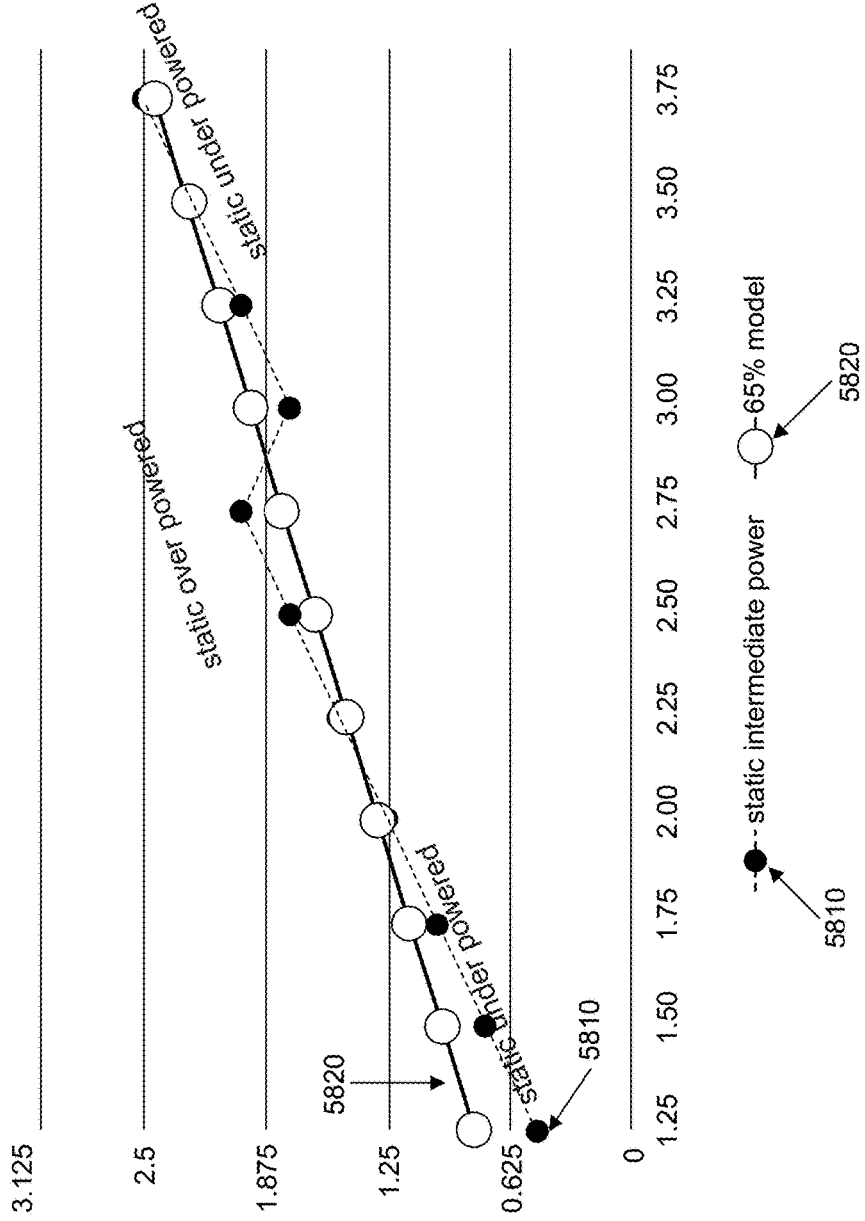

FIG. 58 illustrates a graph of optical power variation in accordance with an aspect of the present invention.

Figure 59:
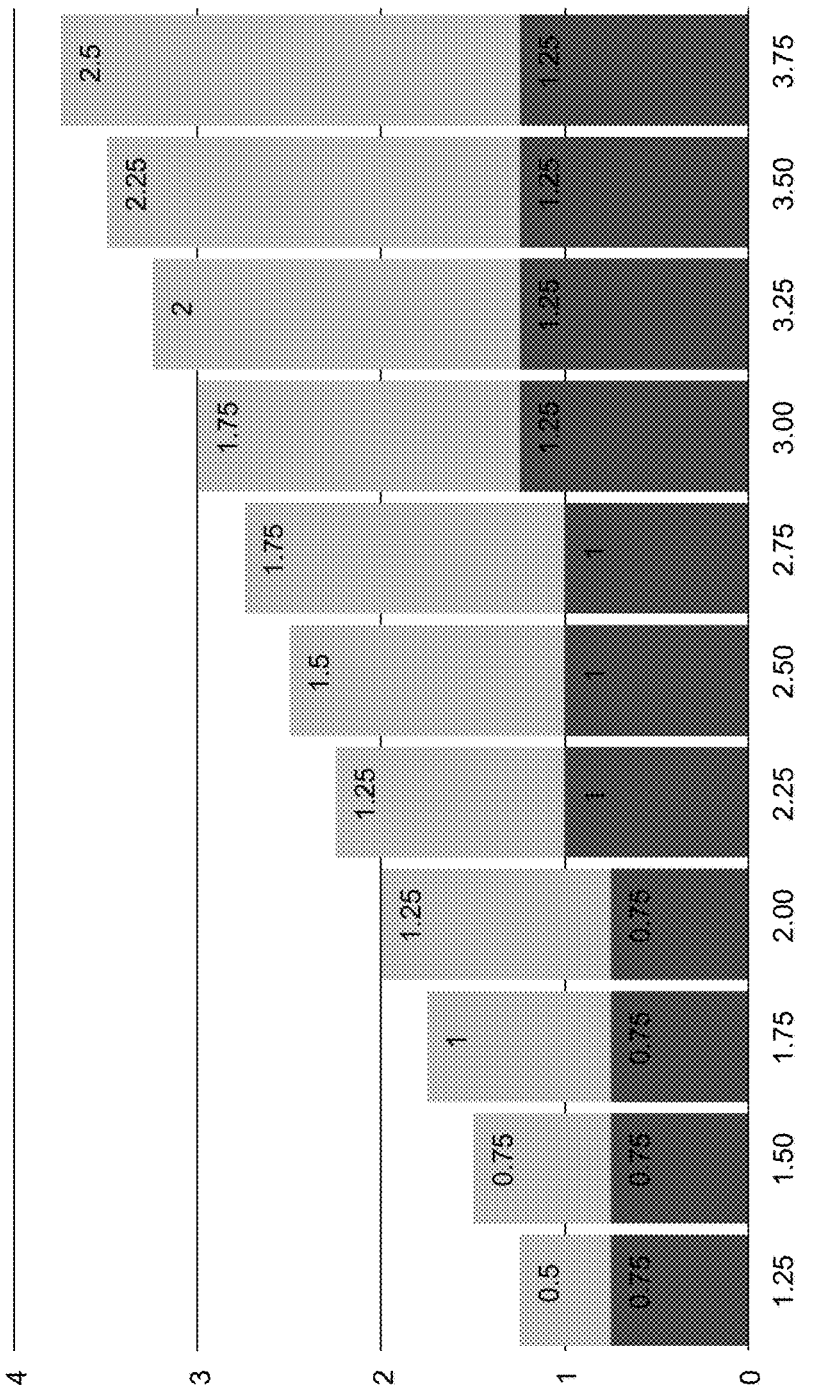

FIG. 59 illustrates a bar graph of optical power distribution in accordance with an aspect of the present invention.

Figure 60:
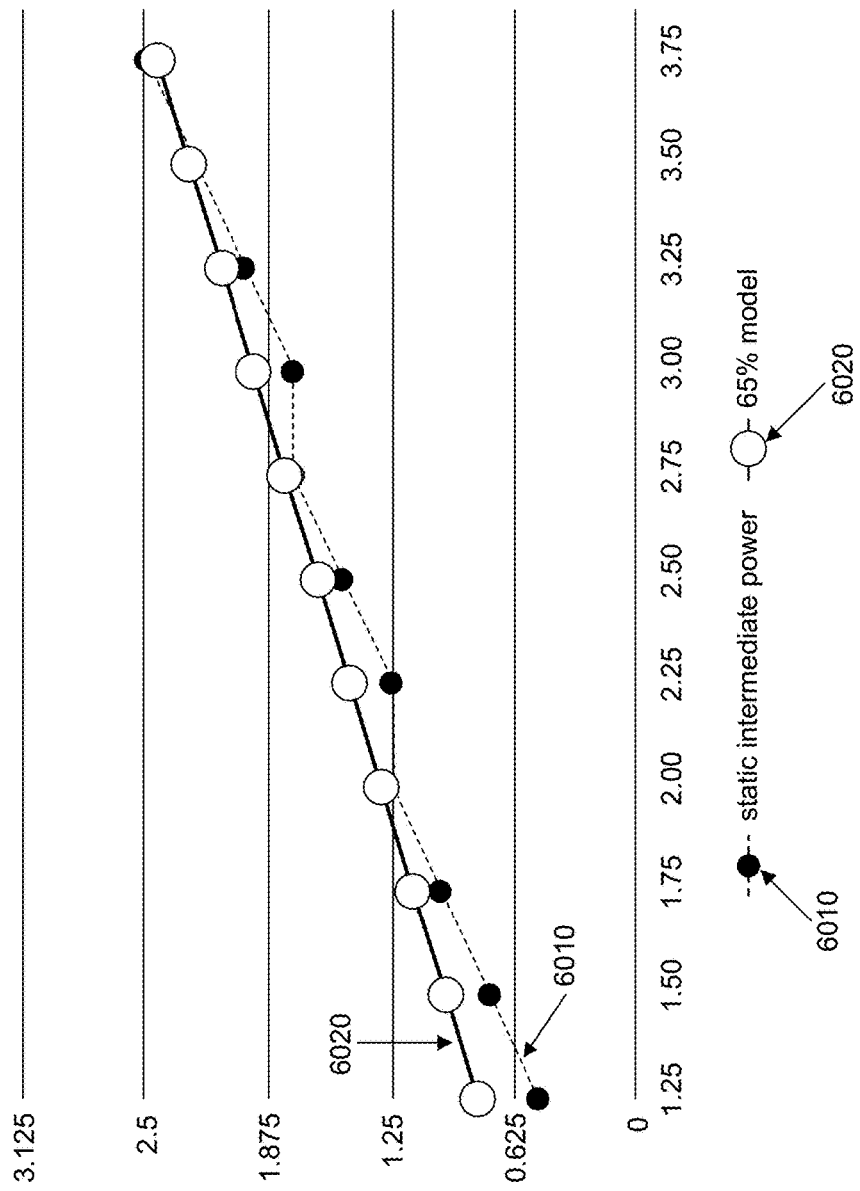

FIG. 60 illustrates a graph of optical power variation in accordance with an aspect of the present invention.

Figure 61:
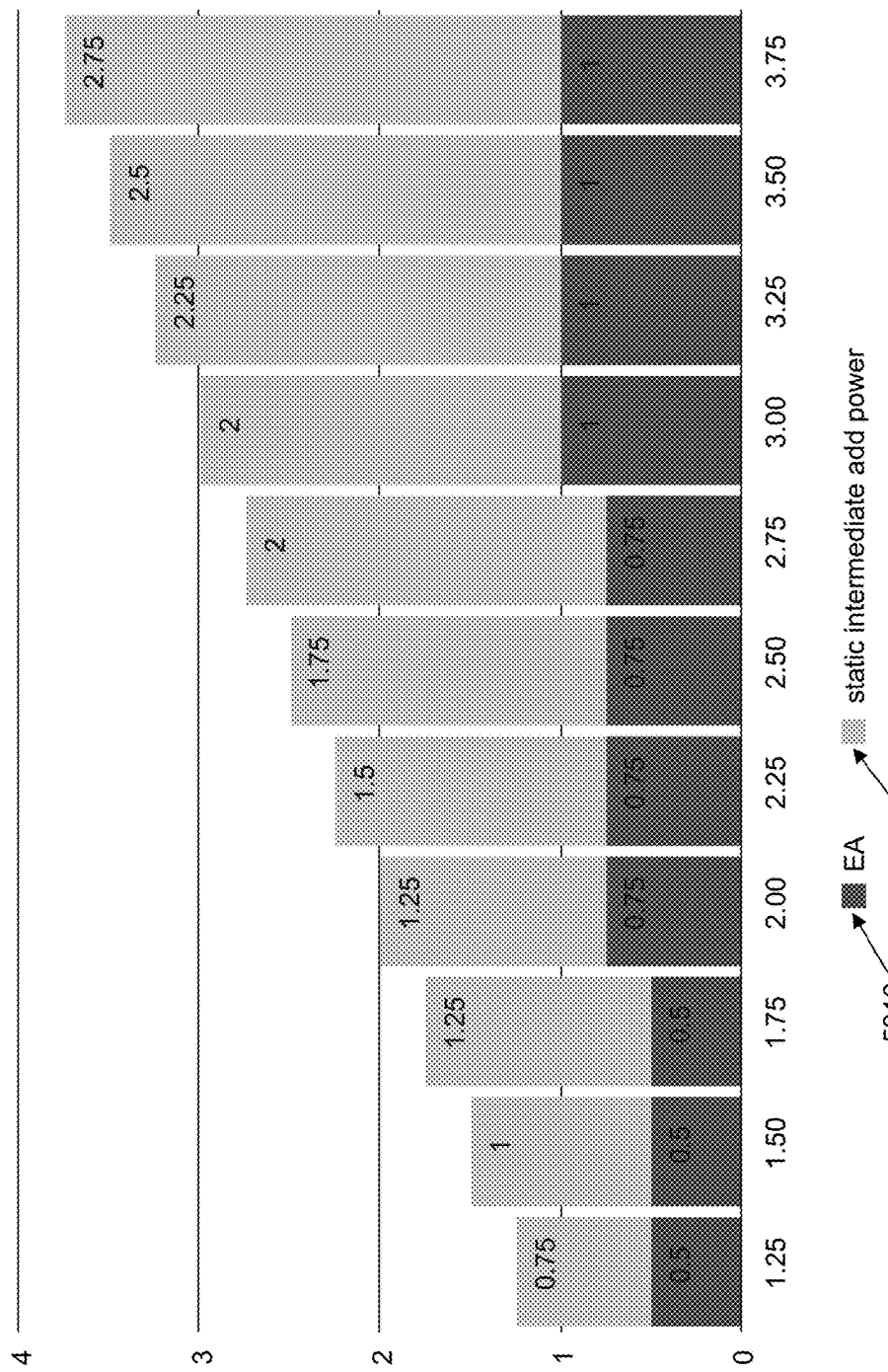

FIG. 61 illustrates a bar graph of optical power distribution in accordance with an aspect of the present invention.

Figure 62:
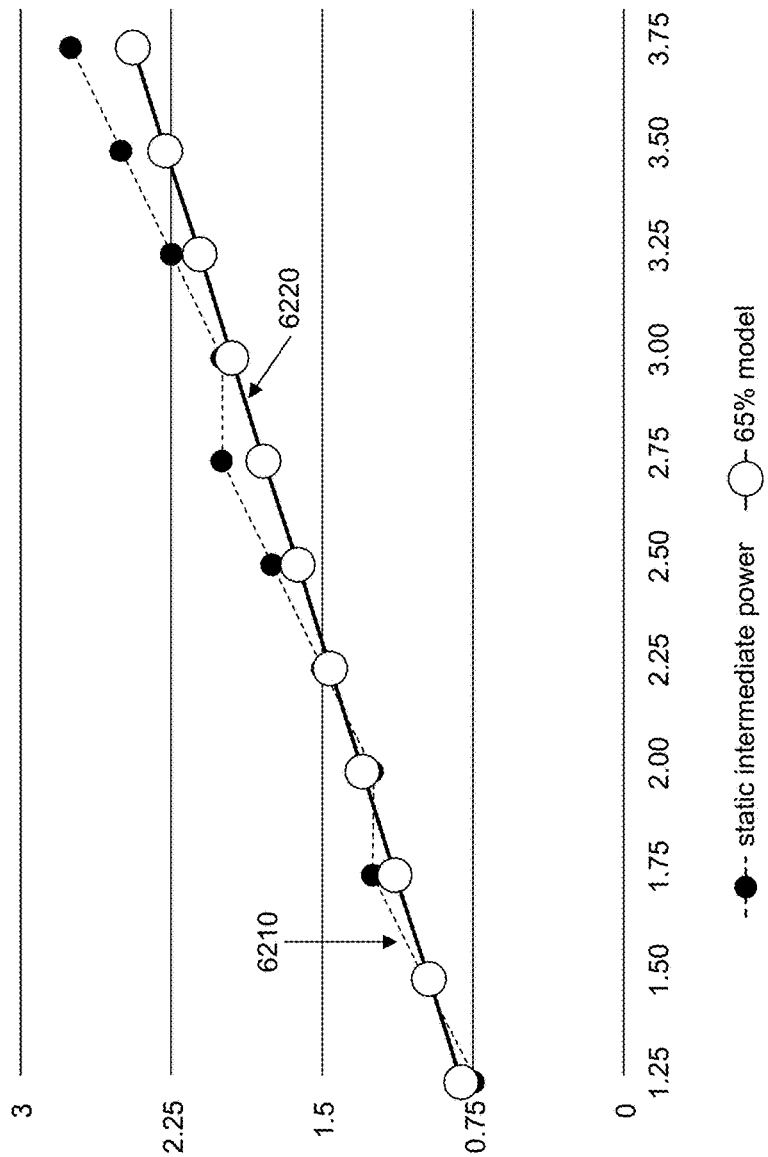

FIG. 62 illustrates a graph of optical power variation in accordance with an aspect of the present invention.

Figure 63B:
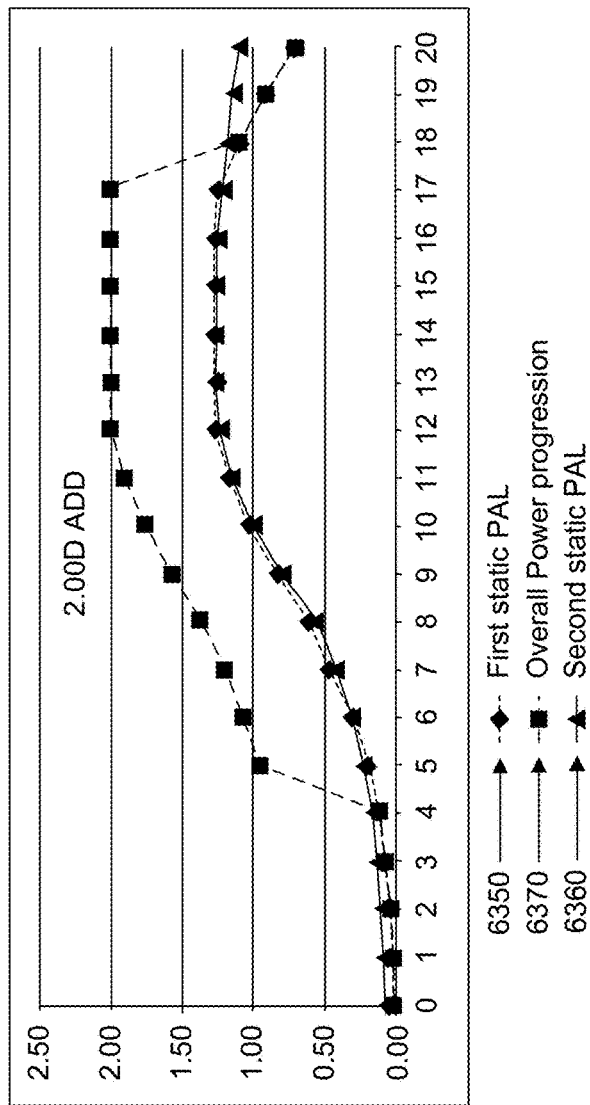
Figure 63A:
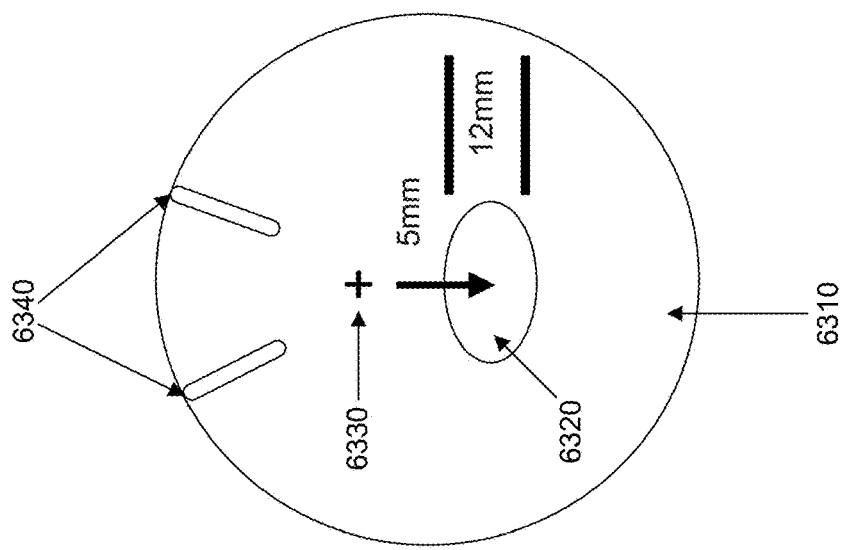

FIGS. 63A and 63B illustrate a lens substrate and a corresponding graph of optical power variation across an electro-active component of a lens in accordance with an aspect of the present invention.

Figure 64:
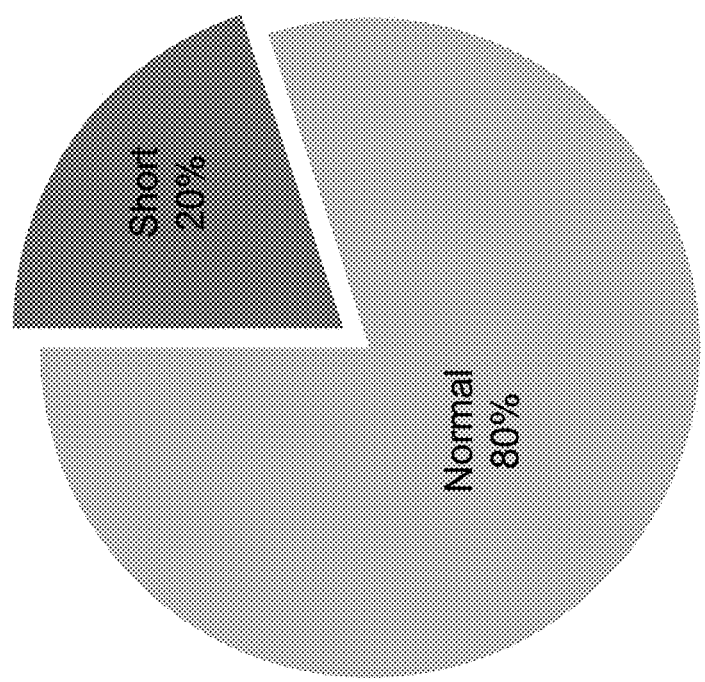

FIG. 64 illustrates a pie chart describing the distribution of an electro-active corridor in accordance with an aspect of the present invention.

Figure 65B:
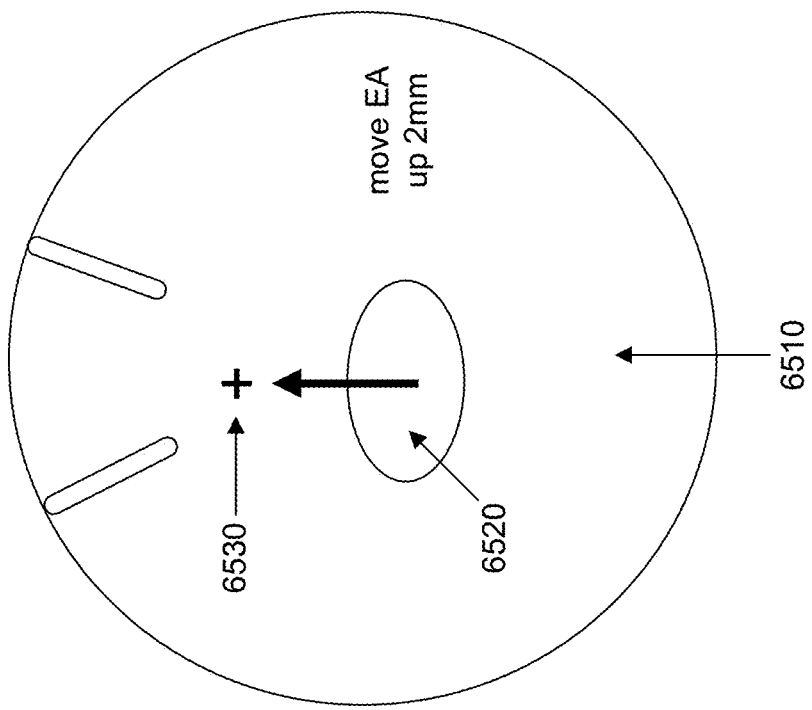
Figure 65A:
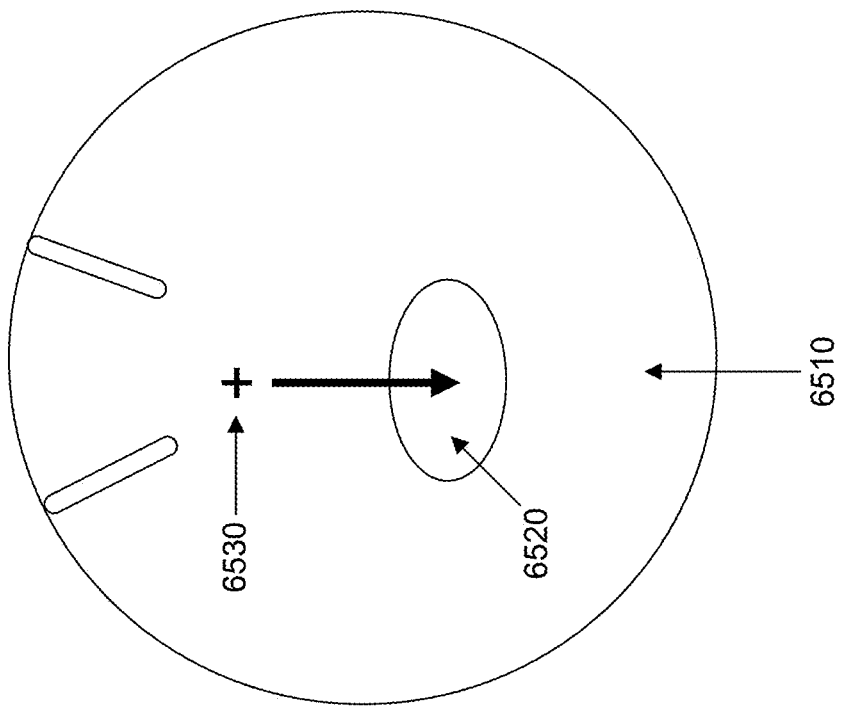

FIGS. 65A and 65B illustrate lens portions in accordance with an aspect of the present invention.

Figure 66:
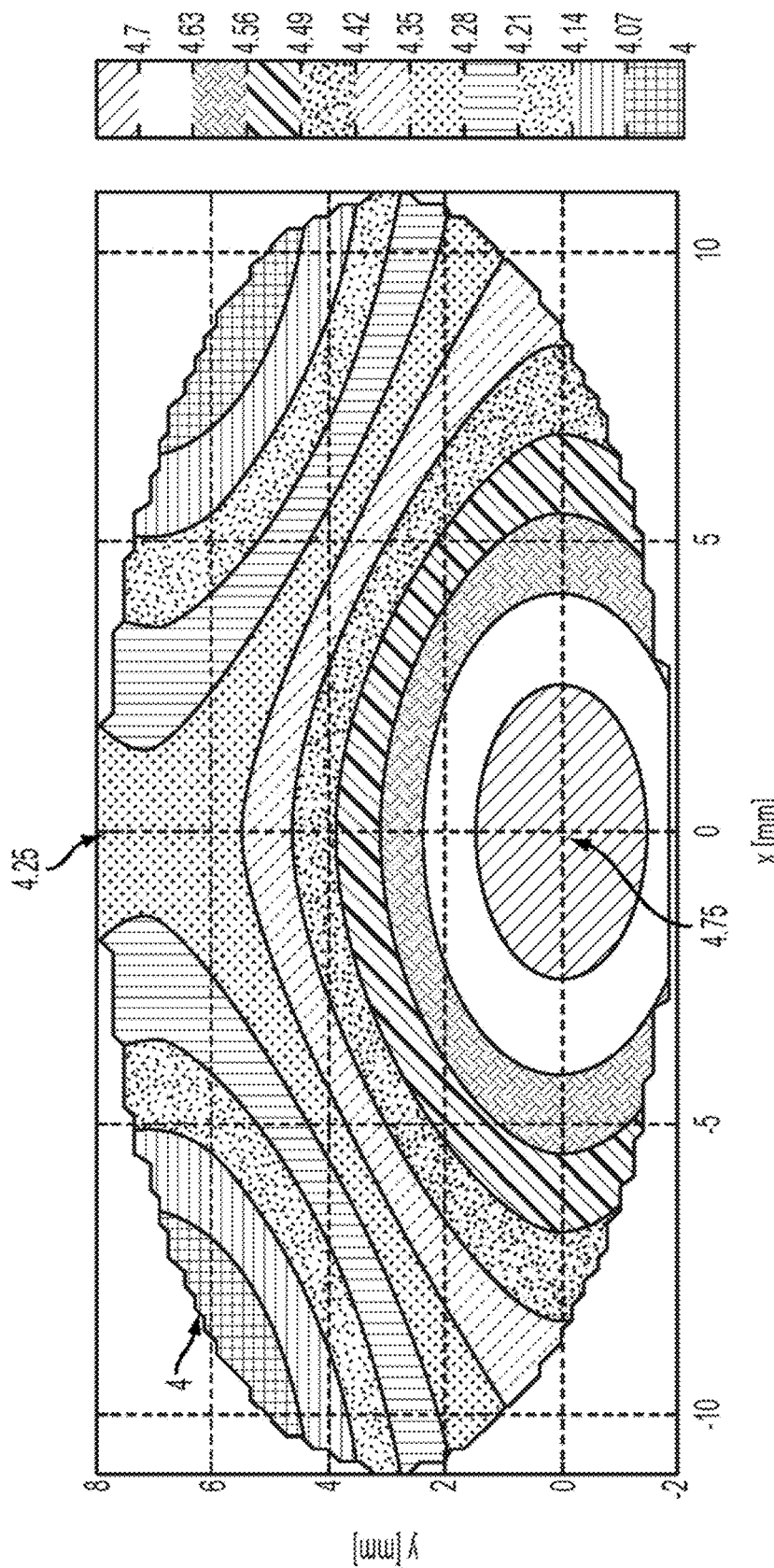

FIG. 66 illustrates a two-dimensional map of optical power distribution for an electro-active lens in accordance with an aspect of the present invention.

Figure 67:
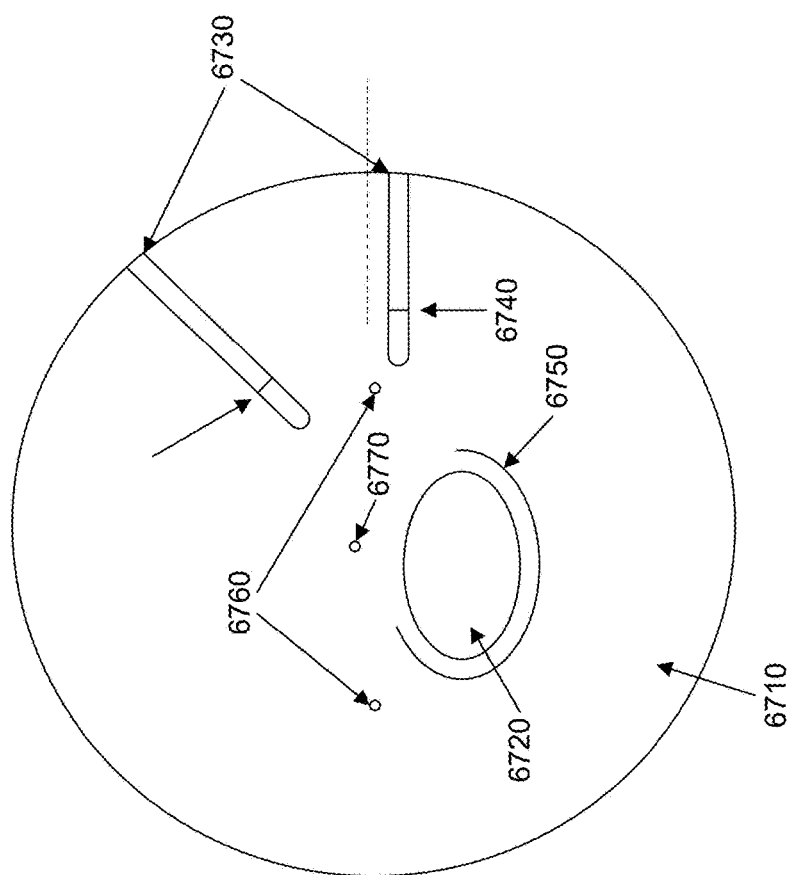

FIG. 67 illustrates a schematic of a lens fitting cut-out.

Figure 68:
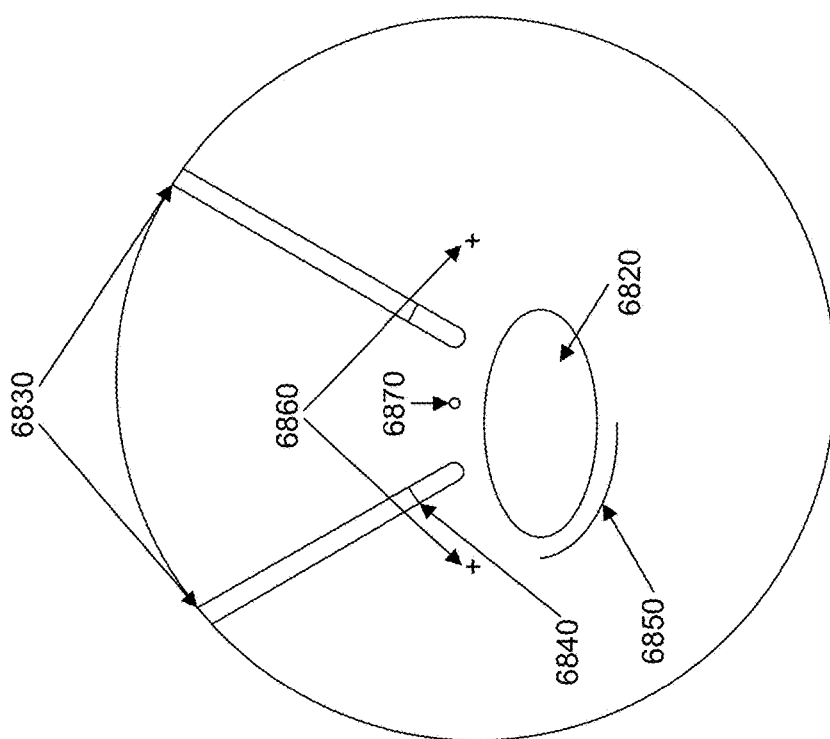

FIG. 68 illustrates a lens portion in accordance with an aspect of the present invention.

Figure 69:
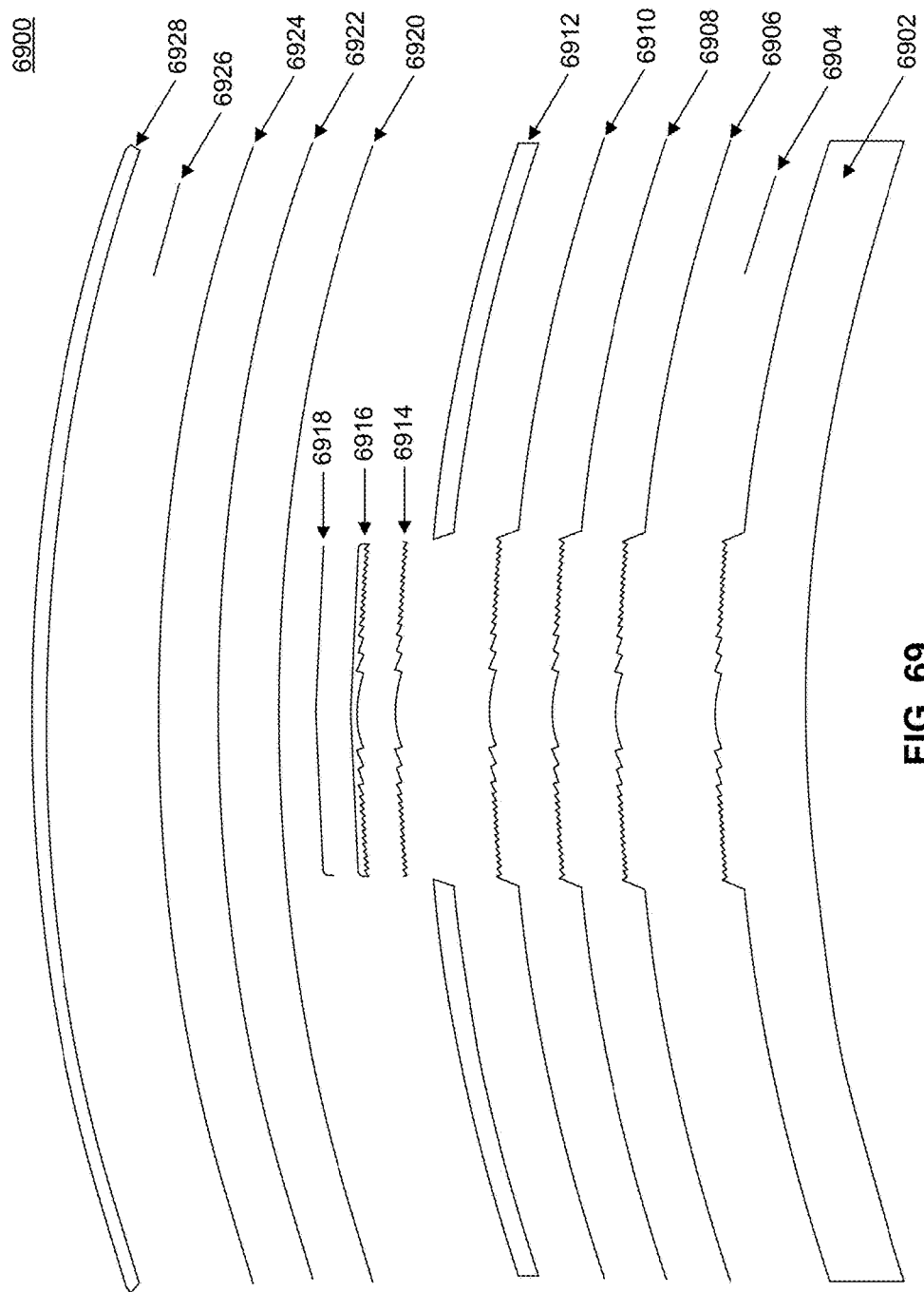

FIG. 69 illustrates a cross sectional view of the various layers of an electro-active lens in accordance with an aspect of the present invention.

Figure 70:
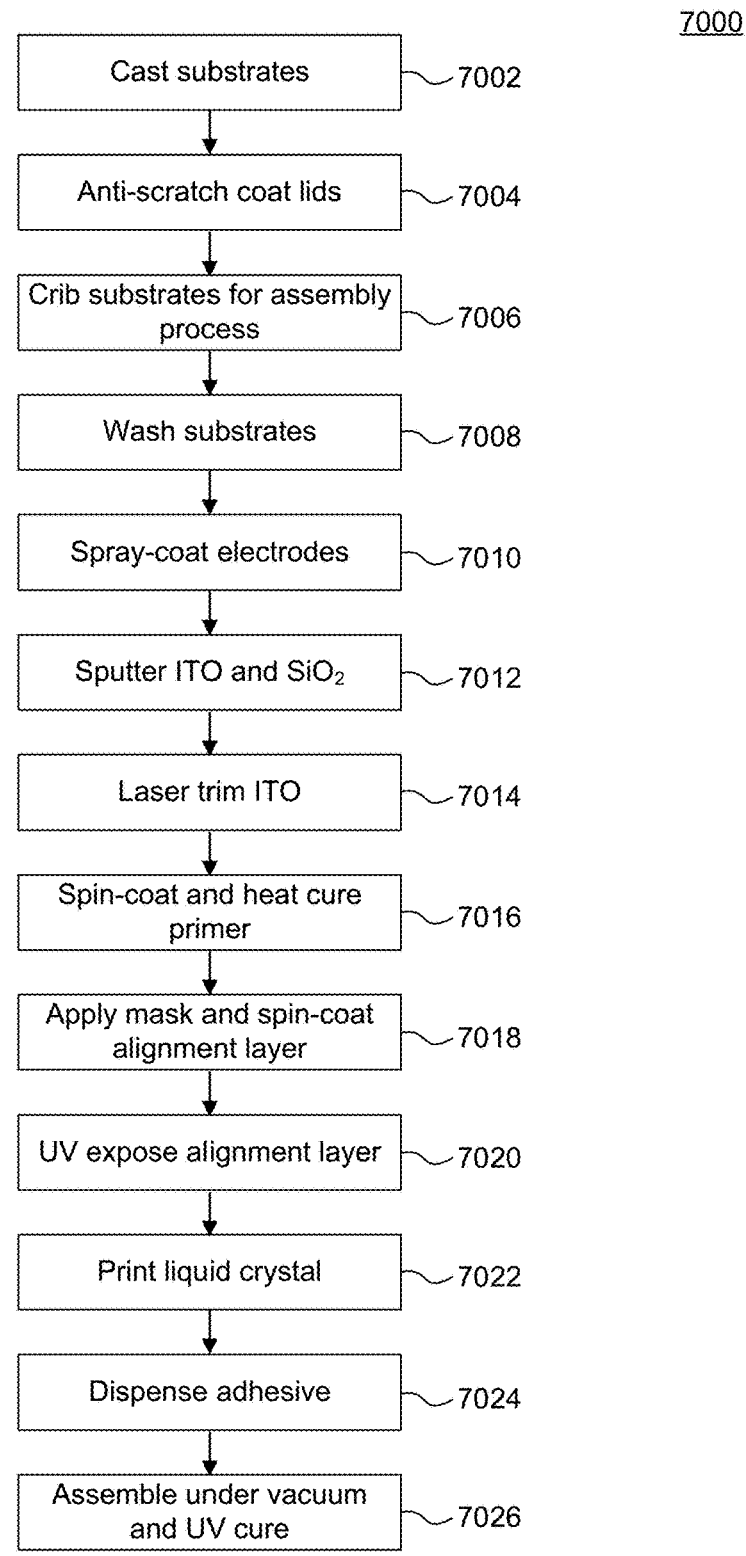

FIG. 70 illustrates a flow chart describing the steps in manufacturing an electro-active lens in accordance with an aspect of the present invention.

FIGS. 71A, 71B, 71C, and 71D illustrate portions of lens substrates during the manufacturing process in accordance with an aspect of the present invention.

Figure 72:
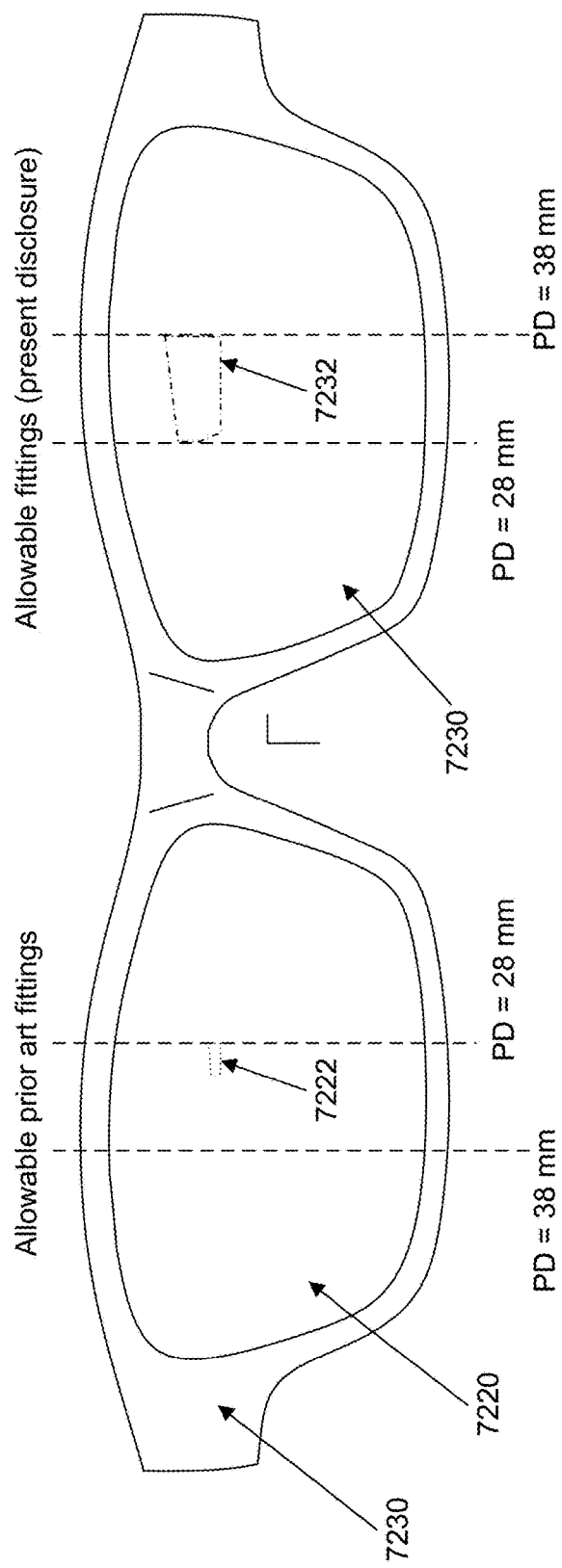

FIG. 72 illustrates a schematic of electronic eyeglasses showing the fitting regions in accordance with an aspect of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). Multiple inventions may be described. The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to implement such feature, structure, or characteristic in connection with other embodiments whether or not explicitly described.

Before describing such embodiments in more detail, however, it is instructive to present an example environment in which embodiments of the present invention may be implemented.

Electronic eyeglasses are powered by one or more small rechargeable batteries, whose operation time is normally limited. The wearer may be required to charge the battery periodically, and therefore a proper design of battery pack and its charger providing convenience for the user is preferred. Currently, the charging of electronic eyeglasses is not user-friendly. When the electronic eyeglasses are being charged the wearer cannot wear them. Thus, there is a need for a way to allow for electronic eyeglasses to be charged so that the wearer can wear the eyeglasses at all times when needed.

Embodiments of the present disclosure provide removable and rechargeable power sources which can be inserted at the end of temples. One of the power sources may be used to operate electronic components that send electrical signals to the electronic lenses. The other power source may be stored in the other temple as a replacement when the first power source has been discharged.

Figure 1A:
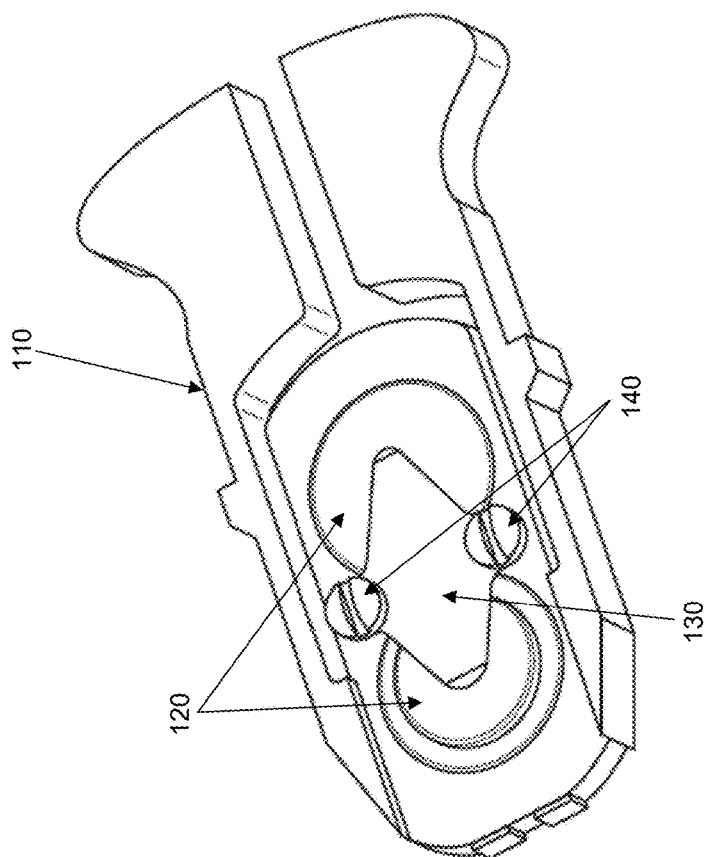
FIGS. 1A and 1B illustrate a removable power source pack for electronic eyeglasses in accordance with an aspect of the present invention.
Figure 1B:
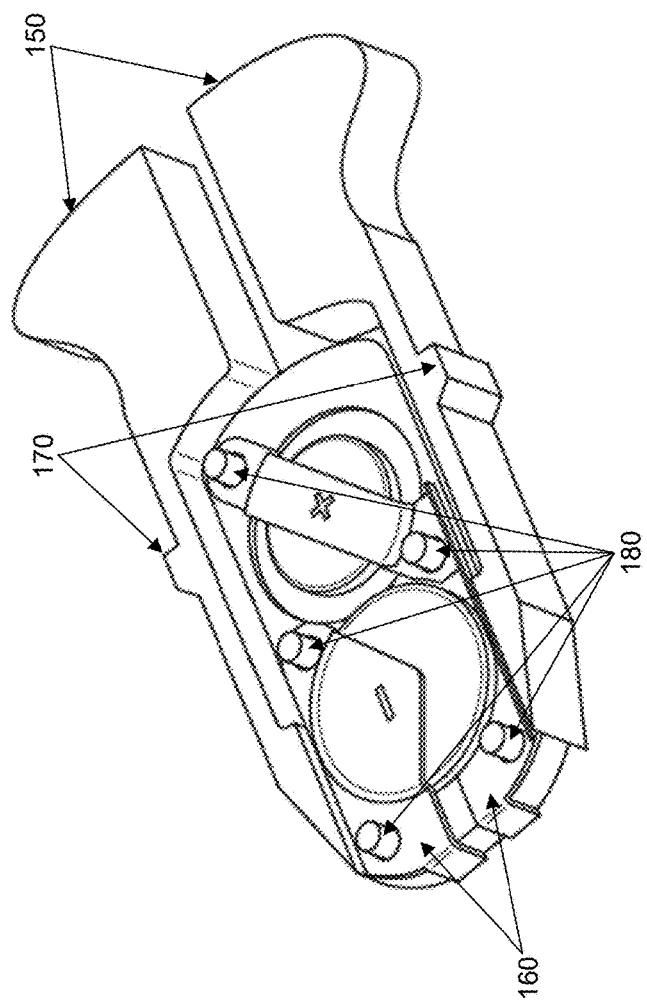

FIGS. 1A and 1B illustrate bottom and top views, respectively, of a battery pack 100 for electronic eyeglasses. In one example, the power is provided by batteries. However, it may be appreciated by one skilled in the art that other power sources such as solar cells, fuel cells or the like, may be used. Thus, the battery pack will be referred to as "power source pack" hereafter. Terms "power source" and "power source pack" may also be used interchangeably hereafter to describe a power source pack module as illustrated in FIG. 1.

Power source pack 100 comprises plastic housing 110, further comprising spring mechanical contacts 150, and batteries 120. In one example, batteries 120 may be replaced by removing contact 130, which is held in place by screw 140. Batteries 120 may be electrically coupled to various components through electrical contacts 160. In one example, electrical contacts 160 may also serve as retainers to hold batteries 120 in place. Electrical contacts 160 may be fastened by heat-stacked posts 180. Power source pack 100 may be inserted in or removed from a temple of an eyeglass frame. This is facilitated by pressing spring mechanical contacts 150.

Figure 2:
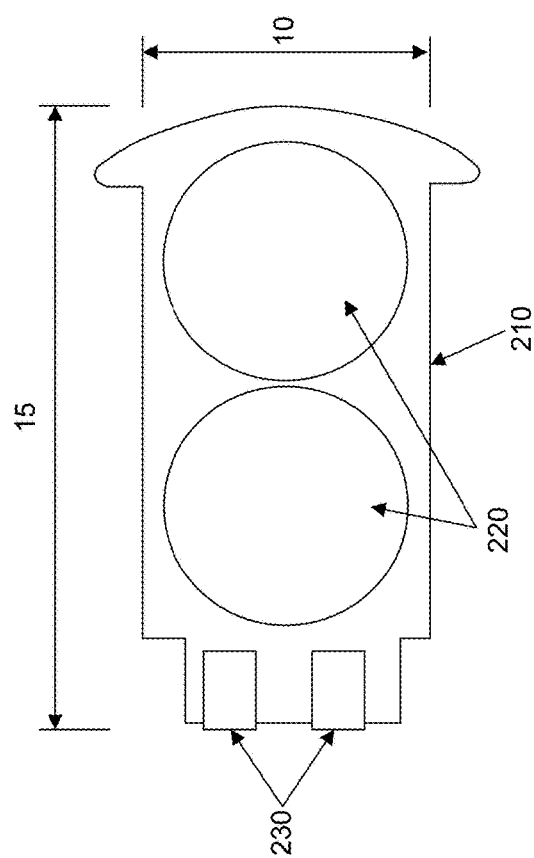
FIG. 2 illustrates a cross-sectional view of the power source pack of FIG. 1 in accordance with an aspect of the present invention.

FIG. 2 illustrates a cross sectional view of another power source pack 200 according to an embodiment of the present disclosure. Similarly to FIG. 1, power source pack 200 comprises plastic housing 210, batteries 220, and electrical contacts 230. It may be appreciated that power source pack 200 may comprise other components, not shown in this cross sectional view. In one example, power source pack 200 may 15 mm in length and 10 mm in width.

After being detached from the temple, the power source pack can be placed on a power source charger for recharging. In one example, the eyewear power source charger can charge multiple batteries (or power source packs) simultaneously and monitor the charging status of each individual battery (or power source pack). When the charger is not powered, it can function as a carrier for a wearer to store spare power sources. The wearer thus does not need to pull the power source out of the charger.

Figure 3:
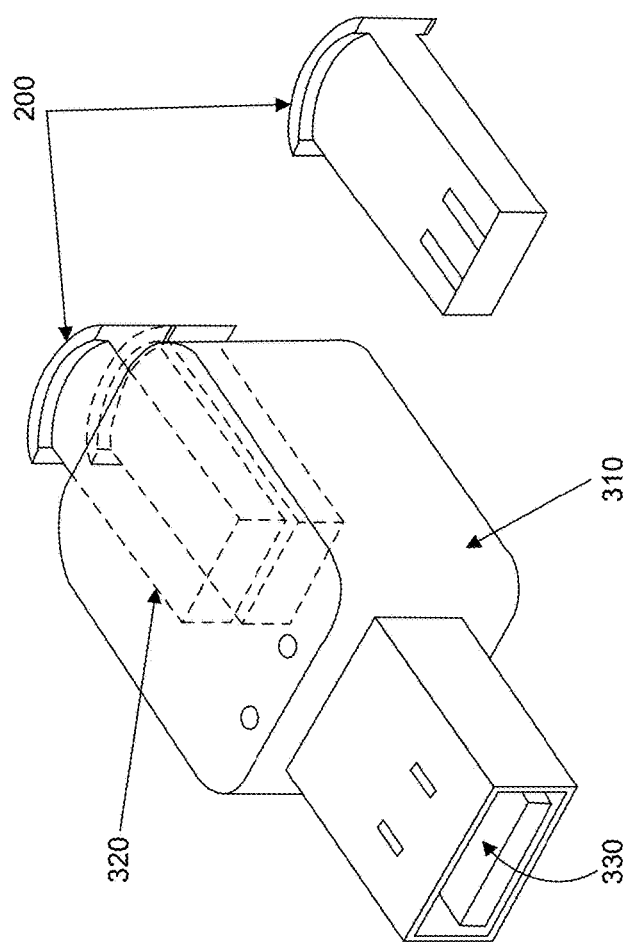
FIG. 3 illustrates a power source charger in accordance with an aspect of the present invention.

FIG. 3 illustrates a power source charger 300 in accordance with an aspect of the present disclosure. Power source charger 300 comprises battery carrier 310. Battery carrier 310 may be made of plastic or other materials. A power source pack such as power source pack 200 of FIG. 2 may be inserted in charger 300 through port 320. Power source charger 300 may also comprise a USB plug 330. USB plug 330 may enable charging of power source pack 200 directly onto portable electronic devices, such as a lap top computer or the like. Power source charger 300 may also be portable and may be conveniently carried by a wearer to re-charge the power source when needed.

Figure 4:
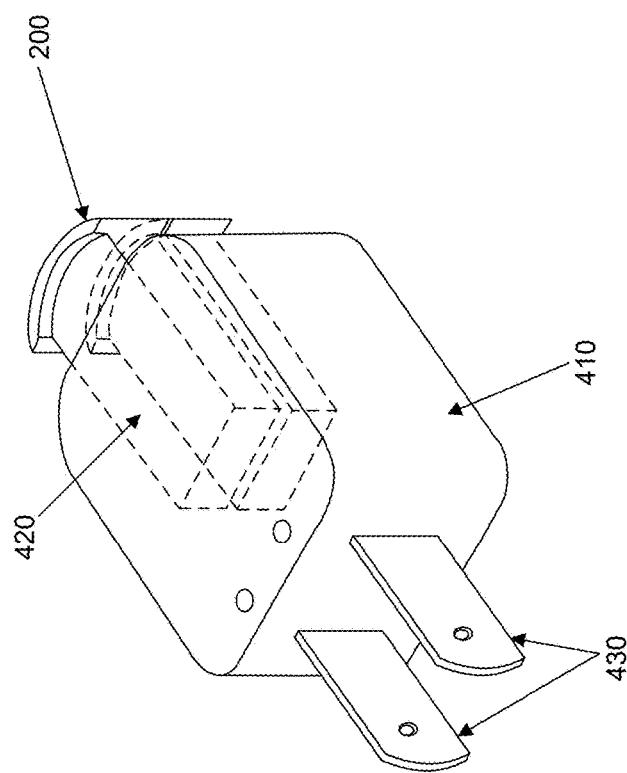
FIG. 4 illustrates a power source charger in accordance with an aspect of the present invention.

FIG. 4 illustrates another power source charger 400 in accordance with another aspect of the present invention. Power source charger 400 comprises battery carrier 410. Battery carrier 410 may be made of plastic or other materials. A power source pack such as power source pack 200 of FIG. 2 may be inserted in charger 400 through port 420. Power source charger 400 may also comprise a wall power connector 430. In one example, wall power connector 430 may be configured to connect to a 110 V or a 220 V grid. It may be appreciated by one skilled in the pertinent art that power source charger 400 may be adapted to connect to various power grids. Power source charger 400 may also be portable and may be conveniently carried by a wearer to re-charge the power source when needed.

Figure 5:
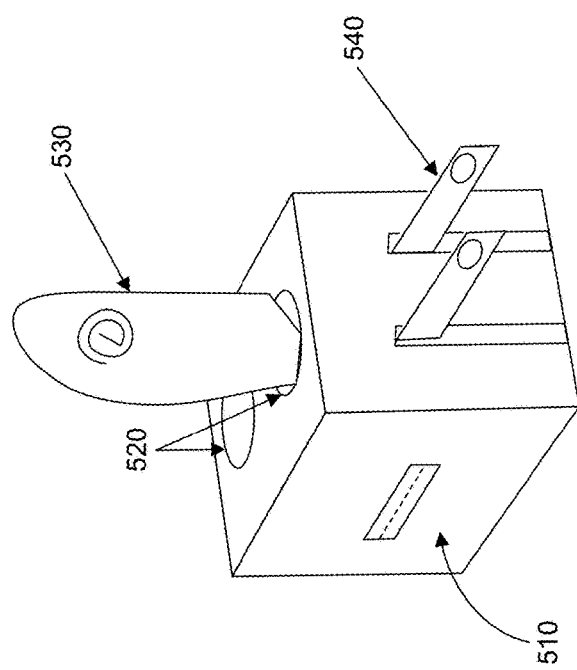
FIG. 5 illustrates a power source charger in accordance with an aspect of the present invention.

FIG. 5 illustrates another power source charger 500 in accordance with an aspect of the present invention. Power source charger 500 comprises carrier 510 and charging ports 520. In one example, a power source is housed within a removable part of the temple 530. Removable part 530 may be detached from the temple and placed inside charging ports 520. A wall outlet 540 may be used to connect power source charger 500 to an electrical grid. It may be appreciated by one skilled in the art that a USB plug similar to plug 330 may be used alternatively.

In addition to a power source, electronic eyeglasses may comprise various other electronic components, such as, by way of example only, a control module, an antenna, an alarm indicator, and a display screen. These components can be embedded on the temple, or inserted into cavities made in the temple. It is often required to have conductive connections though the temple to connect the various electronic components.

Power source packs as those presented in embodiments of FIGS. 1-5 may be used to power electronic components that comprise an integrated electronic assembly.

In one embodiment, a device which has an integrated electronics assembly is provided. The integrated electronics assembly includes an electronic control module and first conducting link adapted to couple the electronic control module to a connector adapted to connect to a power source. The integrated electronics assembly also includes a second conducting link coupled to the electronic control module. The second conducting link has an insulating material and a first and a second exposed conductive region in the insulating material.

In one embodiment, the first and second conducting links are integrably attached to the electronic control module.

In one embodiment, the first and second conducting links are flex cables. In one embodiment, the first and second conducting links are placed between first and second insulating layers in flex cables.

In one embodiment, the first conducting link has a conducting tube encased by an insulating material, a first electrical connector coupled to the power source, and a second electrical connector coupled to the electronic control module. The electronic control module is in turn integrably attached to a flex cable.

In one embodiment, the first conducting link, the electronic control module, and the second conducting link are made of high temperature resistant materials.

In one embodiment, the power source includes one or more power source devices

In one embodiment, the electronic control module is powered by the power source.

In one embodiment, the integrated electronics assembly is configured to be integrated into a pair of eyeglasses.

In one embodiment, the device is a pair of eyeglasses. The eyeglasses may have a temple, configured to house the power source, a frame front rotatably attached to the temple by a hinge, and a lens. The lens has a plurality of electrical connectors disposed along a top edge of the lens.

In one embodiment, the first conducting link runs through the temple and couples the power source to the electronic control module.

In one embodiment, the second conducting link runs through the temple and the frame front and couples the electronic control module to the plurality of electrical connectors of the lens. The second conducting link may provide a plurality of electrical signals to the lens.

In one embodiment, the first and second conducting links have respective first and second service loops. The first and second service loops are configured to adjust to the geometry of the temple and the frame front. For example, the top circumference of a lens may vary between designs, and more or less cable may be needed along that circumference. This service loop allows for a single conducting link length to accommodate a range of different circumferences.

In one embodiment, the first conducting link, the electronic control module and the second conducting link are injection molded into the temple during manufacturing of the temple.

In one embodiment, the power source is removable and rechargeable and the lens is an electronic lens.

In one embodiment, the integrated electronics assembly is sealed inside a cavity of the temple with a cover. According to various embodiments, the cover is snap-fit into the cavity of the temple, ultrasonically welded onto the temple, laser welded onto the temple, or glued onto the temple.

According to one embodiment, the frame of the eyeglasses may be injection molded at high temperature. It is generally a challenging task to install the connection components or wires after the temple is made. However, it is also challenging to mold the conventional electronic connection components into the temple since the most conventional insulation materials will be damaged during the injection molding process.

In an example, a temple insert may be made prior to temple production and placed in the mold before the injection process. A temple insert may comprise high temperature resistant materials. By way of example only, these may include: (a) a high temperature Kapton cable which consists of several conductive insulated wires, (a) a stainless tube which allows the conductive wires going through, and (c) metal contact components or the metal components of holding the connectors.

One embodiment of the temple insert includes a contact cable, such as a Kapton Insulated Thermocouple Wire, and metal contact pieces which are welded on the wires. Therefore two electronic components, by way of example only, a power source pack and a control module can be connected through the temple insert. A temple insert is pre-made with high temperature resistant materials. The high temperature Kapton cable consists of several conductive insulated wires. The metal tube may be made of stainless steel, which allows the conductive wires to go through.

Figure 6A:
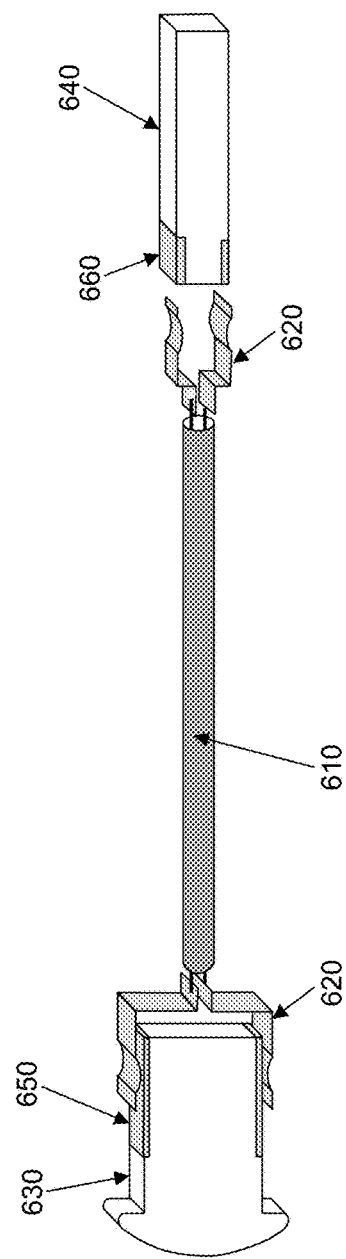
FIGS. 6A and 6B illustrate temple inserts and electronics assemblies in accordance with an aspect of the present invention.

FIG. 6A illustrates a temple insert 600 with its electronics assembly according to an embodiment of the present invention. Temple insert 600 includes contact cable 610, which may be a Kapton Insulated Thermocouple Wire. Contact cable 610 has two metal contact pieces 620 coupled to each end of contact cable 610. Metal contact pieces 620 may be welded to contact cable 610.

One of metal contact pieces 620 is coupled to a power source 630. The other metal contact piece 620 is coupled to an electronic control module 640. Power source 630 has metal contact 650 to facilitate electrical connectivity to contact cable 610 through contact piece 620. Similarly, electronic control module 630 has a metal contact 660 to facilitate electrical connectivity to contact cable 610 through contact piece 620. Metal contacts 650 and 660 may be plated onto power source 630 and electronic control module 640, respectively. In an embodiment, metal contacts 650 and 660 may be made of gold, but they are not limited to this material.

Figure 6B:
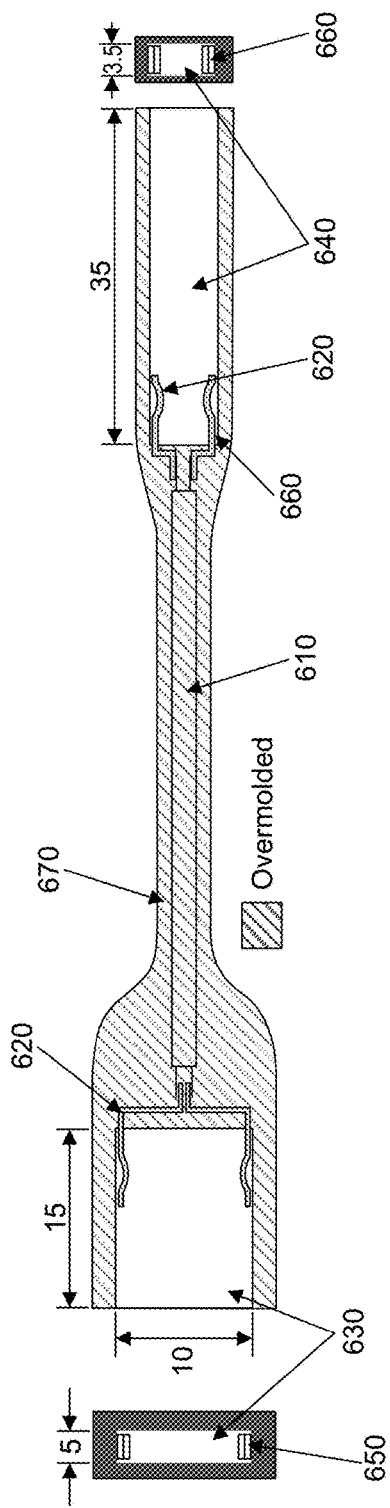

FIG. 6B illustrates a cross-sectional view of the temple insert 600. In this figure, temple insert 600 has been over-molded (embedded) by overmolded material 670. FIG. 6B also shows relevant dimensions for the various components of temple insert 600. In one embodiment, power source 630 may be 15 mm in length and 10 mm in width, while metal contact 650 may be 5 mm in width. Electronic control module 640 may be 35 mm in length, while metal contact 660 may be 3.5 mm in width.

One embodiment for a temple insert according to the present disclosure includes two metal boxes for mounting conventional connectors. The metal boxes are welded on a stainless tube. After the temple insert is over-molded in the temple, the conventional connectors can be inserted and stabilized in the boxes. The temple insert provides a reliable connection between a power source pack and electronic control module that are mounted on both ends of the temple. According to this embodiment, the wires may be inserted into the tube after the tube is over-molded in the temple.

Figure 7A:
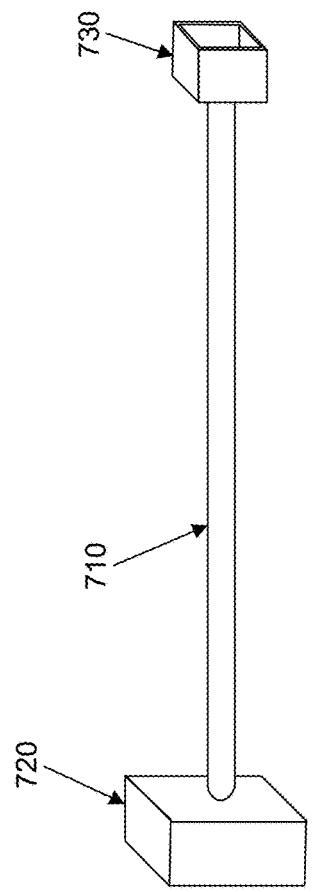
FIGS. 7A and 7B illustrate temple inserts and electronic assemblies in accordance with an aspect of the present invention.

FIG. 7A illustrates a temple insert 700 according to an embodiment. Temple insert 700 includes metal tube 710, which may be welded to metal box 720 and metal box 730.

Figure 7B:
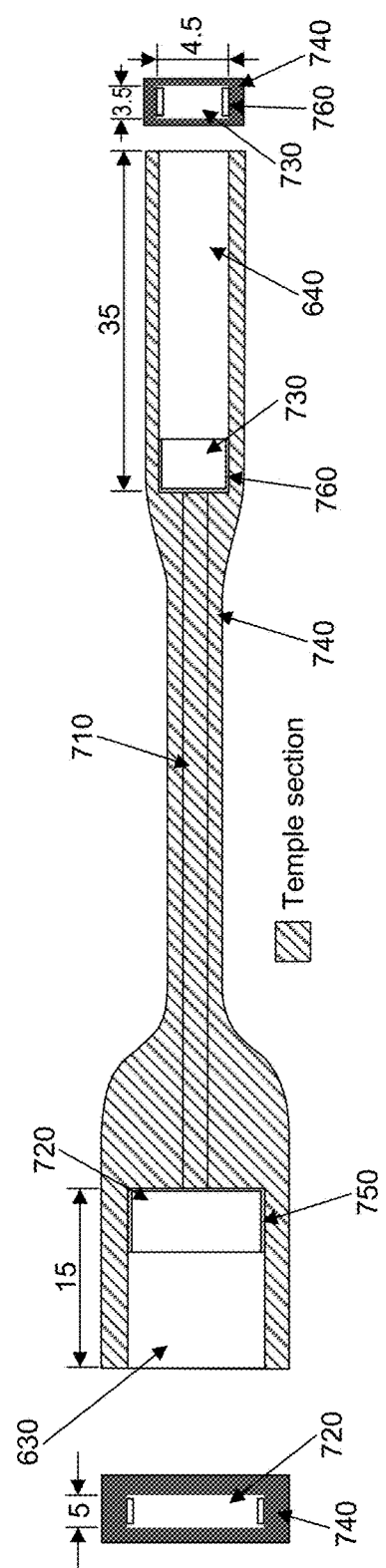

FIG. 7B illustrates a cross-sectional view of metal insert 700 after it has been over-molded in a temple by over-molding material 740. The metal insert is also coupled to power source 630 and electronic control module 640. As in FIG. 6B, length and width of power source 630 may be 15 mm and 100 mm, respectively. Similarly, the length and width of electronic control module 640 may be 35 mm and 4.5 mm, respectively. Internal metal contacts 750 and 760 cover the internal surface of metal boxes 720, and 730 respectively. Metal contact 750 facilitates electrical connectivity to power source 630, and metal contact 760 facilitates electrical connectivity to electronic control module 640. In one embodiment, metal contact 750 may have a width of 5 mm, while metal contact 760 may have a width of 3.5 mm.

Figure 8A:
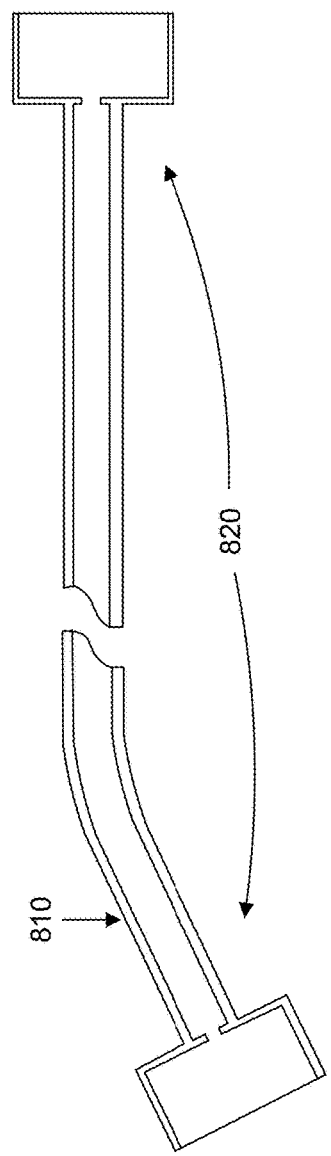
FIGS. 8A and 8B illustrate an electrical conduit for an eyeglass frame temple in accordance with an aspect of the present invention.

FIG. 8A illustrates a metal conduit assembly 800 comprising a tube 810 and metal boxes 820. In an embodiment, metal conduit assembly 800 may be insert-molded into a temple thereby forming a tube through which electrical conductors may be routed.

Figure 8B:
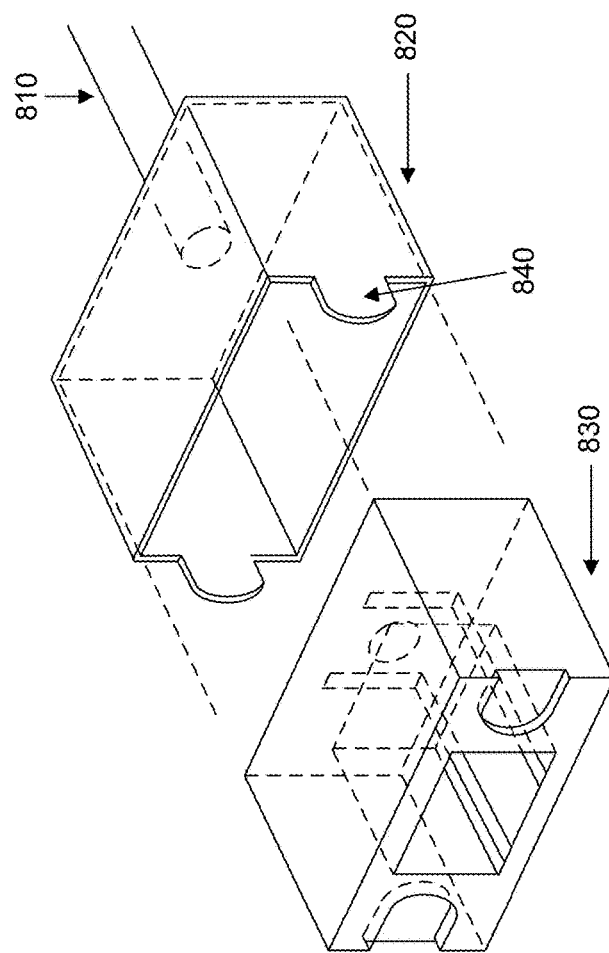

FIG. 8B illustrates a part of metal conduit assembly 800 configured to terminate the electrical connection to metal box 820. Metal tube 810 may be welded to metal box 820. Metal box 820 is coupled to connector block 830 through tab 840, which may be used to secure contact to connector block 830.

Electronic eyeglasses receive electrical signals through an electronic control module. The electronic control module is inserted in a temple of the frame and is powered by a power source through combinations or sub-combinations of embodiments presented in FIGS. 1-8.

Figure 9A:
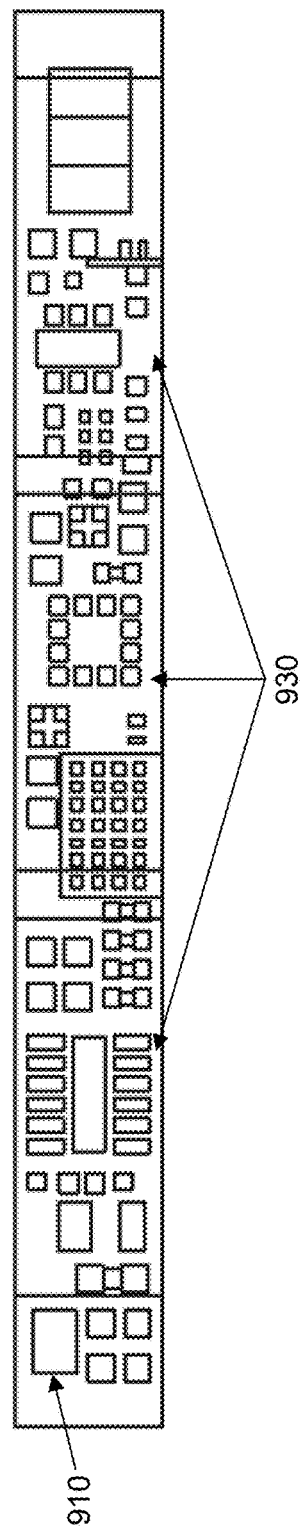
FIGS. 9A and 9B illustrate an electronic control module for electronic eyeglasses in accordance with an aspect of the present invention.
Figure 9B:
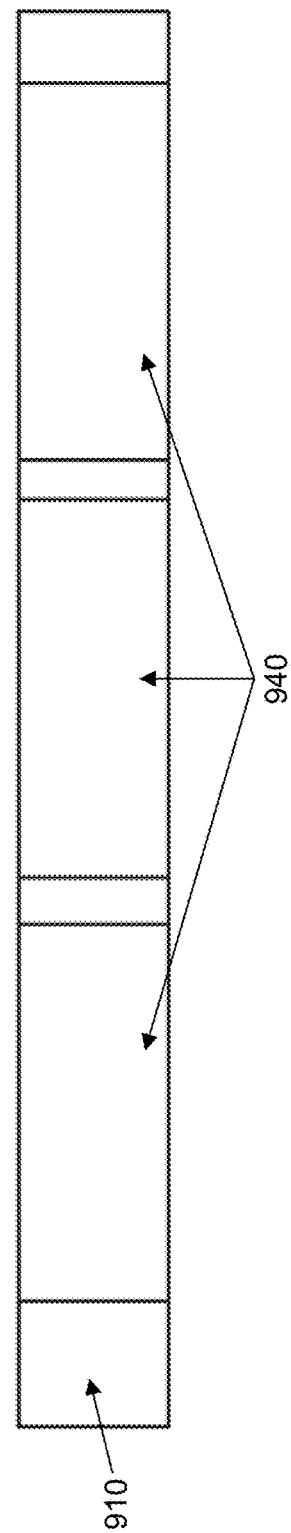

FIGS. 9A and 9B illustrate an electronic control module 900 according to an embodiment of the present disclosure. Electronic control module 900 has a circuit board 910 on which surface-mount electrical components 930 are attached to one side. Electronic control module 900 comprises capacitive touch surface components 940 situated on the opposite side of circuit board 910 populated with electrical components. These capacitive touch surface components 940 are configured to interface with the user and the surface-mount electrical components 930 upon the user's touch. Electronic control module 900 may reside on the right temple of the frame, according to an embodiment. In one implementation, electronic control module 900 may be 2 mm thick, 3 mm wide, and 30 mm long. However, dimensions may vary depending on the amount of electronic components to be mounted and the temple limitations where the module may be coupled to.

According to various embodiments of the present disclosure, electronic control modules may be connected to power sources and electronic lenses through flexible cables or "flex cables." In the most general sense, a "flex cable" includes a conductor embedded in a relatively flat insulating material, shaped like a ribbon. Because the cable is relatively flat, it is able to bend such that the flat surface becomes curved without imposing large stresses or strains on the cable or the conductor embedded within. As a result, the flex cable can be bent repeatedly without mechanical damage. Preferably, the flex cable has a flat and flexible first layer made of an insulative material. A conductor is patterned onto and bonded to the first layer to provide one or more conductive paths. Tabs can be provided at desired locations to assist with electrical connections. A second insulative layer is bonded over the patterned insulator and the first insulative layer. Where electrical contacts are desired, for example at the tabs, one or both of the insulative layers may be removed, or selectively not deposited. Preferably at least two separate conductive paths are provided. Preferably the insulative layers have sufficient thickness and appropriate materials to protect the conductive paths from exposure to the elements, such as water and perspiration.

Figure 10:
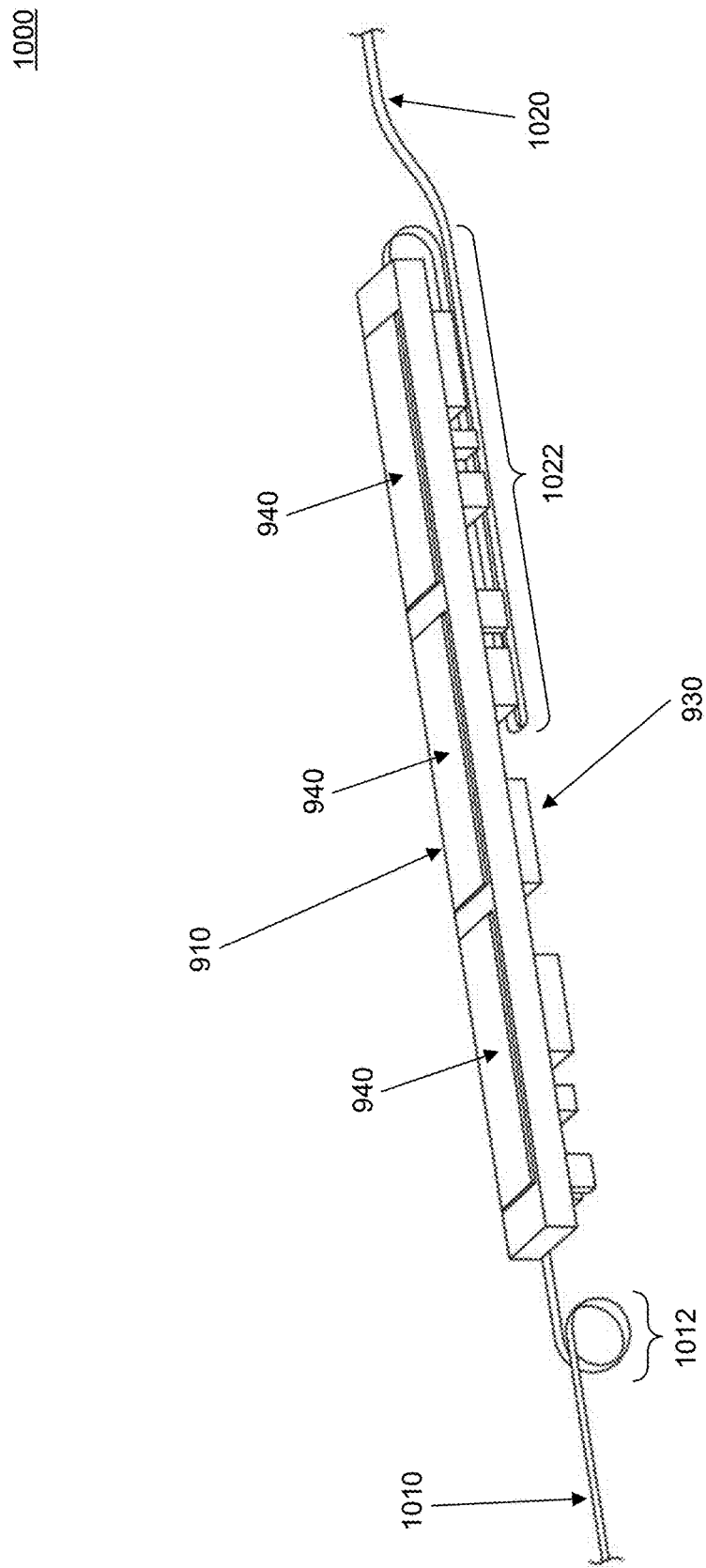
FIG. 10 illustrates another view of an electronic control module for electronic eyeglasses in accordance with an aspect of the present invention.

FIG. 10 illustrates a flex cable/electronic control module assembly 1000 wherein flex cables 1010 and 1020 are integrably attached to an electronic control module 900, according to an embodiment of the present disclosure. Circuit board 910, surface-mount electronic components 930 and capacitive touch surface components 940 are shown in FIG. 10. Flex cables 1010 and 1020 may contain two service loops: a service loop 1012 configured to provide electrical connectivity to the electronic lenses, and a service loop 1022, configured to provide electrical connectivity to a power source, such as power source pack 100 of FIG. 1.

In an embodiment, a service loop is a portion of flex cable 1010 which is configured to be adjusted to any geometry of a temple or a frame front. For example, a service loop may be folded to fit into a temple, or it may be extended for a larger path from a temple to a frame front.

Referring back to FIG. 10, flex cables 1010 and 1020 and electronic control module 900 are made in a "rigid-flex" configuration, wherein flex cables 1010 and 1020 and circuit board 910 are fabricated as a single assembly. This is done to eliminate the need to employ connectors and thereby reduce the chance for a failed connection at such an interface. Service loop 1022 shows an additional portion of the flex that might connect to a power supply, while service loop 1012 may accommodate assembly of a connector at the distal end of this portion of the "rigid-flex". In another embodiment the circuit board 910 and flex cables 1010 and 1020 may be manufactured individually and then integrated into a single piece using a process such as hot-bar soldering, wave soldering, or reflow soldering, all of which are known in the art.

The power source pack, such as power source packs 100 or 200, temple inserts such as insert 600, electrical cables such as flex cables 1010 and 1020, as well as the electronic control module, such as electronic control module 900, may be housed within the temple of the electronic eyeglasses. Therefore, there is a need for a temple design and manufacturing process that can accommodate housing of various components.

FIGS. 11A and 11B illustrate temples for eyeglass frames of electronic eyeglasses. Temple 1110 is a temple that has been used in prior art. In temple 1110, both the electronic control module and the power source were inserted within the temple. Temple 1120 is a temple according to an embodiment of the present disclosure. Temple 1120 includes removable tip 1122, which may be configured to house a removable power source. As a result, the power source does not need to be a part of the temple. Temple 1120 also includes electrical cables 1124, which provide connectivity to the electronic lenses of the eyeglasses.

Figure 12A:
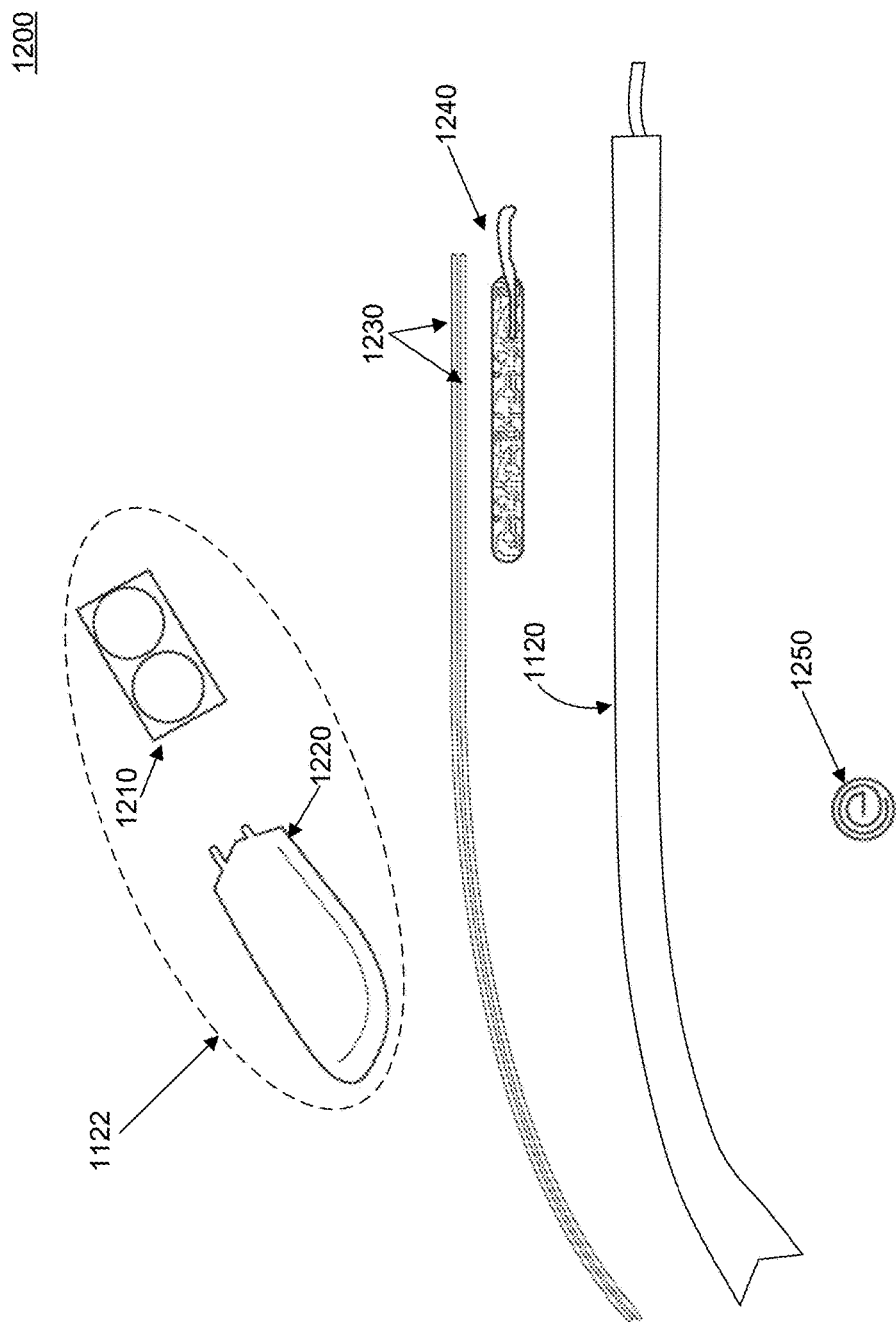
FIGS. 12A and 12B illustrate a temple and various components housed within or on the temple in accordance with an aspect of the present invention.
Figure 12B:
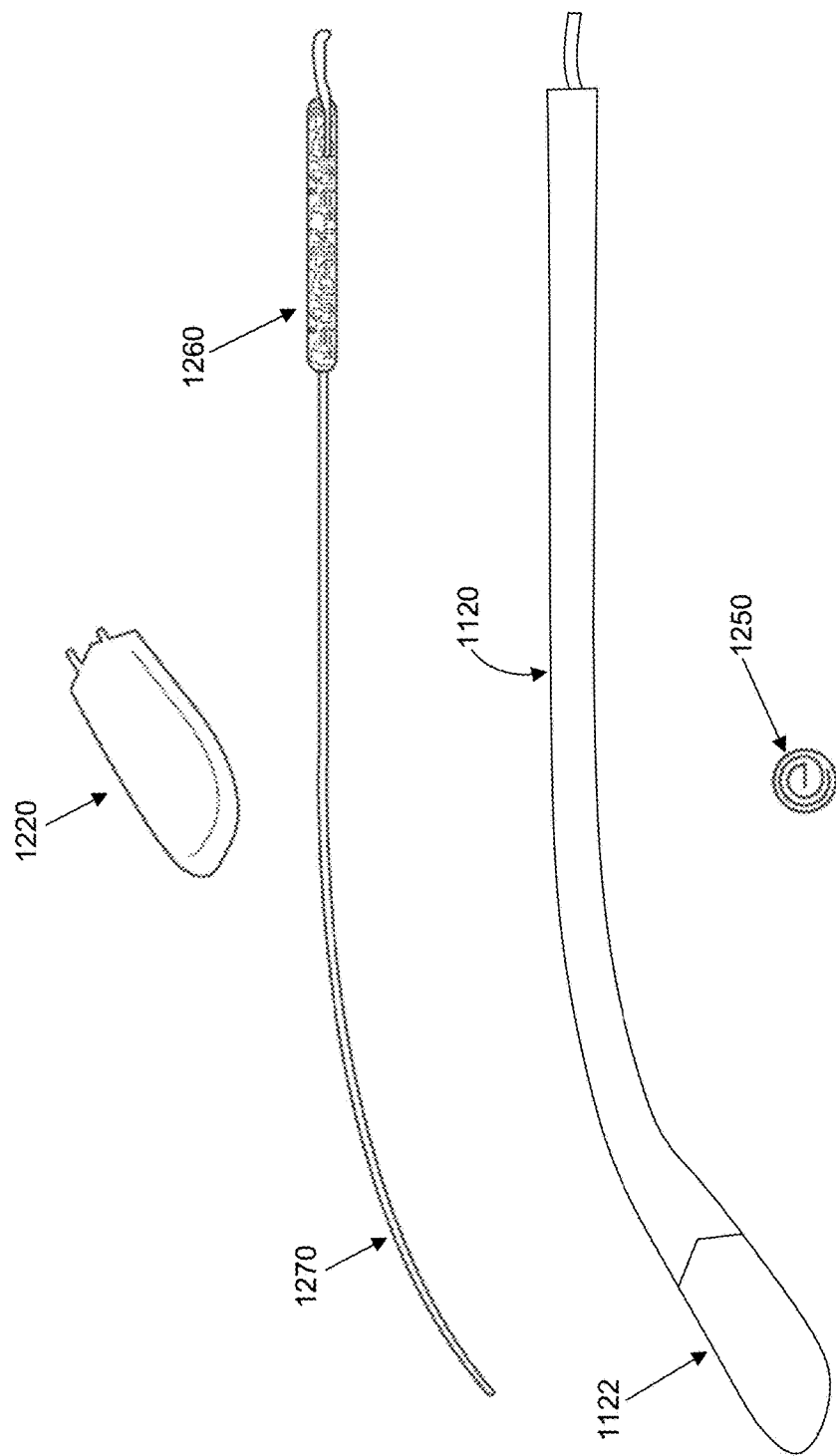

FIG. 12A is a more detailed view of temple 1120, according to an embodiment. Housed within temple 1120 is electronic control 1240, coupled to electrical cables 1230. Removable tip 1122 consists of case 1220 and batteries 1210, according to one embodiment. It is to be appreciated by one skilled in the art that permutations of the embodiments illustrated in FIGS. 1, 2 and 4 may also be used in removable tip 1122. Also shown in FIG. 12A is branding mark 1250, which in an embodiment may also be used by the wearer to turn the electronic eyeglasses on and off FIG. 12B illustrates another example of temple 1120, wherein an electronic control module 1260 coupled to one electrical cable 1270 may be used.

A desirable feature of the temple design is that the battery or power source may be removable and rechargeable such that while one battery or power source pack (containing more than one power sources connected in series or in parallel or a combination thereof) is removed and recharged, a separate battery or power source pack may be inserted. Thus, the electronic eyewear can be utilized continuously or it may always be available when needed.

The power source pack of the electronic eyewear is located within the end tip of the temple, and can be detached from the temple and placed on a charger for recharging, as illustrated earlier in FIGS. 1-5. To avoid wearer's hair being trapped in the gap between the power source pack and the temple junction, the power source is inserted into the very end or tip of the temple. In addition, the power source pack, when inserted within the temple, is sealed and is highly moisture resistant from the environment.

When batteries are used in the power source pack, they may be any type of rechargeable or single-use batteries. The connection between the power source pack and the temple can be a fixed connector, or push-push connector. The power source pack may be spring loaded such that upon pushing on the pack it may spring open and may easily be removable from the temple tip.

Figure 13B:
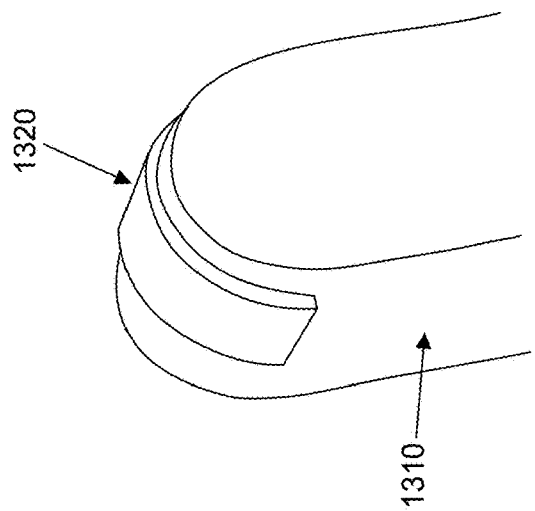
FIGS. 13A and 13B illustrate a portion of a temple with a removable power source pack in accordance with an aspect of the present invention.
Figure 13A:
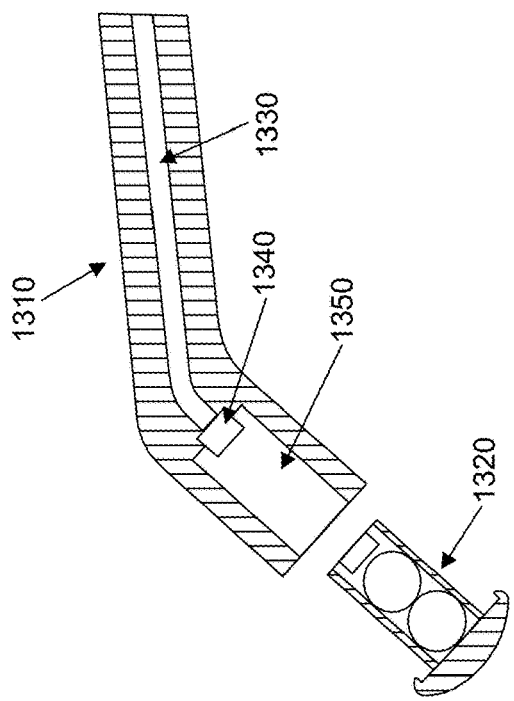

FIGS. 13A and 13B illustrate detailed views of a power source/temple tip connection 1300, according to one embodiment. Temple 1310 includes internal metal tube 1330, connector 1340, and connector box 1350, which is used to house power source pack 1320. It may be appreciated that power source pack 1320 may be the same or similar to power source packs 100 and 200 illustrated in FIGS. 1 and 2, respectively.

Figure 14:
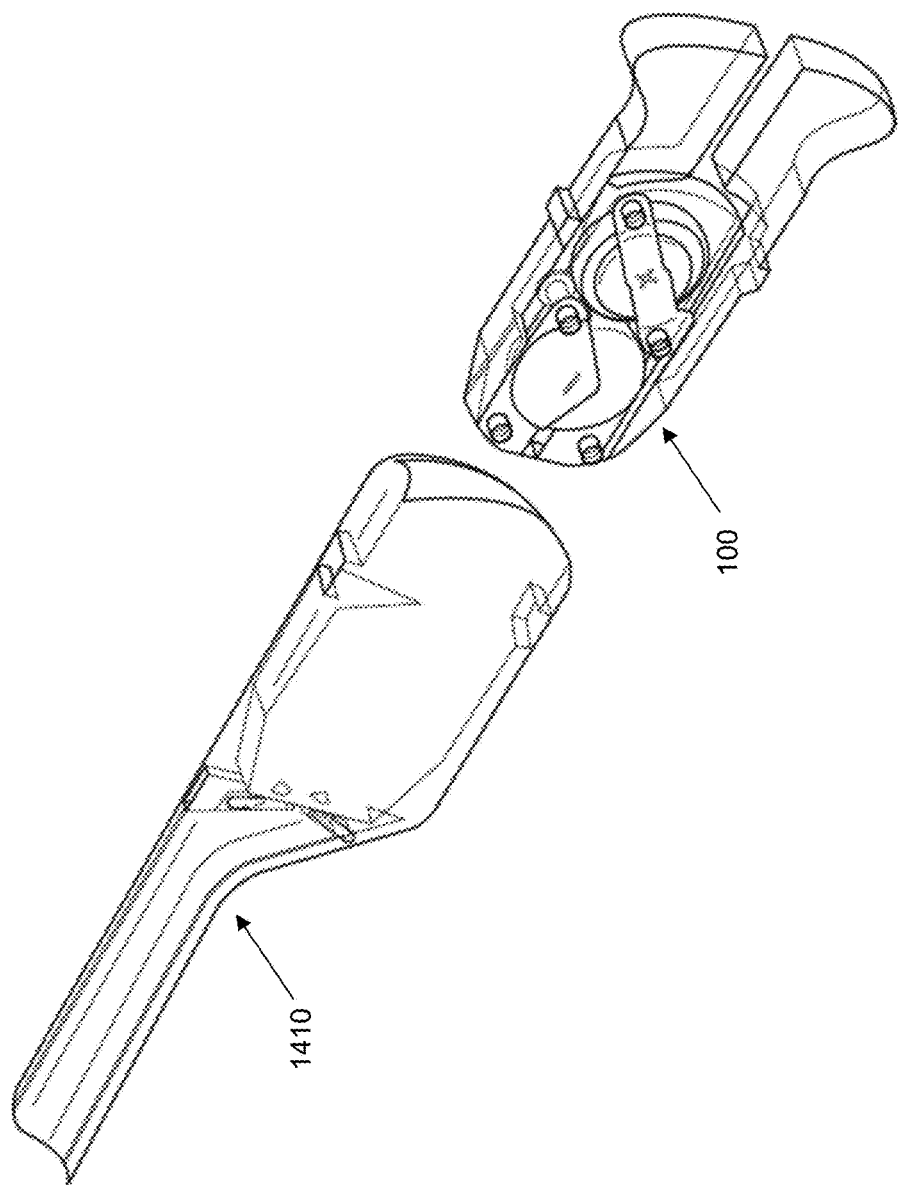
FIG. 14 illustrates a portion of a temple with a removable power source pack in accordance with an aspect of the present invention.
Figure 15:
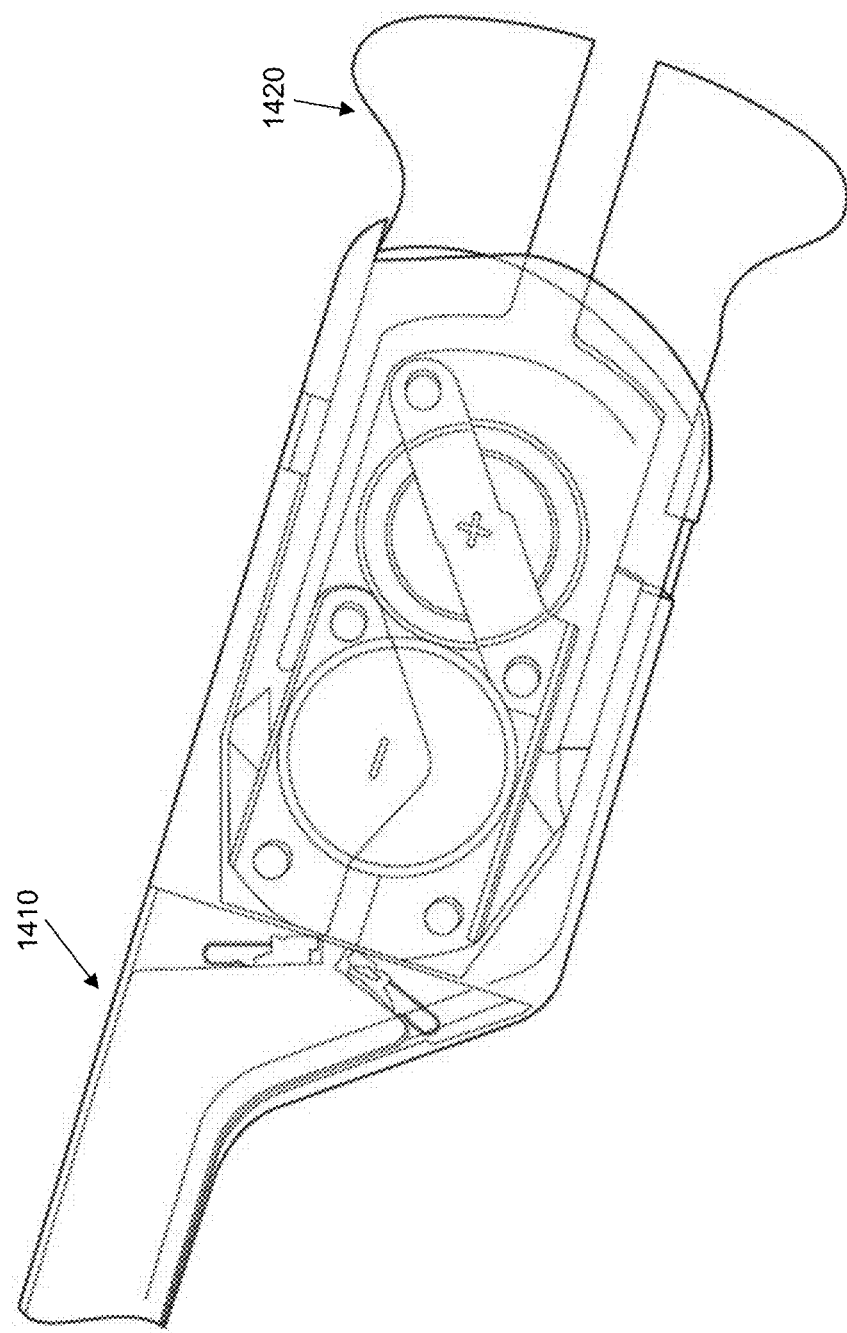
FIG. 15 illustrates a portion of the temple of FIG. 14 with the removable power source pack inserted in the temple in accordance with an aspect of the present invention.

FIGS. 14 and 15 illustrate an embodiment of a power source/temple tip assembly. FIG. 14 shows power source 100 before insertion into a temple 1410, while FIG. 15 shows power source 100 after it has been inserted into temple 1410.

While the embodiment of FIGS. 13A and 13B illustrated a configuration wherein power source pack 1320 is housed within a connector box 1350 and electrically coupled to internal metal tube 1330 through connector 1340, other schemes may employed to accommodate electrical connectivity of a power source pack to the electronics of the temple.

Figure 16:
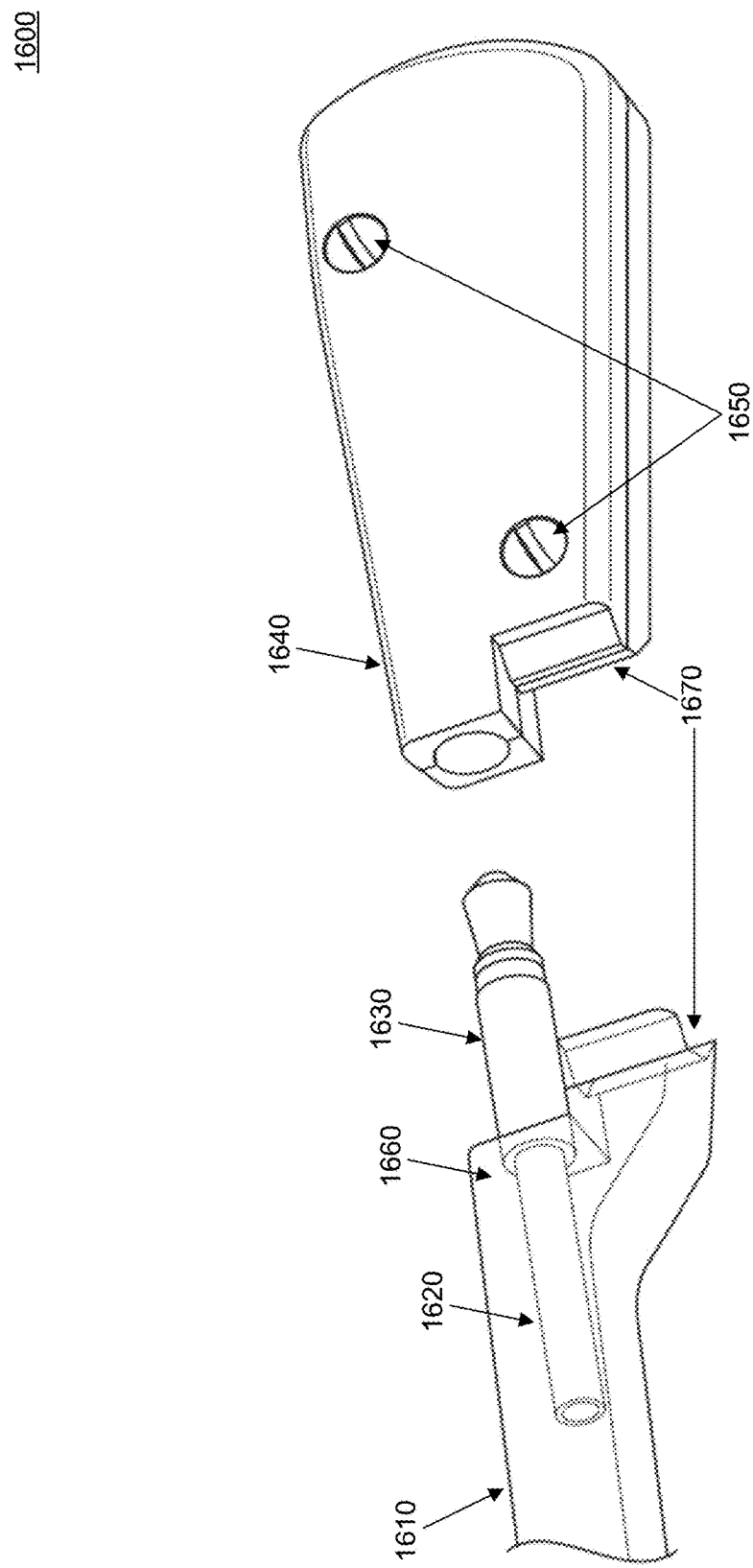
FIG. 16 illustrates a portion of a temple, a removable power source pack and the electrical connection to the pack through a phone cable, in accordance with an aspect of the present invention.

FIG. 16 illustrates an assembly 1600 according to an embodiment of the present disclosure. Assembly 1600 shows as alternate configuration to interface a temple tip 1640 to a metal conduit (tube) 1620 housed within a temple 1610, using a mono phone plug 1630. Mono phone plug 1630 may be a standard 2.5 mm plug, however other plug sizes may be possible.

In this embodiment, temple tip 1640 is molded in two pieces held together with screws 1650 to enable changing of the batteries of a power source pack. Mono phone plug 1630 is mechanically fastened to temple 1610 by a press fit 1660 into conduit 1620 that is insert-molded into temple 1610. FIG. 16 shows assembly 1610 before connection with a key and notch 1670 or other similar feature to inhibit rotation of assembly 1600 after connection.

Figure 17:
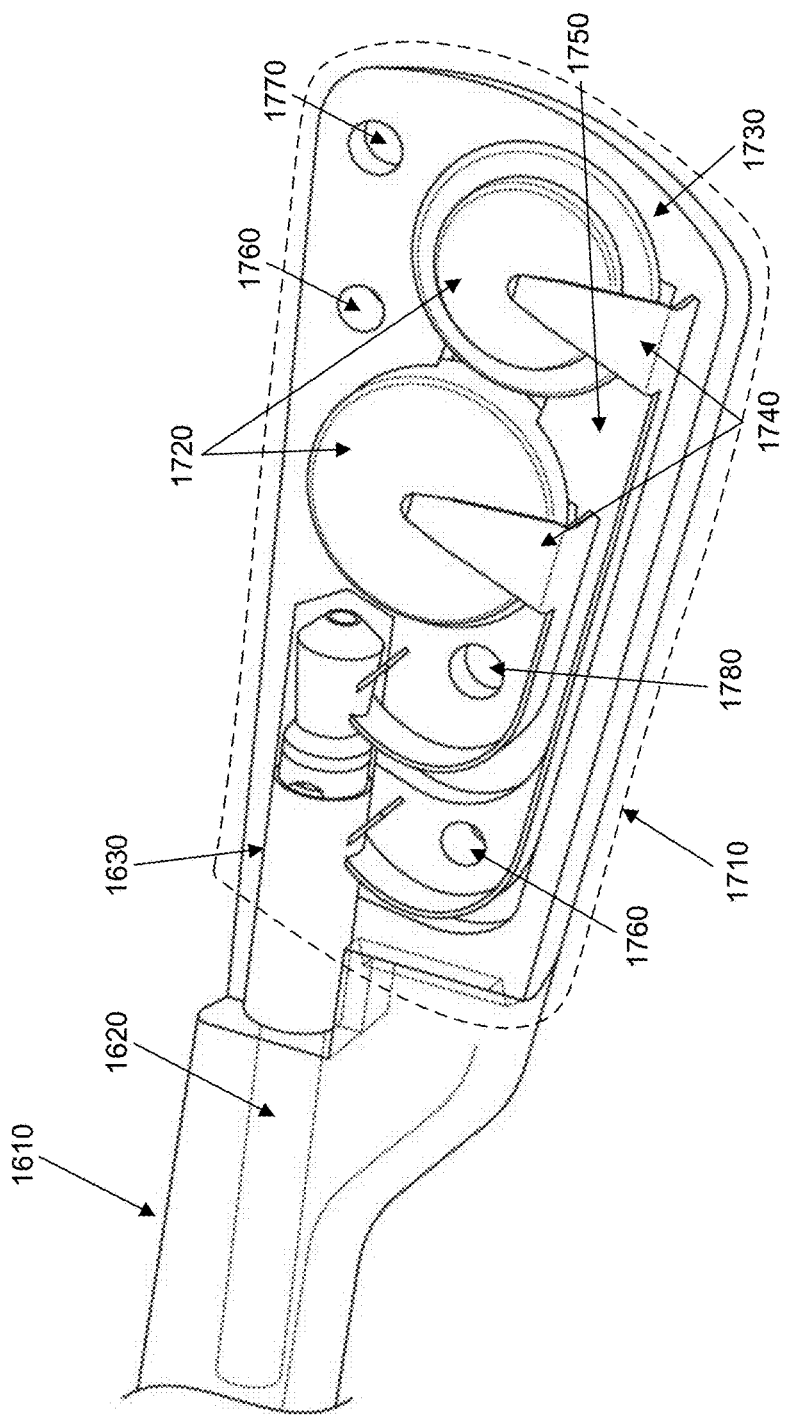
FIG. 17 illustrates the portion of the temple of FIG. 16 where the top part has been removed to illustrate the various components, in accordance with an aspect of the present invention.

FIG. 17 illustrates assembly 1600 after tip 1640 has been connected to temple 1610, according to an embodiment. For convenience, a top portion of tip 1640 has been removed to expose a portion of a power source pack 1710. Power source pack 1710 has two batteries 1720, two, long, battery-to-plug spring contacts 1740, and a single battery-to-battery contact 1750 underneath. In this embodiment, the visible portion of the housing 1730 has two through-holes 1760 for screws and two locating dowel holes 1770 for mating protrusions on the half that is not visible.

Figure 18:
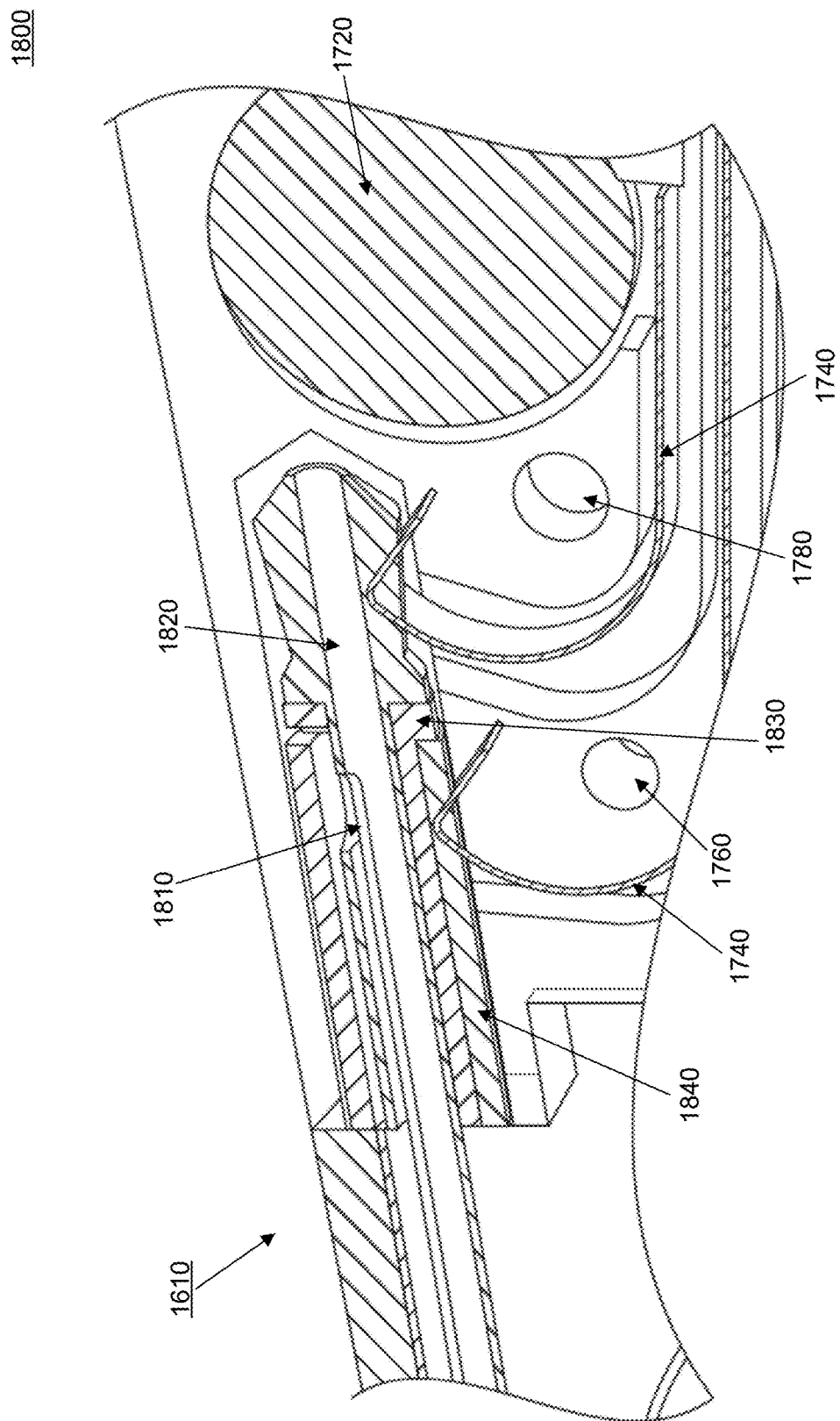
FIG. 18 illustrates the portion of the temple of FIG. 16 showing the internal structure in accordance with an aspect of the present invention.

FIG. 18 illustrates an embodiment of construction of the mono phone plug assembly 1600 that facilitates termination of a two-lead flex-circuit (not shown) or of two wires (not shown). The internal structure of temple 1610 is shown to facilitate this construction according to this embodiment.

One of the leads may protrude through to the end of the nose 1820 of the phone plug for soldering at the tip, and another lead may be fed through a channel in the insulated bushing 1810. The other lead may either be reflow-soldered to the outside barrel of the plug or fixed by a pressure-fit. The three-piece construction of the mono phone plug (nose 1820; insulator 1830; barrel 1840) may be press-fit into conduit 1620 that is insert-molded into temple 1610.

Additional methods may also be used to provide electrical connectivity from a power source pack at a tip of a temple to electronic components housed in or on the temple. According to various embodiments, conductive paths may be structured within the temple itself.

Figure 19:
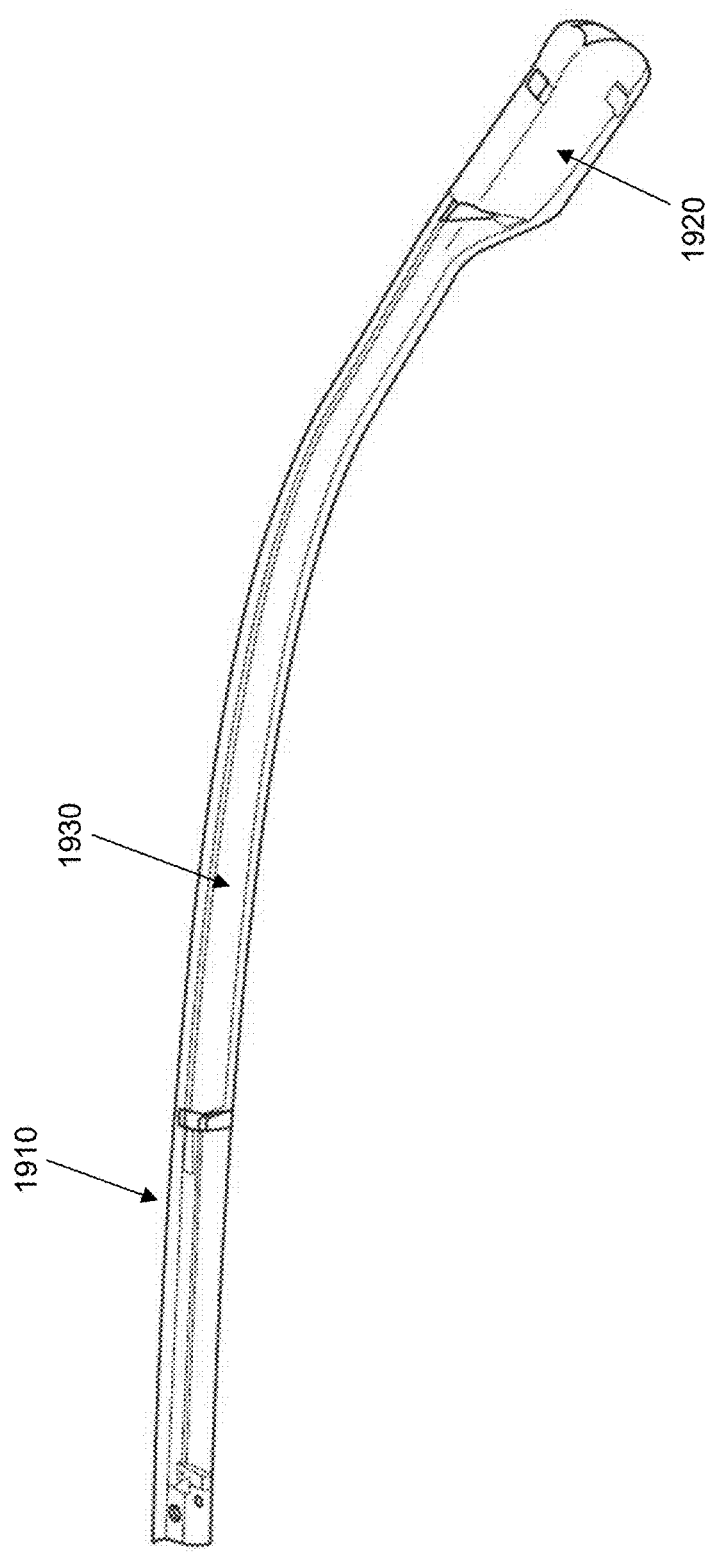
FIG. 19 illustrates a temple for electronic eyeglasses in accordance with an aspect of the present invention.

FIG. 19 illustrates a temple 1910 coupled to a temple tip 1920 through a conductive path 1930 which has been created directly on the temple itself. In one embodiment, conductive path 1930 may be created using direct laser structuring. Other methods may also be employed.

Figure 20:
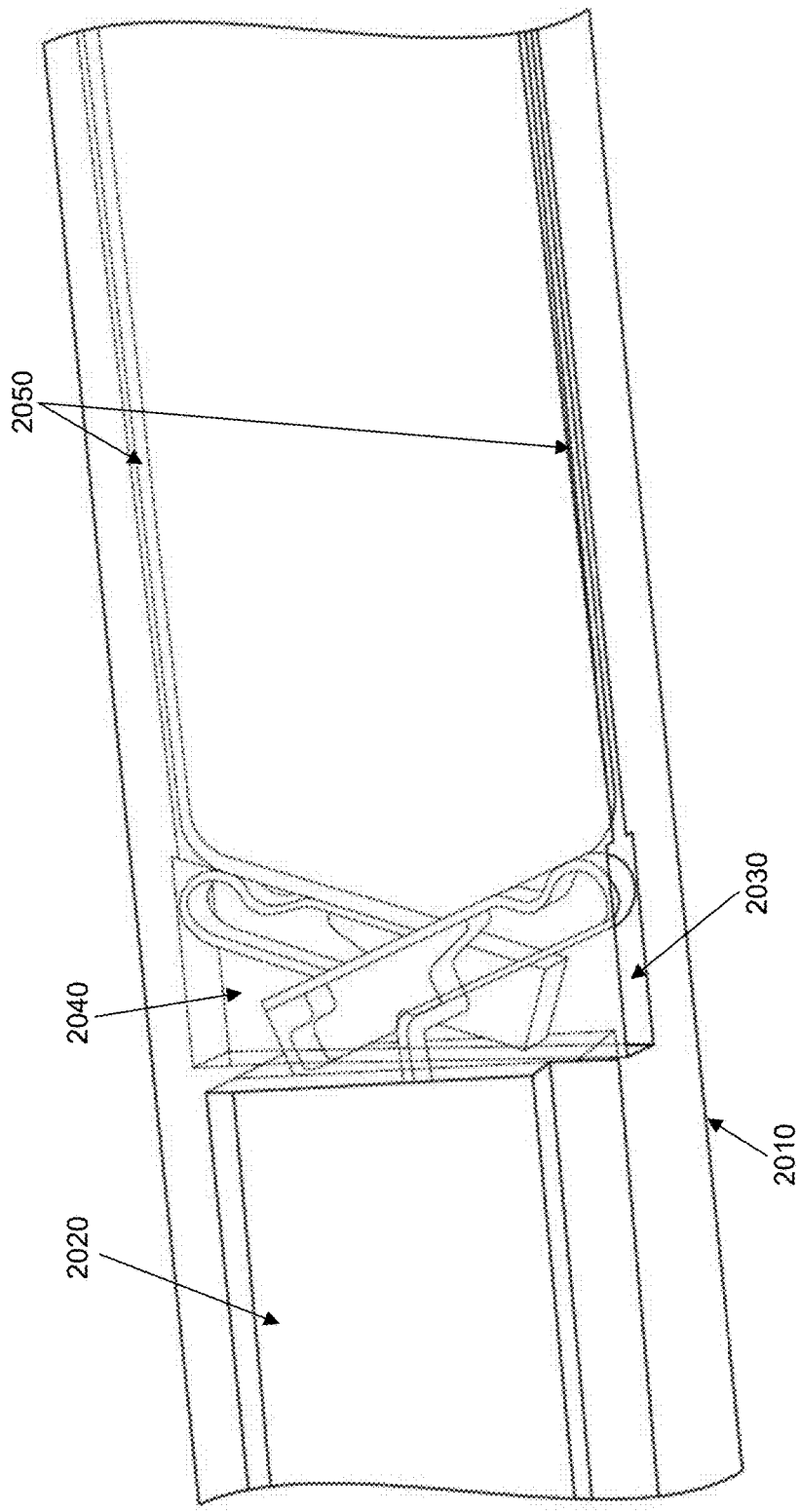
FIG. 20 illustrates a portion of a temple for electronic eyeglasses and its various components in accordance with an aspect of the present invention.

FIG. 20 shows an embodiment for an electrical connectivity scheme 2000 which uses a laser direct structuring method. An electronics module 2020 housed within a temple 2010 is in contact with electrical contacts 2040 inserted in molded cavities 2030 in the temple. Electrical traces 2050 are electrically coupled to contacts 2040.

Figure 21:
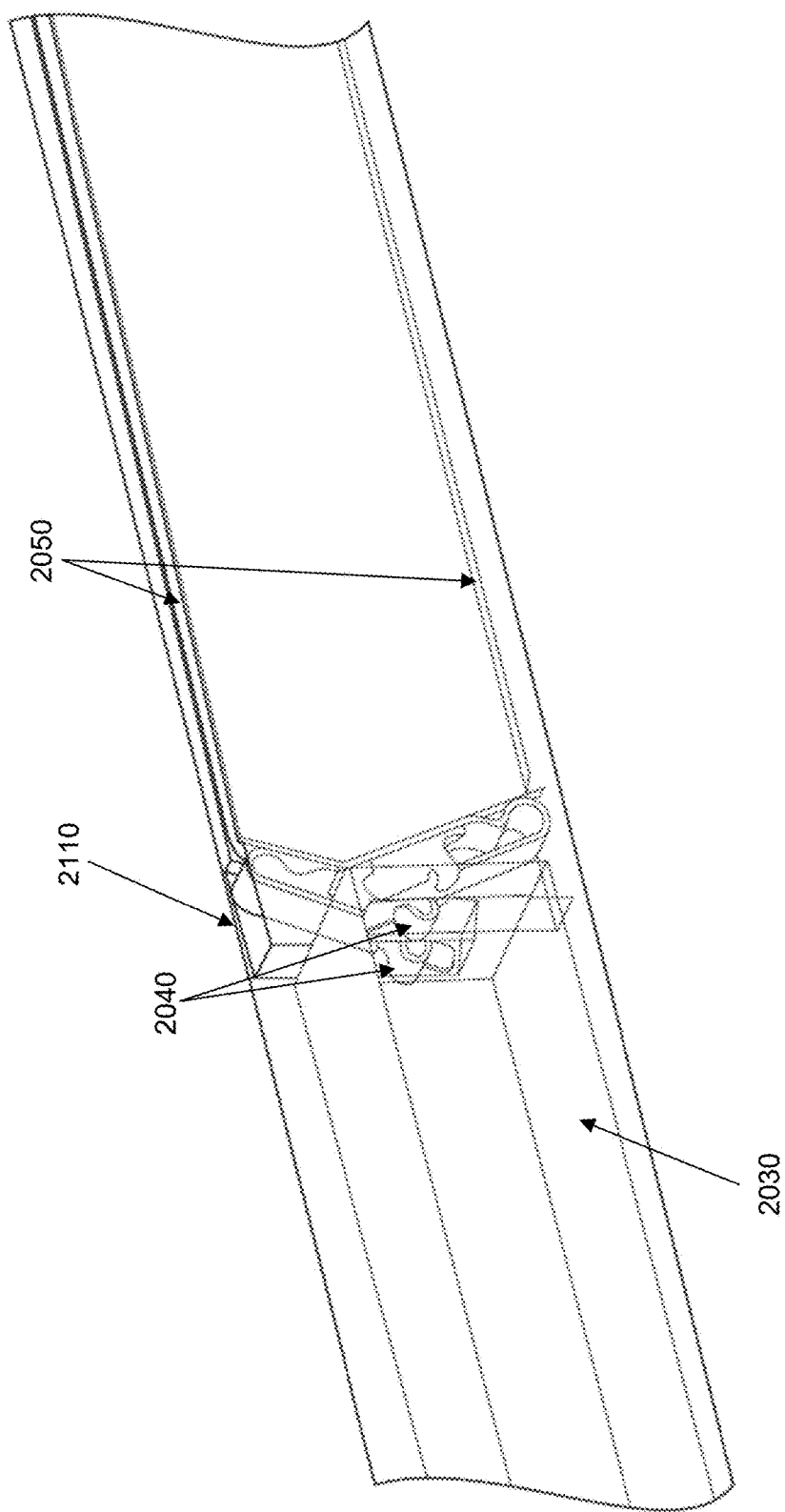
FIG. 21 illustrates another orthogonal view of the portion of the temple of FIG. 20 in accordance with an aspect of the present invention.

FIG. 21 illustrates another orthogonal view of electrical connectivity scheme 2000 wherein electronics module 2020 has been removed for illustrative purposes. Contacts 2040 protrude into cavity 2030 and reside in pockets 2110, which have been molded into temple 2010 so that they may be retained. Shown also are electrical traces 2050.

Figure 22:
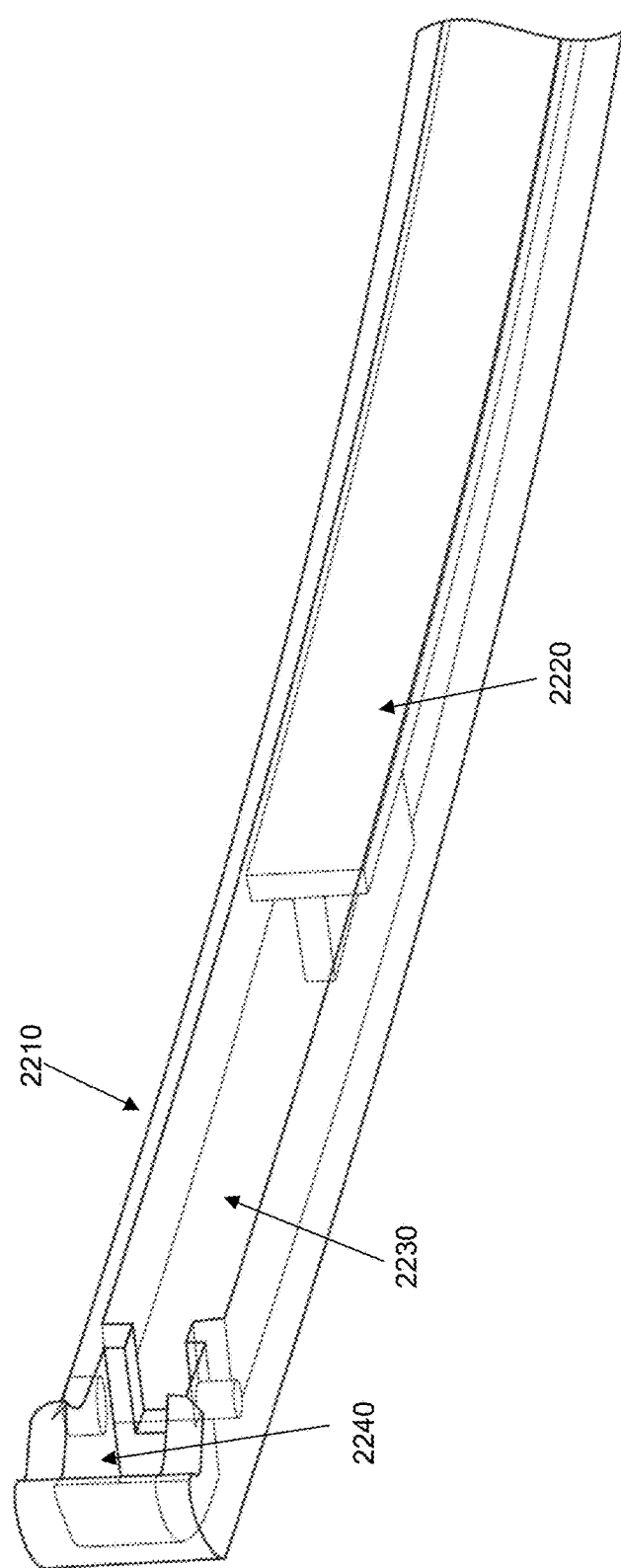
FIG. 22 illustrates a portion of a temple for electronic eyeglasses with a top surface removed and its internal structure in accordance with an aspect of the present invention.

FIG. 22 shows a two-piece temple design 2200. Two-piece temple 2200 consists of temple housing 2210 as a first part and forms a conduit 2230. Temple housing 2210 also includes hinge 2240, which may be configured to couple to a frame front (not shown). A second piece 2220 is used to cover temple housing 2210. Second piece 2220 may be a snap-in, or otherwise attached, cover or bus. For example, it may be laser-welded, ultrasonically-welded, or glued onto temple 2210.

Figure 23B:
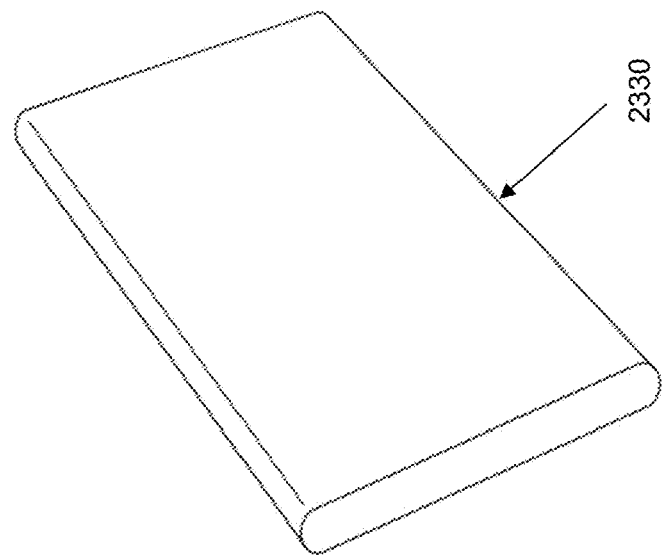
FIG. 23B illustrates an anisotropic conductive material in accordance with an aspect of the present invention.
Figure 23A:
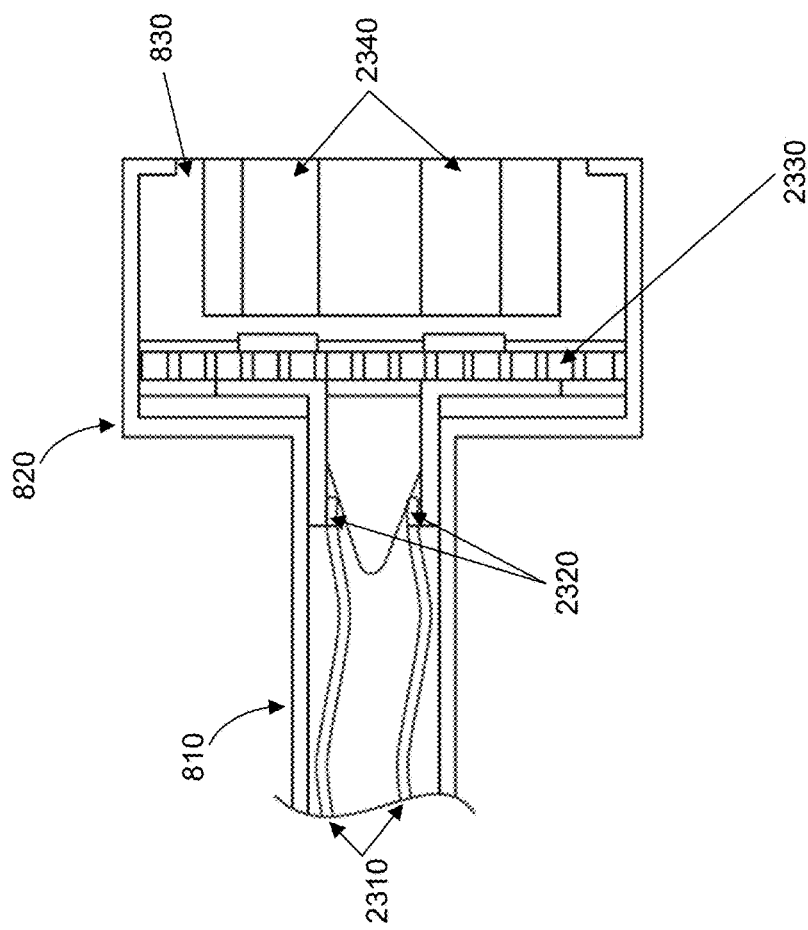
FIG. 23A illustrates an electrical connector and its internal wiring in accordance with an aspect of the present invention.

FIG. 23A illustrates an assembly 2300 inside connector box 820 of FIG. 8. Assembly 2300 illustrates a wire-to-contact interface where the metal tubing 810 is welded or otherwise attached to box 820 with connector block 830 retained inside. Connector block 830 is interfaced to wires 5310 through contact lugs 2320 that interface with compliant anisotropic conductive material 2330, which in turn interfaces to contact pads 2340 in block 830. FIG. 23B shows anisotropic conductive material 2330.

After electrical connectivity has been established from a power source to an electronic control module in the temple of electronic eyeglasses, it is important to route any electrical signals from the electronic control module to the electronic lenses. Such a routing scheme needs to be lightweight, reliable, and adjustable to a variety of frame types and sizes.

According to one embodiment, a device is provided. The device includes a first eyeglass lens having a top edge and a first electrical contact disposed along the top edge of the first lens. The first electrical contact is electrically connected to a first conductive path within the first lens. The device also has a second electrical contact disposed along the top edge of the first lens. The second electrical contact is electrically connected to a second conductive path within the first lens.

In one embodiment, the first and second conductive paths (linear) are within 10° of being parallel to each other and within 10° of being perpendicular to a horizontal, where "horizontal" is the plane of the ground when a wearer is wearing the glasses in a normal standing position on a flat surface.

In one embodiment, the first conductive path is located between 8 and 15 mm to a first side of a fitting point of the lens, and the second conductive path is located between 8 and 15 mm to a second side of a fitting point of the lens. 8-15 mm is a preferred range, and 11-13 mm is more preferred. At smaller distances the conductive path may be seen by a wearer looking to the side. At larger distances the conductive path becomes longer and more resistive without any correlated benefit, which is undesirable.

In one embodiment, the angle between the first and second conductive paths is between 10° and 30° with respect to a vertical line.

In one embodiment, the first and second conductive paths extend from the top edge towards a center of the lens.

In one embodiment, the device is an eyeglass lens.

In one example, the device is an eyeglass. The eyeglass has a frame front and a first temple rotatably attached to the frame front. The eyeglass also has a second temple rotatably attached to the frame front. The first lens is supported by the frame front and a second lens, which has a top edge, and is also supported by the frame front. The second lens further includes a third electrical contact disposed along the top edge of the second lens. The third electrical contact is electrically connected to a third conductive path within the second lens. The second lens has a fourth electrical contact disposed along the top edge of the second lens. The fourth electrical contact is electrically connected to a fourth conductive path within the second lens.

In one embodiment, the eyeglass includes electronics housed in or on the first temple). The eyeglass also includes a first conductive path between the electronics and the first electrical contact, and a second conductive path between the electronics and the second electrical contact.

Electronics housed in or on a temple may be housed in a number of ways. The electronics may be in a module, which is a discrete unit that includes a plurality of electrical components. The electronics may be a part of an electronics assembly, which is described herein. The electronics may be separate parts that are individually attached to or disposed within the temple. A combination of these configurations, or other configurations, may be used. The electronics may be disposed within the temple, or attached to the outside of the temple.

In one embodiment, the first conductive path is between the electronics, the first electrical contact, and the third electrical contact. The second conductive path is between the electronics, the second electrical contact, and the fourth electrical contact.

In one embodiment, the first and second conductive paths are provided by discrete lines in a flex cable. In one embodiment, the flex cable further comprises first, second, third, and fourth tabs adapted to electrically connect to the first, second, third, and fourth contacts, respectively. In one embodiment, the first and second conductive paths are provided by a first wire and a second wire.

In one embodiment, the device is an eyeglass and the first and second lenses are electronic lenses.

Various embodiments herein utilize a flex cable to provide electrical connectivity from an electronic control module to electronic lenses. In one embodiment, a flex cable may be defined as a cable consisting of at least two layers of flexible polymer material (for example, polyimide) that sandwich a conductive material in between. Openings on the flexible polymer material are formed only in areas wherein electrical contact will be made between the electrodes of the lenses and the conductive material of the flex cable.

The conductive material may be copper, aluminum, gold or the like, and may be deposited or bonded on one inner surface of the flexible polymer material. Preferably, the conductive material is patterned to provide at least two discrete conductive paths. Two conductive paths are preferred when it is desirable to provide the same signal to two lenses. Four conductive paths, two for each lens, are preferred when it is desirable to provide different signals to each of the two lenses. Other configurations may also be possible. The conductive material is fully embedded within the flexible polymer material except for exposed areas (referred to as "tabs") where the top flexible polymer material may be removed to facilitate electrical connection to the electrodes of the lenses.

Figure 24:
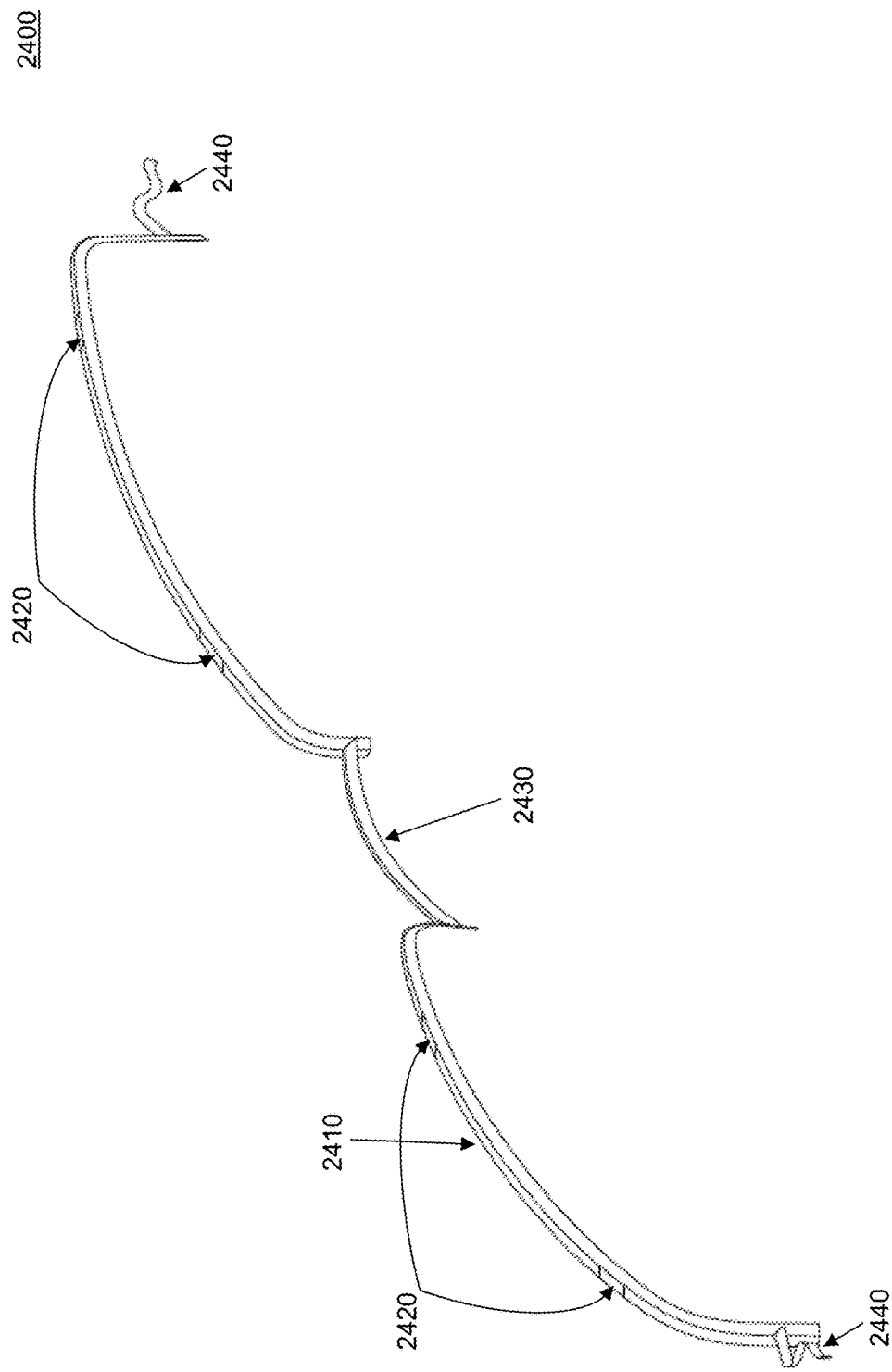
FIG. 24 illustrates a portion of a flex cable adapted to be coupled to electro-active lenses, in accordance with an aspect of the present invention.

FIG. 24 illustrates a flex cable harness 2400 as it may appear routed inside a spectacle frame. Flex cable harness 2400 consists of flex cable 2410. Flex cable harness 2400 also has connection tabs 2420, two for each lens of an eyeglass pair. A bridge portion 2430 may be used to interface the left portion to the right portion of flex cable 2410. Typically in an eyeglass frame a bridge is a structure that crosses the nose and connects the left and ride sides of the eyeglasses. Flex cable harness 2400 may also include size variation accommodation folds 2440, which may be configured to adjust to frame fronts and temples of various sizes.

Figure 25:
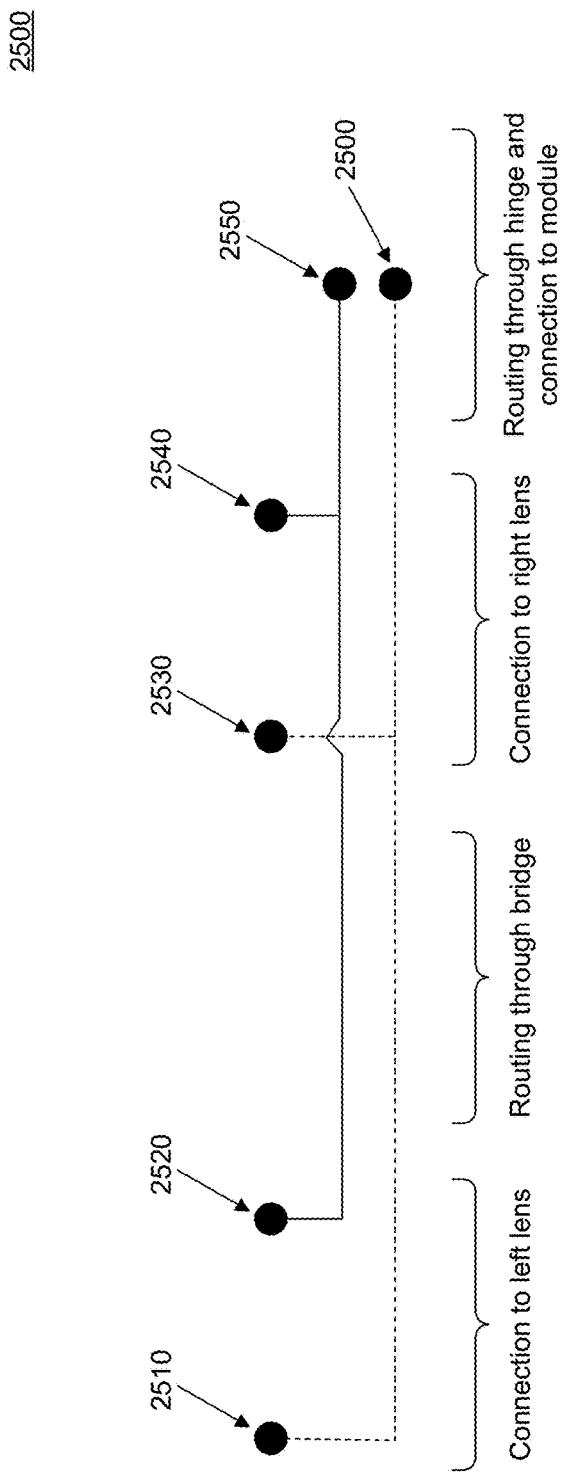
FIG. 25 illustrates two conductive paths of a flex cable and their electrical connectivity to portions of electronic eyeglasses in accordance with an aspect of the present invention.

FIG. 25 illustrates a schematic of a flex cable harness 2500 representing the trace layout necessary to establish connection from an electronic control module to both sides of each lens. Pole 2510 represents a first contact interface to the left lens. Pole 2520 is the second contact interface to the left lens. Pole 2530 is the corresponding single pole of the left lens while pole 2540 is the opposing pole of the left lens. Poles 2550 and 2560 are the two poles of the circuit interfacing the signals generated by an electronics module.

Figure 26:
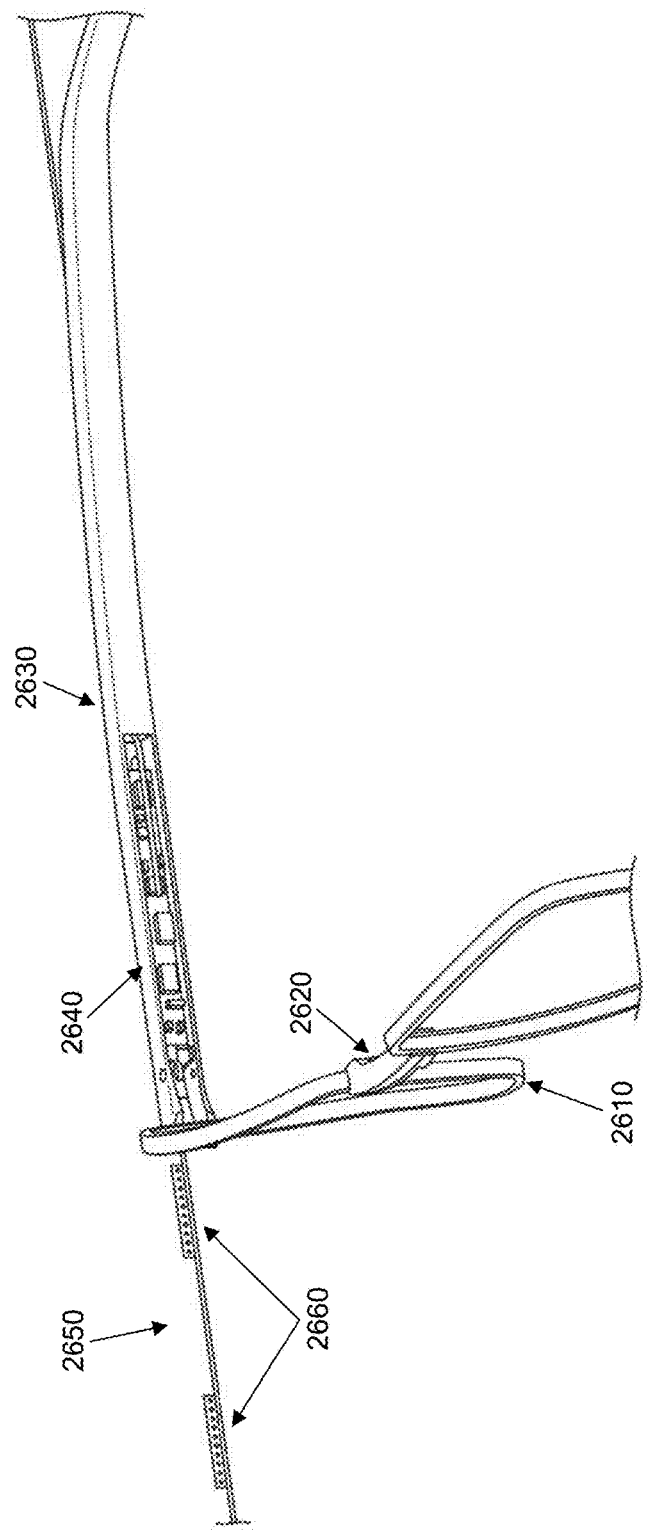
FIG. 26 illustrates a portion of electronic eyeglasses showing a flex cable running through the temple, in accordance with an aspect of the present invention.

FIG. 26 illustrates a portion of eyeglasses 2600. Eyeglasses 2600 comprise frame front 2610, bridge 2620 connecting the right and left portions of the frame front, and temple 2630. A flex/pcb assembly 2640 is housed within temple 2630. FIG. 26 illustrates the ability to run a flex cable 2650 to the distal end of the temple and the lens portion of the frame. In FIG. 26, connection tabs 2660 are also shown. In this embodiment, connection tabs 2660 may provide electrical connectivity to the left or the right lens of eyeglasses 2600.

Figure 27:
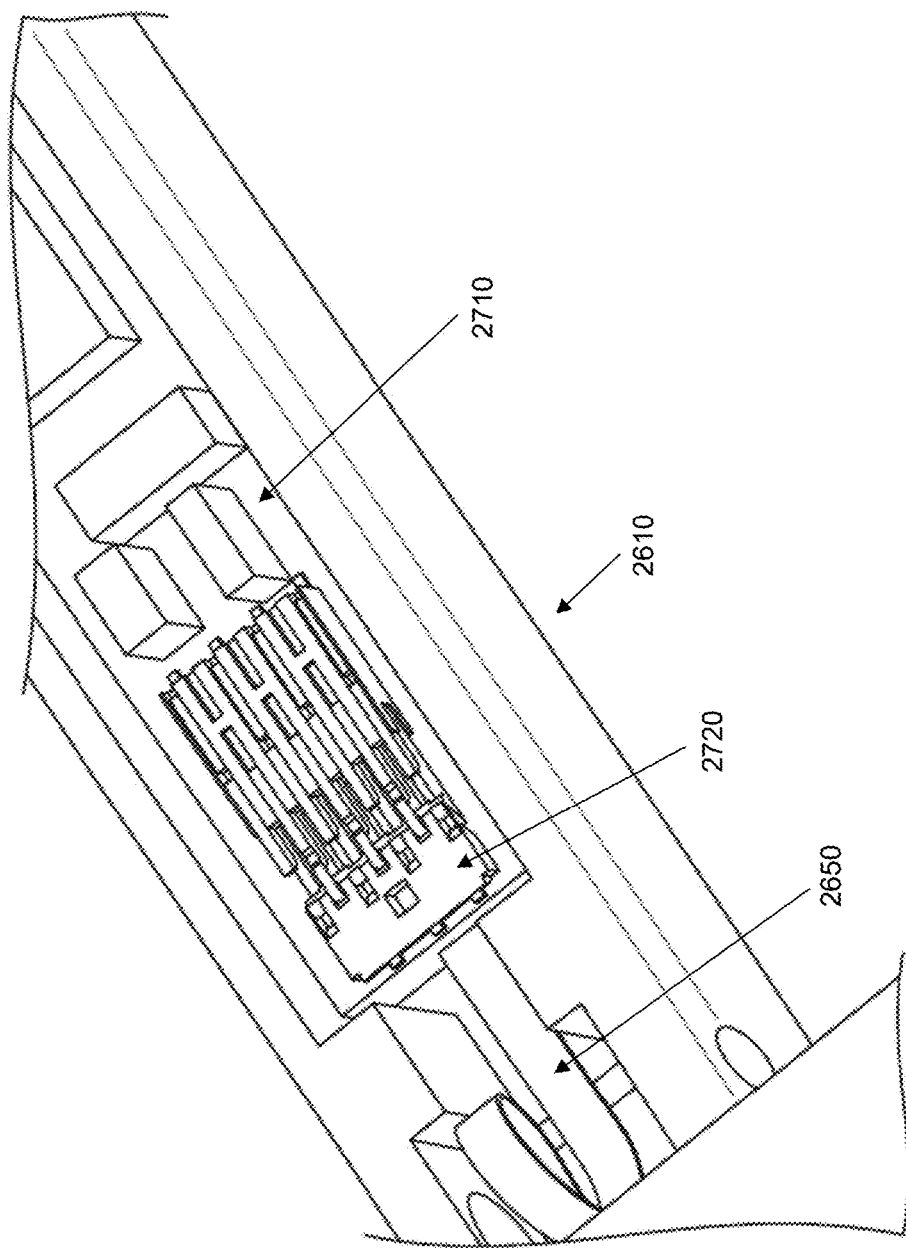
FIG. 27 illustrates a portion of an electronic control module for electronic eyeglasses housed within a temple and its connectivity to a portion of a flex cable in accordance with an aspect of the present invention.

FIG. 27 shows a portion of temple 2610 and illustrates how flex cable 2650 is interfaced with the electronic control module. Printed circuit board 2710 contains a small flat flex connector 2720 to connect to flex cable 2650, as opposed to having a rigid/flex assembly.

Figure 28:
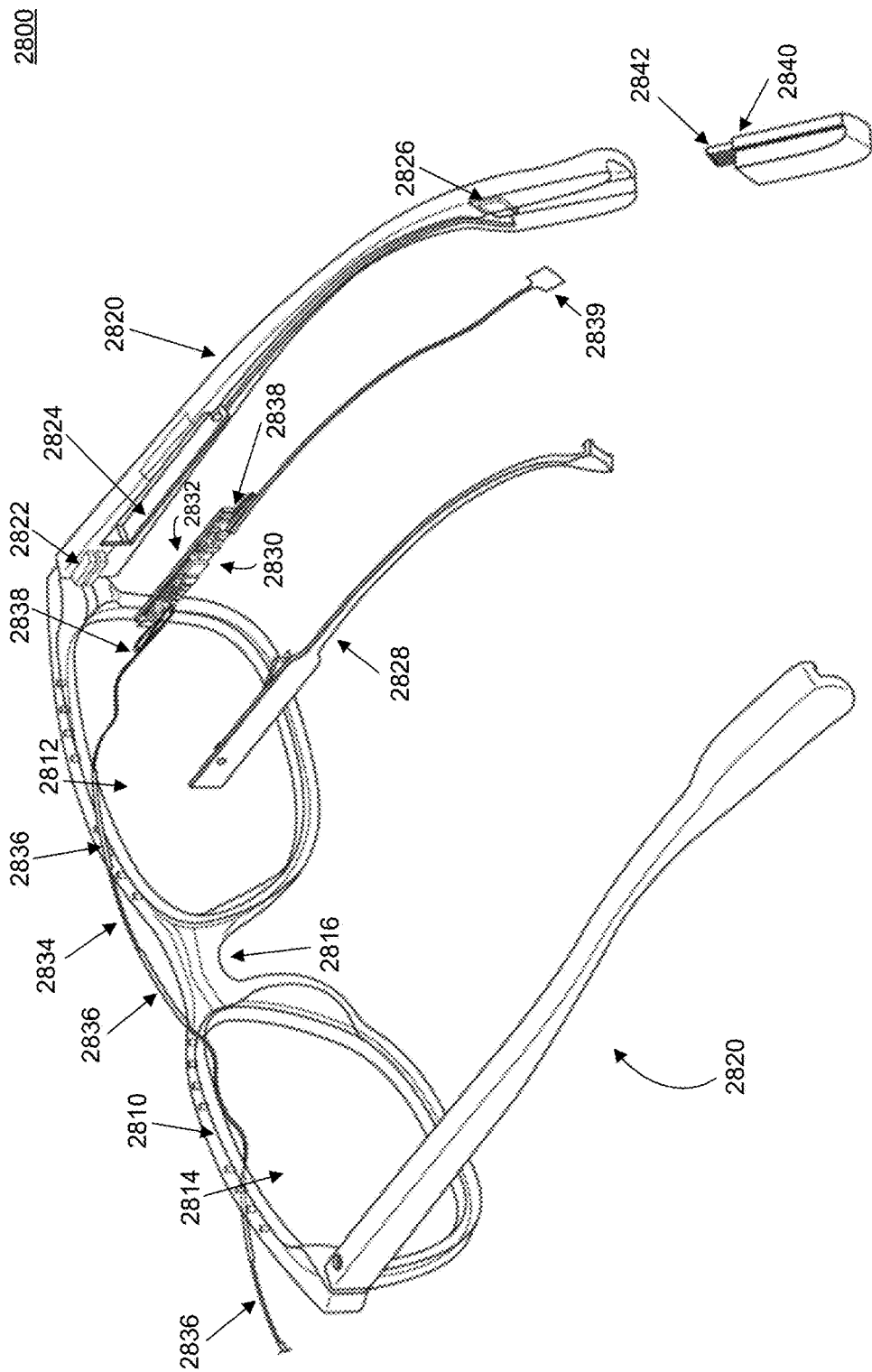
FIG. 28 illustrates electronic eyeglasses and the various components thereof in accordance with an aspect of the present invention.

FIG. 28 illustrates eyeglasses 2800 and provides more detail on how the various components are put together, according to an embodiment. Eyeglasses 2800 comprise frame front 2810, which supports right lens 2812 and left lens 2814. The left and right portions of frame front 2810 are connected through bridge 2816. Right and left temples 2820 are connected to frame front 2810 through a hinge 2822, which will be described in detail below. Within right temple 2820, electronics 2830 are housed. Electronics 2830 are located inside a cavity 2824 that has been formed in the temple. A cover 2828 is used to complete temple assembly and mechanically seal and protect the portion of electronics 2830 in the temple.

Electronics 2830 comprise electronic control module 2832 and flex cable 2834. Flex cable 2834 has right and left connection tabs 2836, which may be used to connect to electrodes of right and left lenses 2812 and 2814, respectively (electrodes not shown here). Service loops 2838 may be used to adjust the flex cable within temple 2820 and frame front 2810. A connection tab 2839 is located at the distal right end of electronics 2830, and it may be used to provide electrical connection to a power source.

A power source (not shown here) may be housed within temple tip 2840. Temple tip 2840 may be inserted inside cavity 2826 of temple 2820 and electrically connect to electronics 2830 through a connection between connector 2842 and connection tab 2839.

It is to be appreciated by one skilled in the art that other components of eyeglasses 2800 may be present, not shown in this embodiment. The order of assembly of the components thereof may not be limited to the order discussed with reference to FIG. 28.

Figure 29A:
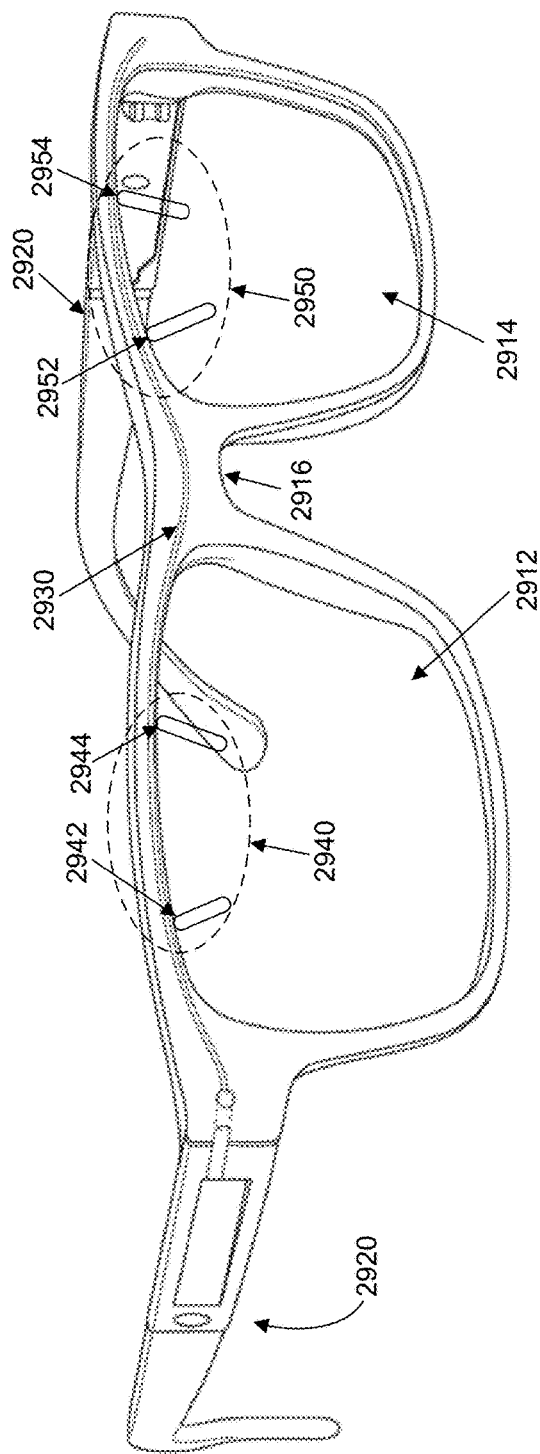
FIGS. 29A and 29B illustrate a flex cable running through a frame front of electronic eyeglasses and a cross sectional view of the flex cable in accordance with an aspect of the present invention.

FIG. 29A illustrates another pair of eyeglasses 2900, wherein components have been assembled, according to an embodiment. FIG. 29A depicts the connections of the flex cable to the lenses. Eyeglasses 2900 comprise frame front 2910, right and left lenses 2912 and 2914, respectively, bridge 2916 and temple 2920. A flex cable 2930 runs from temple 2920 to frame front 2910 and may provide electrical signals to lenses 2912 and 2914. To facilitate electrical connectivity to flex cable 2930, lenses 2912 and 2914 have pairs of electrodes 2940 and 2950, respectively. For each pair of electrodes 2940 or 2950, individual electrodes 2942, 2944, 2952, 2954, may reside at different surface of the lens substrate, as will be described in detail below.

Figure 29B:
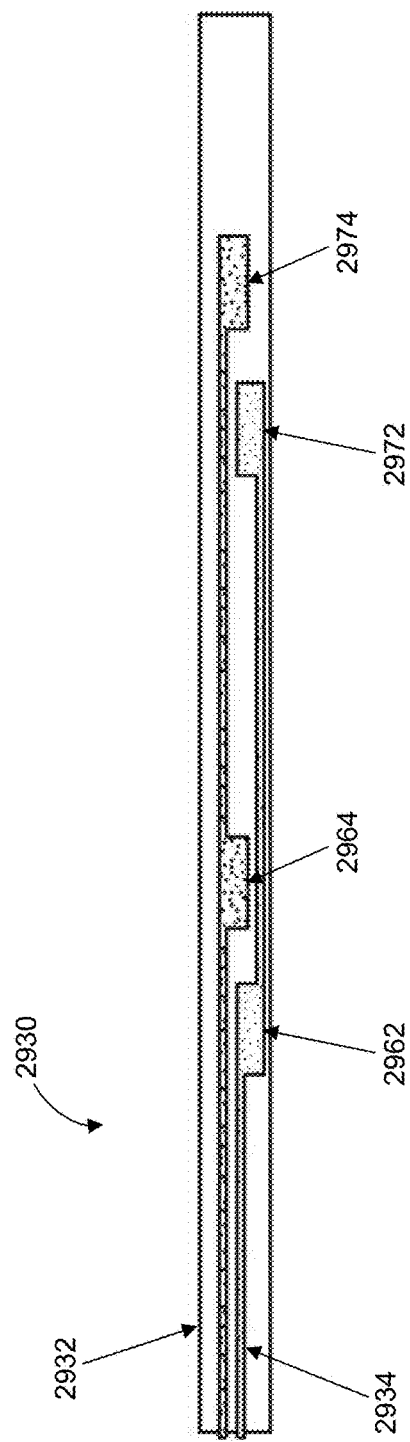

FIG. 29B illustrates a top-down view of flex cable 2930. Flex cable 2930 has two distinct conductive paths 2932 and 2934. These conductive paths may be used to carry a plurality of electrical signals to lenses 2912 and 2914, for example the drive and reference (ground) voltages from a power source housed in the temple. Within flex cable 2930, there are four connection tabs: tabs 2962 and 2964 may be used to connect to electrodes 2942 and 2944 of right lens 2912, while tabs 2972 and 2974 may be used to connect to tabs 2952 and 2954 of left lens 2914.

Figure 30:
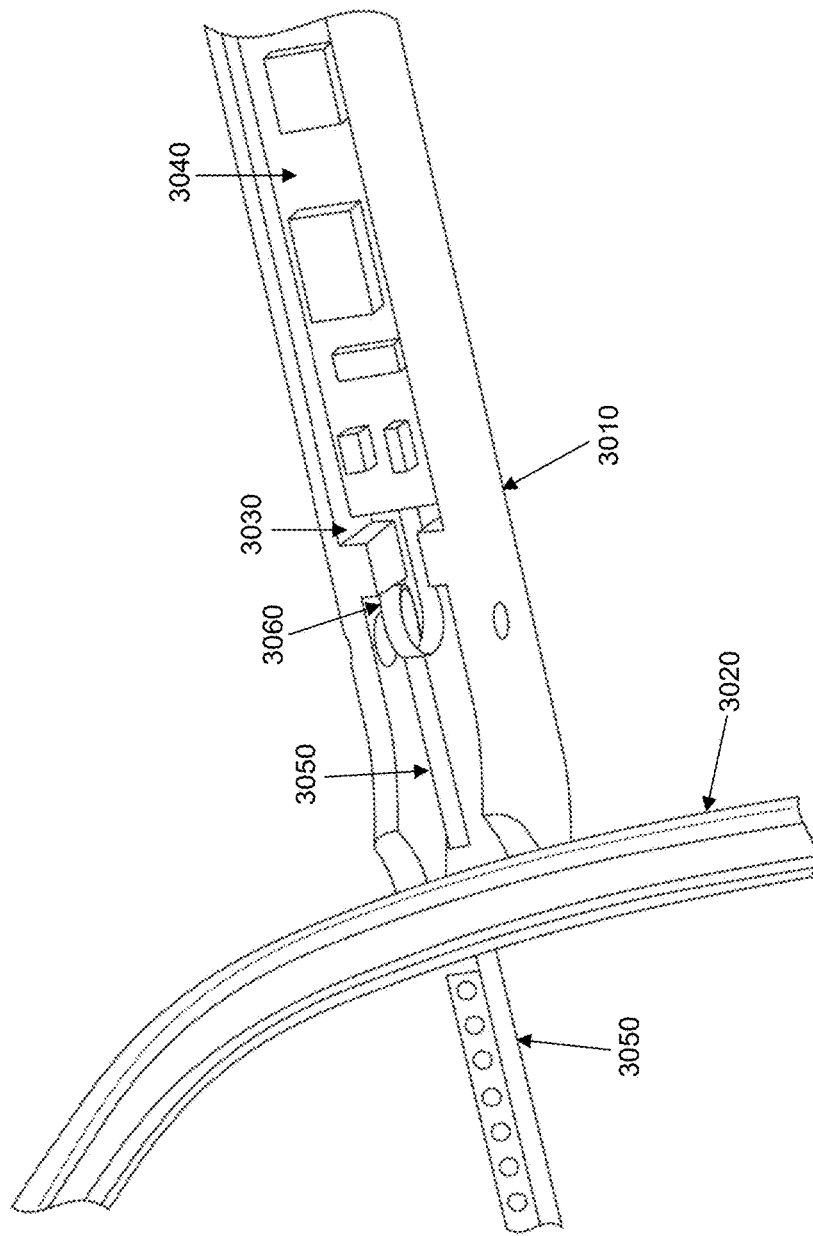
FIG. 30 illustrates a service loop of a flex cable connected to an electronic control module for electronic eyeglasses in accordance with an aspect of the present invention.

FIG. 30 shows another view of a temple to frame interface 3000, showing where the frame 3020 (shown without a hinge portion for clarity) abuts the temple 3010. A flex cable 3050 embedded in a cavity 3030 is shown with a 360° service loop 3060 to accommodate folding of temple 3010. Temple 3010 also has electronics 3040 housed within cavity 3030, which may be potted into the temple to protect, anchor, and seal the electronics and provide mechanical strength to the temple.

Routing of a flex cable from a temple to a frame front preferably involves the design and manufacturing of mechanical structures that can induce little stress on the flex cable and allow for a conductive path to be established from the temple to the frame front. The mechanical structure has an open position, corresponding to a position of the frame front and the temple when a pair of eyeglasses is worn by user, and a closed position, corresponding to a position of the frame front and the temple when a pair of eyeglasses is folded. For the open position, the closed position, and all rotational positions in between, there is a path for the flex cable to run from the temple to the frame front.

In one embodiment, a device is provided. The device has a hinge for an eyeglass frame adapted to rotatably attach a temple to a frame front. The hinge has an axis of rotation. The hinge has a top rotatable connection. The top rotatable connection has a first top part rotatably connected to a second top part, rotatable around the axis of rotation. The hinge also has a bottom rotatable connection. The bottom rotatable connection has a first bottom part rotatably connected to a second bottom part, rotatable around the axis of rotation. A gap is disposed along the axis of rotation and between the top rotatable connection and the bottom rotatable connection. An electrical conductor runs through the gap.

In one embodiment, the first top part and the second top part are rotatably connected by a first screw, while the first bottom part and the second bottom part are rotatably connected by a second screw. The second screw has opposite handed threads relative to the first screw.

In one embodiment, the first bottom part has a pin and the second bottom part has a hole, such that the pin rotatably fits into the hole. In one embodiment, the first top part has a pin and the second top part has a hole such that the pin rotatably fits into the hole.

In one embodiment, the device is an eyeglass frame. The eyeglass frame has a temple and a frame front rotatably connected to each other by the hinge. The hinge has an open position, corresponding to a position of the frame front and the temple when a pair of eyeglasses is worn by user, and a closed position, corresponding to a position of the frame front and the temple when a pair of eyeglasses is folded. For the open position, the closed position, and all rotational positions in between, there is a path for the electrical conductor to run from the temple to the frame front through an axis of rotation of the hinge in the gap.

In one embodiment, the first top part and the second bottom part are rigidly connected to each other and to the frame front. The second top part and the second bottom part are rigidly connected to each other and to the temple.

In one embodiment, the electrical conductor crosses the gap in an orientation within 10° of perpendicular to the axis of rotation of the hinge.

In one embodiment, the electrical conductor is a wire. In one embodiment, the electrical conductor is a flex cable. In one embodiment, the electrical conductor, wire or flex cable has a service loop. A service loop is a portion of the conductor that loops into an empty space in order to accommodate excess length. This allows one length of conductor to adjust to different temple and frame front geometries. For example, for geometries where less than the full length of conductor is needed, the excess length can be looped to fit into the temple. For geometries where the full length is needed, the service loop may be small or absent.

In one embodiment, the eyeglass frame has a lens supported by the frame front The lens has a first electrical component and a second electrical component, also supported by the temple, i.e., housed within, attached to, or otherwise supported by the temple.

In one embodiment, the electrical conductor provides a conducting path between the first electrical component and the second electrical component. By doing so, it provides an electrical signal to the first electrical component of the lens.

In one embodiment, the first electrical component has electrical contacts disposed along a top edge of the lens.

In one embodiment, the second electrical component has an electronic control module coupled to a power source.

In one embodiment, the lens is an electronic lens.

Figure 31:
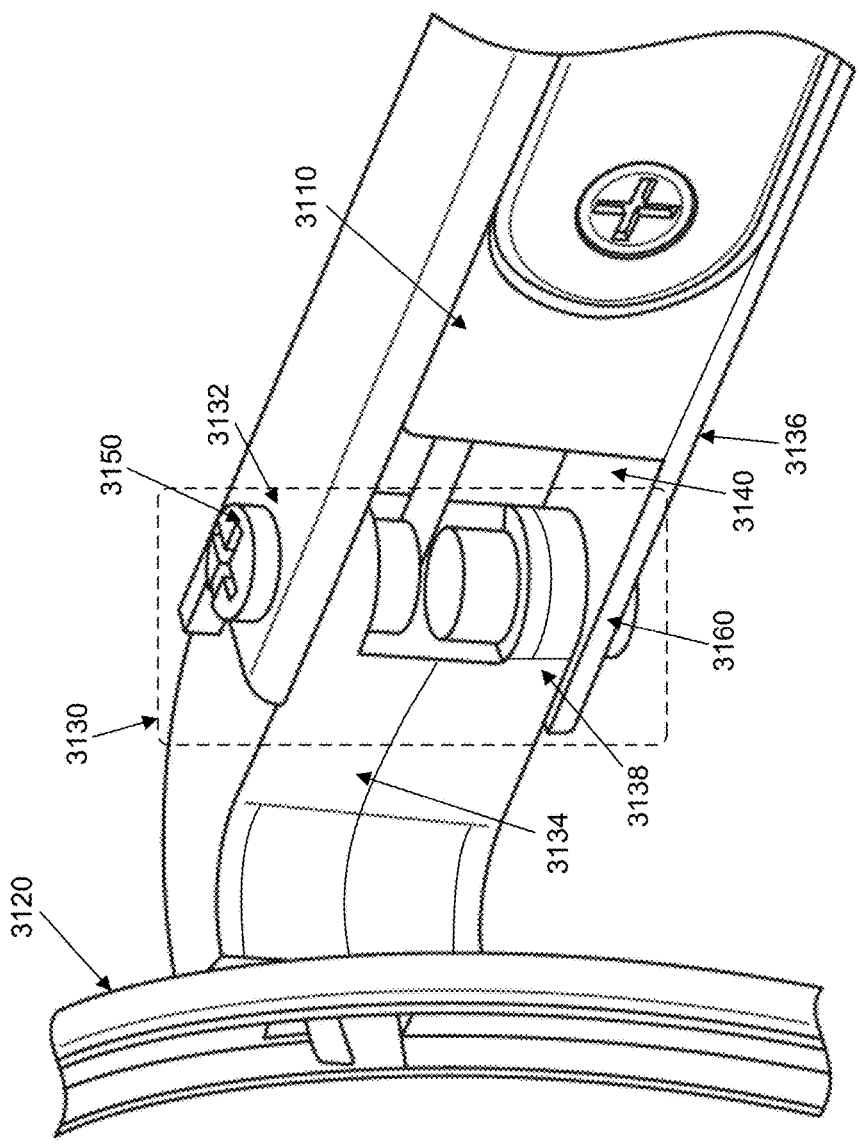
FIG. 31 illustrates a hinge coupling a temple to a frame front in accordance with an aspect of the present invention.

FIG. 31 shows a portion of an eyeglass frame 3100 wherein a hinge 3130 connects a temple 3110 to a frame front 3120. Hinge 3130 has a first top part 3132 and a second top part 3134, rotatably connected to each other to form a top rotatable connection. Hinge 3130 has a first bottom part 3136 and a second bottom part 3138 rotatably connected to each other to form a bottom rotatable connection. First top part 3132 and second top part 3134 are held together by screw 3150, while first bottom part 3136 and second bottom part 3138 are held together by opposite handed screw 3160. A gap 3140 is disposed along the axis of rotation of hinge 3130. In an example, an electrical conductor such as a flex cable may run unobstructed through gap 3140.

Figure 32A:
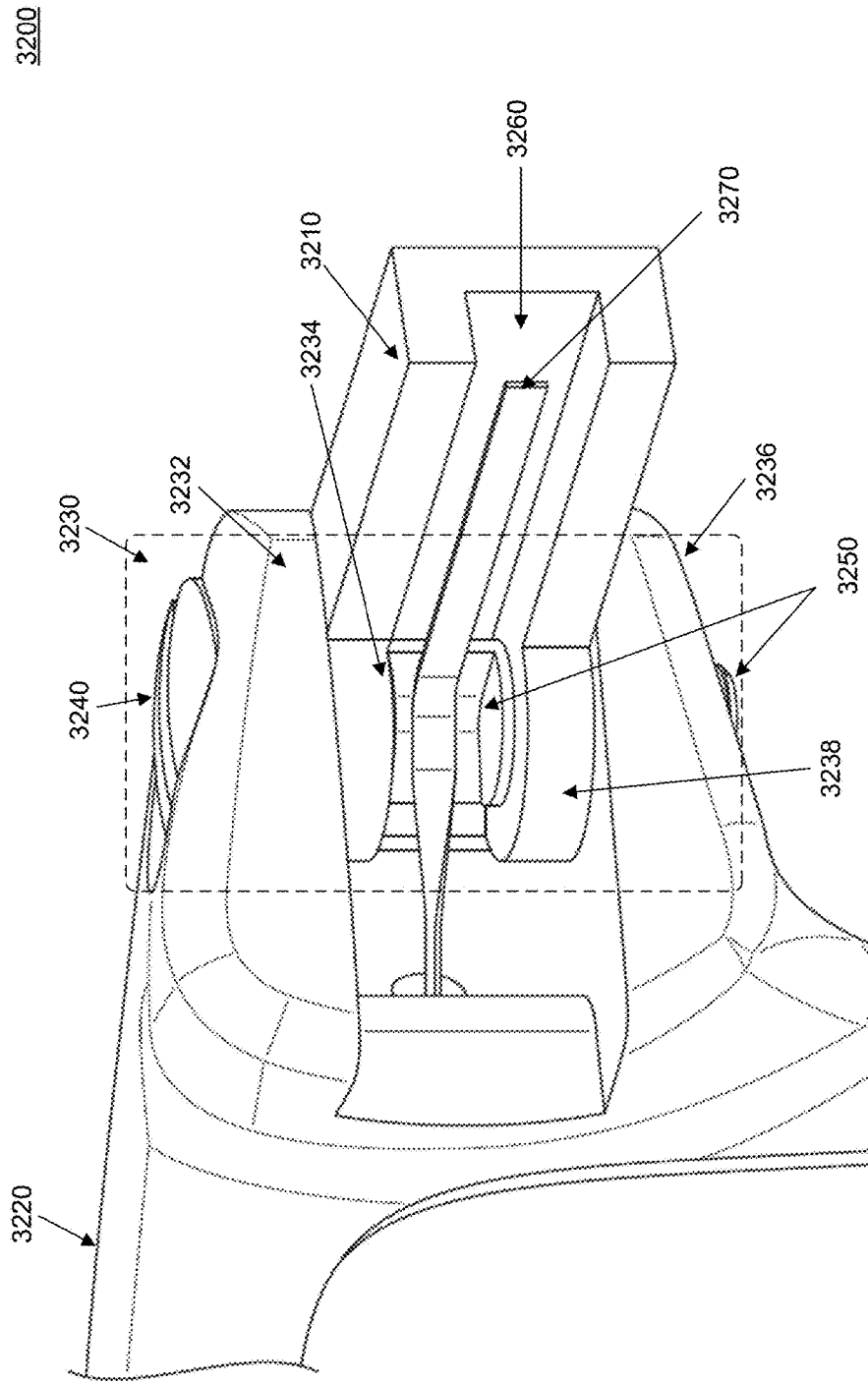
FIGS. 32A and 32B illustrate a hinge coupling a temple to a frame front in accordance with an aspect of the present invention.

FIG. 32A shows a portion of an eyeglass frame 3200 wherein a hinge 3230 connects a temple 3210 to a frame front 3220. Hinge 3230 has a first top part 3232 rotatably connected to a second top part 3234 by a pin 3240 that fits into a hole (not shown). Hinge 3230 also has a first bottom part 3236 rotatably connected to a second bottom part 3238 by a pin 3250 that fits into a hole (not shown). A gap 3260 is disposed along the axis of rotation of hinge 3130, allow for a flex cable 3270 to run through the hole.

Figure 32B:
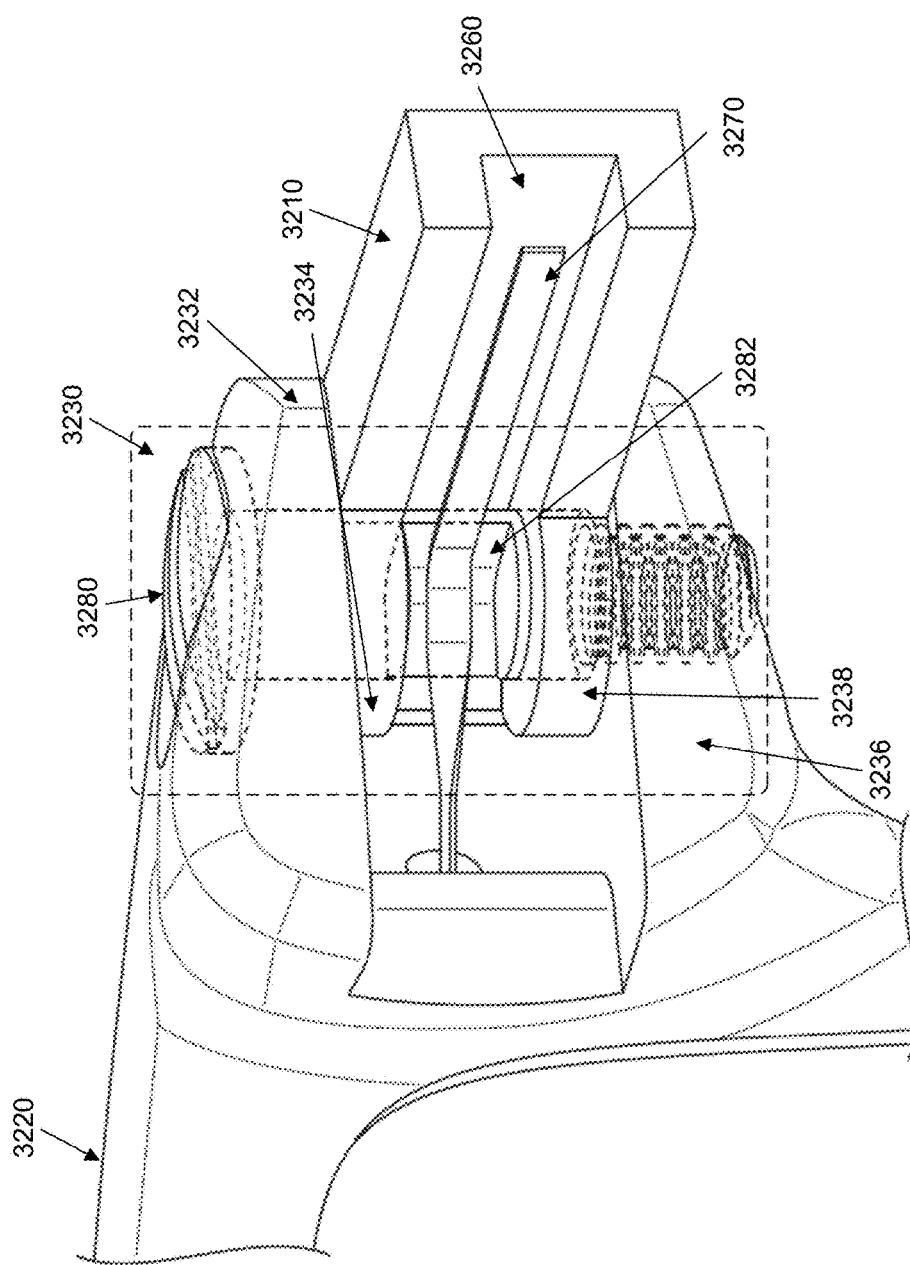

FIG. 32B shows an embodiment wherein the top and bottom rotatable connections of hinge 3230 may be held in place by a screw 3280. Screw 3280 has a cut-out 3282, which accommodates continuity of gap 3260 and enables flex cable 3270 to run unobstructed from temple 3210 to frame front 3220.

In one embodiment, the eyeglass frame includes a rim-lock. The rim-lock has a first rim-lock part coupled to a lower portion of the frame-front, and a second rim-lock part coupled to an upper portion of the frame front. The first rim-lock part is integrably connected to the first top part and the first bottom part of the hinge.

FIGS. 33 A-C illustrate various views of a rim-lock 3300, according to an embodiment of a present disclosure. Rim-lock 3300 has a top rim-lock part 3310, which may be coupled to a temple and an upper portion of a frame front, and a bottom rim-lock part 3320 which may be coupled to a lower portion of a frame front. Gap 3330 enables a flex cable to run from the temple to the frame front and retains the flex cable while rim-lock 3300 is open. A cylindrical hub 3340 may be used instead of screws. Screw holes 3360 may house screws to keep the rim-lock parts in place. Rim lock 3300 allows lens mounting without completely disassembling the monoblock.

Figure 34A:
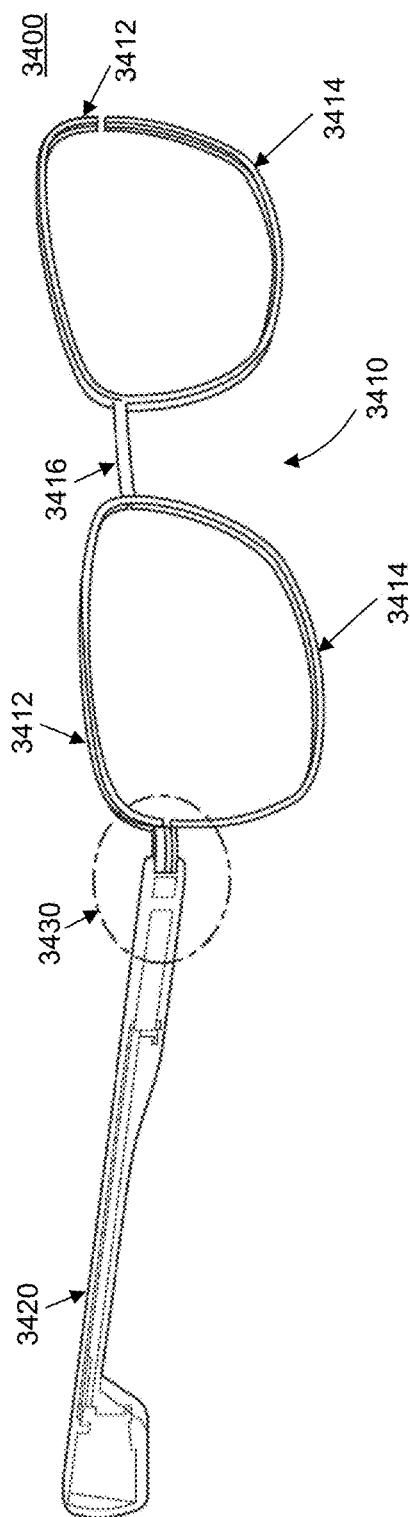
FIGS. 34A and 34B illustrate electronic eyeglasses and an exploded view of a hinge coupling the temple to the frame front in accordance with an aspect of the present invention.
Figure 34B:
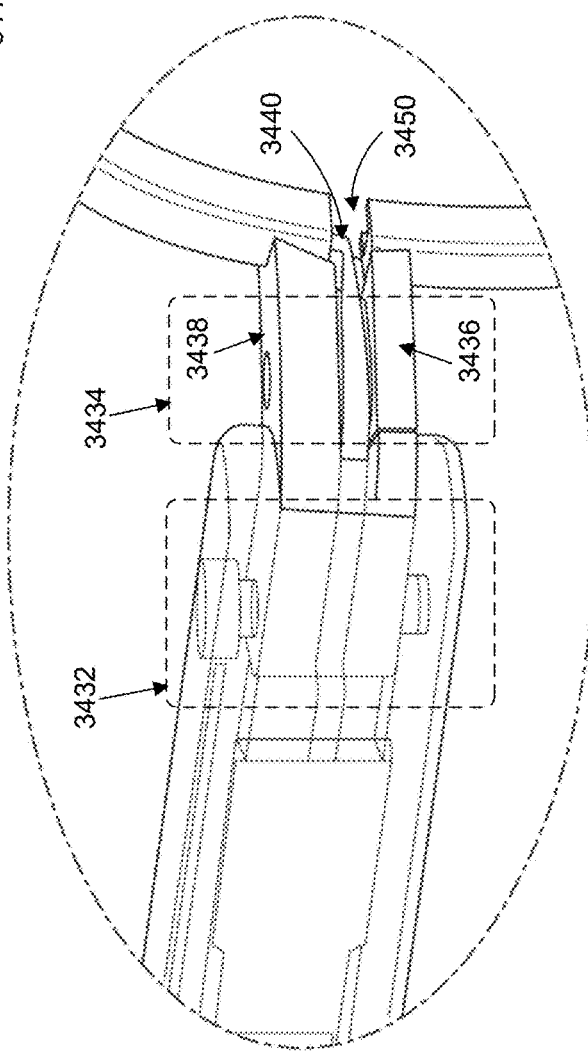

FIG. 34A illustrates a portion of eyeglasses 3400 according to an embodiment. Eyeglasses 3400 include frame front 3410, which has an upper portion 3412 and a lower portion 3414 connected by a bridge 3416. Eyeglasses 3400 also include a temple 3420 connected to frame front 3410 through a hinge/rim-lock assembly 3430. FIG. 34B illustrates an exploded view of hinge/rim-lock assembly 3430, showing hinge 3432, rim-lock 3434 and flex cable 3440 running through gap 3450. Rim-lock 3434 has a top rim-lock part 3438 coupled to upper frame front portion 3412, and a bottom rim-lock part 3436 coupled to lower frame front portion 3414.

Figure 35:
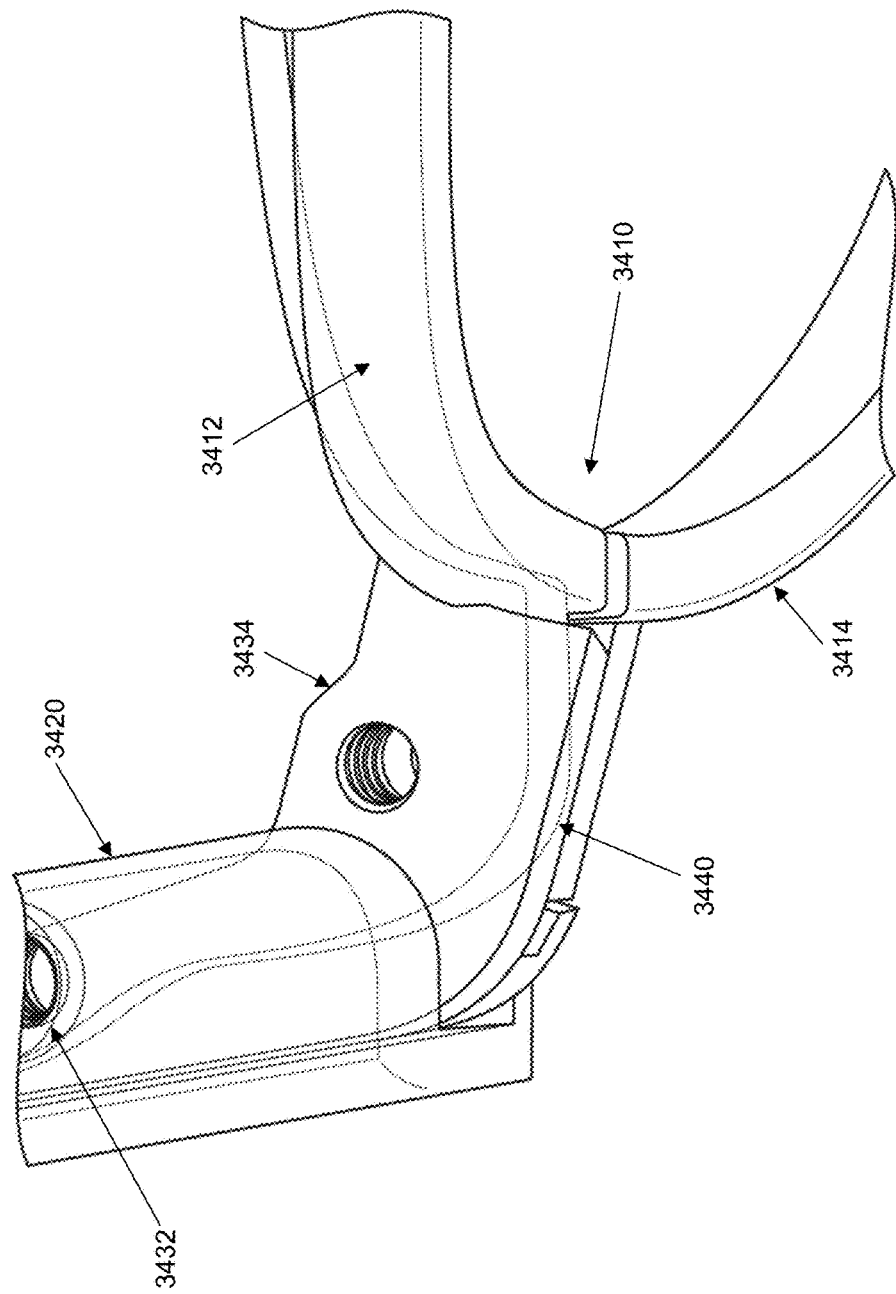
FIG. 35 illustrates a top-down view of a rim-lock coupling a temple to a frame front in accordance with an aspect of the present invention.

FIG. 35 shows a top-down view of eyeglasses 3400. In this embodiment, flex cable 3440 runs behind hinge 3432 and rim-lock 3434 and continues through upper frame front portion 3412.

FIGS. 36 A-C illustrate views of a portion of eyeglasses 3400, wherein rim-lock 3434 is completely removed (FIG. 36A), upper rim-lock part 3438 is removed (FIG. 36B), and both rim-lock parts are present (FIG. 36C). In all illustrations, electronic control module 3460 is also shown.

FIGS. 37 A and 37B illustrate another top view of a portion of eyeglasses 3400, wherein an upper portion of the rim-wire 3710 is shown in the wire frame (FIG. 37A), and not shown in FIG. 37B.

FIG. 38 illustrates a side view of eyeglasses 3400, wherein hinge 3432 is shown with a screw 3810 connecting the first and second top parts 3812 and 3814, respectively, and a pin 3820 connecting the first and second bottom parts 3816 and 3818, respectively. Also shown is a ramp portion 3830.

FIG. 39 illustrates a portion of temple 3420 without the flex cable inside gap 3450, wherein ramp 3830, and holes 3910 (to retain the hinge pin) and 3920 (to retain the hinge screw) are shown.

FIG. 40 illustrates a portion of an eyeglass frame 4000, showing portions of a flex cable 4020 near a frame hinge 4010 at the temple interface. This portion of flex cable 4030 may accommodate frame size variation by providing an accumulating fold 4022, and a cavity 4030 in hinge 4010 that provides a volume for the function of a service loop in the flex.

FIG. 41 illustrates another portion of an eyeglass frame 4100, according to an embodiment. The figure shows a bridge connection 4112 of frame front 4110 as a sandwich. The figure does not illustrate the middle portion as being attached to a flex cable. This middle portion may be integral with the flex cable so that it may anchor the flex to the frame and bridge the gap between the two lenses. It also shows the inner portion of the rim-wire as a channel 4114 to house the flex cable. In another embodiment the bridge may be a single piece of metal or plastic (welded or integral to the frame front) with a hollow conduit running along its length to allow the flex cable to pass between the right and left lenses. In another embodiment the bride may comprise a single, continuous piece of eye wire that spans the distance between the right and left lenses and enables a smooth path for the flex cable to pass between the right and left lenses.

In addition to the mechanical and electronic components involved in electronic eyeglasses, a significant feature that is important to the user is an efficient lens design and manufacturing process, which may enable cost reduction through easier assembly and minimal discomfort during operation by reducing the components of the lens that may be visible to the user.

Previously, the inventors disclosed electro-active semi-finished spectacle lens blanks capable of being processed into electro-active finished lenses using equipment and processes well known in the field of spectacle lens manufacturing. Furthermore, it was also disclosed that electrical connections were established to said electro-active finished lenses during the edging process (cutting lenses to the shape of a spectacle frame) where the ends of electrodes embedded within the structure of the lenses were exposed along the edge of the lenses such that electrically conductive materials (primers, paints, adhesives, caulkings, etc.) could be applied to them. These electrically conductive materials would thus act as connection points between the edge of the lens and other conductive materials/structures in an electronic spectacle frame.

One problem with this process is that the cutting and/or grinding tools used by industry standard equipment to edge and groove spectacle lenses can produce surface finishes which are very rough at the scale of the electrode features. These rough surfaces can result in failed electrical connections at the time of eye wear manufacture or electrical connections with poor reliability in the field.

FIG. 42A illustrates an edged and grooved electro-active finished lens 4210. Lens 4210 comprises electro-active component 4220 and lens electrodes 4230. FIG. 42B illustrates a magnified view of a groove. In an ideal situation, the distinct and easily discernible layers within lens 4210 may include the substrates 4270, the conductive ink electrode 4250, the adhesive 4260 holding substrates together, and the thin film coatings 4240 on the inner surface of the substrates 4240. These thin film coatings may be stacks of indium tin oxide (ITO) and silicon dioxide ($SiO_2$), or other transparent conductors and dielectric materials.

FIG. 43 shows an actual image of an edged and grooved electro-active lens taken by Scanning Electron Microscope (SEM) at a magnification of 1,000. The region shown is at the bottom of the groove where electrode 4230 should exit the edge of the lens as was illustrated in FIGS. 42A and 42B. This lens was grooved using a National Optronics 7E HLP edger equipped with a diamond grit grinding wheel which is designed to cut the groove without the use of a liquid coolant. It is to be appreciated that other edger tools may provide similar results. It is believed that the lens edger (used to cut and shape the lens to that of the eyeglass frame) smears the plastic being cut over the conductive electrode layer to which another electrode or electrical connector would be connected. The surface is very rough and there are no easily discernible layers, as illustrated in FIGS. 42A-B. Various pieces of plastic debris 4310 are labeled in FIG. 43. Under these conditions it may be possible to establish an electrical connection to the electrode but conditions are far from ideal. What is needed is a means to improve the surface quality at the points where the electrodes exits the edge on the lens.

Embodiments disclosed herein can be used to connect any plastic lens comprising an electrode, for example, electro-active lenses that change focus, electro-chromic lenses that change tint transmission, electro-therma-chromic lenses that change tint with temperature, anti-fogging lenses that reduce fog by way of heating the lens, anti-static lenses that remove dust by way of an electrical charge, a lens comprising a built in electrical display of any kind, heated lenses that are heated for any purpose.

A process is provided. A spectacle lens substrate is provided for the process. The substrate may be a blank, a semi-finished blank, a finished lens, or other spectacle lens substrate. The spectacle lens substrate has at least one internal electrode. The spectacle lens substrate is edged to expose an end of the at least one internal electrode. After edging, excess non-conductive material is removed from the end of the at least one internal electrode using a laser source.

In one embodiment, the laser source is a pulsed laser source.

In one embodiment, edging the spectacle lens involves forming the spectacle lens into a shape to fit a spectacle lens frame. The spectacle lens may be mounted into the lens frame after removing excess non-conductive material.

In one embodiment, edging the spectacle lens involves using at least one tool from the group consisting of cutting tools and grinding tools.

In one embodiment, removing excess non-conductive material includes focusing the pulsed laser source onto a spot size of approximately 200 micrometers, over the end of the at least one electrode.

In one embodiment, a groove is formed on the edge of the spectacle lens during edging.

In one embodiment, removing excess non-conductive material further includes rasterizing a beam of the pulsed laser source into a raster pattern. In one embodiment, removing excess non-conductive material further includes using the raster pattern to conduct overlapping passes parallel to a groove present along an edge of the spectacle lens.

In various embodiments, removing excess non-conductive material includes using a pulsed excimer laser source, a pulsed carbon dioxide laser source, a pulsed nitrogen laser or a pulsed neodymium-based laser source.

In one embodiment, the method further includes the steps of applying a conductive material to an edge of the spectacle lens. The application of conductive material involves applying an electrically-conductive primer, an electrically-conductive paint, electrically-conductive adhesives, or an electrically-conductive sealant.

FIG. 44 presents an experimental result of a method for improving the electrical connectivity to the edge of the lens. FIG. 44 is an SEM image take at a magnification of 1,000 in approximately the same region of another edged and grooved lens using the same 7E HLP edger as in FIG. 43. Here, a pulsed excimer laser has been used to remove a few micrometers of material over the region where the electrode exits the edge of the lens. In this case the layers illustrated in FIGS. 42A-B are easily discernible and conditions for establishing a direct and robust connection to the internal electrode are highly favorable. This result was achieved by rastering the laser beam, focused to a spot size of approximately 200 micrometers, over the region where the electrode exits the edge of the lens.

FIG. 45 shows an SEM image of the same region as in FIG. 43 at a lower magnification of 100. The raster pattern 4510 (four overlapping passes parallel to the direction of the groove) is evident.

While a pulsed excimer laser operating in the ultraviolet (UV) has been used in this embodiment, similar results may be achieved with other laser sources. To successfully remove material using a laser, all of the materials present along the edge of the lens preferably exhibit strong absorption at the operating wavelength of the laser. While this does not necessarily eliminate the use of visible wavelength laser sources, it is preferred to use UV, near infrared (NIR) and infrared (IR) laser sources as the lenses are designed to be highly transparent across the visible spectrum.

Another metric for success for this process is that the unwanted material be removed without excessive heating of the lens itself. Excessive heat may cause the internal layers of electrically conductive Indium Tin Oxide (ITO) to crack and craze, thus breaking the electrical connection between the electrodes and the electro-active area of the lens. A method in this disclosure uses a laser of low average power, high peak power pulsed laser sources and thus the use of an excimer laser. Other sources that could be used to achieve similar results include, but are not limited to pulsed lasers based on the following gain media: Nitrogen, Carbon Dioxide, Neodymium doped glasses and crystals (fundamental and higher harmonics achievable by Non-linear optical means), organic dyes and semiconductors.

After a lens has been edged to the appropriate shape for mounting onto a frame, a connection needs to be established between electrodes protruding exposed along a top edge of the lens and the connector tabs of the flex cable, as described in previous embodiments. Generally, a top edge of a lens is the edge defined by the hinge of the eyeglass frame on one side and the bridge on the other. In the context of eyeglasses having electronic components, the top edge may also be defined as a path along the top circumference of the lens between where an electrical connection is made to the temple, typically at the hinge, and where an electrical connection crosses from one side of the wearers face to the other, typically within the bridge A method for connecting an electrical cable such as flex cable to electrical connectors or electrodes on a lens is provided. The method includes providing a flex electrical cable having an exposed conductive region, a frame front having a cavity, and a lens having a first electrical contact on an edge of the lens. The method includes placing the flex electrical cable in the cavity and placing the edge of the lens in the cavity so that that the first electrical contact and the exposed conductive region are in proximity. A portion of a conductive sealant to couple the first electrical contact to the exposed conductive region is applied.

Most generally, the term "proximity" means sufficiently close that the conductive sealant can make a good electrical connection, while not extending so far along the edge of the lens that other similar connections, isolated from the first, are not possible. Preferably such that there is at least some overlap between the exposed conducive region and the connector. Most preferably, such that there is full alignment between the first exposed conductive region and the connector.

The "portion" of conductive sealant is preferably sufficiently large to make the electrical connection. The portion is also preferably sufficiently large to cover and seal all exposed conductive parts other than the sealant itself, such that the conductive parts are protected from moisture. The portion is preferably sufficiently small to avoid electrical contact with adjacent portions of conductive sealant, which could cause an electrical short.

In one embodiment, coupling the first electrical contact to the exposed conductive region involves sealing and electrically and mechanically connecting the first electrical contact to the first exposed conductive region.

In one embodiment, the flex electrical cable has a second exposed conductive region. It also has a first tab that contains the first exposed region and a second tab that contains the second exposed region In one embodiment, the first and second tabs are throughholes.

In one embodiment, the first lens is supported by the frame front.

In one embodiment, a second lens having a second electrical contact on an edge of the second lens is also supported by the frame front.

In one embodiment, the method further includes applying a second portion of a conductive sealant to couple the second electrical contact to the second exposed region.

In one embodiment, the first portion of the conductive sealant is applied through holes in the frame prior to placing the first lens in the cavity In one embodiment, the first portion of the conductive sealant is applied through holes in the frame front after placing the first lens in the cavity.

In one embodiment, the conductive sealant is a conductive caulk.

In one embodiment, the method further includes curing the conductive sealant. Curing refers to hardening of the material and is particularly applicable to embodiments wherein the conductive sealant includes a polymer. In such cases, curing allows for the solvent to be drawn out of the polymer. Curing may also involve polymerization or crosslinking. Curing methods include, but are not limited to, room temperature overnight curing, UV light-assisted curing or application of moderate heat (approximately 25-50° C.), such that curing may avoid damaging temperature-sensitive components of the eyeglass.

In one embodiment, the method further includes the steps of applying and curing a primer to the first electrical contact prior to applying the conductive sealant. In one embodiment, the method further includes applying a conductive paint to the first electrical contact after applying the primer and before applying the conductive sealant.

In one embodiment, the primer is a similar material to the material of the electrical contact. By "similar material," it is meant that conductive material remaining after the primer is applied and dried or cured is the same as the material of the electrical contact. However, the deposition method, solvents used in the deposition process, and other process parameters may be quite different.

Similarly, the difference between conductive "primer" and conductive "paint" may be a difference in the actual conductive material that results from applying the primer or paint, or the difference may be only in the solvents and deposition process, where the conductive material is the same. In some embodiments, separate primer and paint may not be needed, and a single conductive layer can serve the function of both. However, separate primer and paint allows for flexibility in choosing materials that make good electrical connections and have more robust physical properties where needed. For example, a relatively robust paint layer may protect and electrically connect to a relatively fragile primer layer, where the primer layer makes better electrical contact than the paint would to the conductor embedded in the lens.

In one embodiment, the electrical cable is a flex cable.

In one embodiment, the first lens is an electronic lens.

Surprisingly, various embodiments described herein, individually but particularly in combination, provide exceptional resistance to moisture and the elements in a challenging application. Eyeglasses may be subjected to a variety of environments that are detrimental to electronics, including rain, perspiration, and being dropped into liquid. Eyeglasses with electronic components need to have connections between those components. The connections may need to overcome a number of challenges, such as crossing through a hinge, and making connection to a lens. More so than other devices that may incorporate electronics, eyeglasses are essentially a part of a wearer's face, and users are particularly sensitive to cosmetic aspect of eyeglasses. The challenges are preferably overcome in a way that does not add undesirable bulk or other cosmetically unattractive aspects to the eyeglasses.

FIGS. 46 A-E show the various steps involved in the formation of electrical contact between the lens electrode and the connector tabs of a flex cable, after a lens has been edged and made ready for mounting onto a frame. It is to be appreciated that not all these steps may be performed, or that they may not be performed in the order described herein.

FIG. 46A shows a diffractive substrate 4610 post surfacing, a lid substrate 4620, and an internal electrode 4630. Internal electrode 4630 may comprise a transparent conductive material, such as a conductive polymer or a metal.

In FIG. 46B, a first external electrode 4632 is applied on the top surface of internal electrode 4630. This first external electrode 4632 may be referred to as "primer", since it may act as a junction between internal electrode 4630 and subsequent electrical connections. First external electrode 4632 may be the same or similar in composition material to internal electrode 4630. For example, they may both contain the same conducting polymer, such as PEDOT:PSS or the like. Primer 4632 may be applied by means of deposition, or as an ink using a paintbrush.

In FIG. 46C, a second external electrode 4640 is applied on and covers first external electrode 4632. Second external electrode 4640 may have a different composition compared to electrodes 4630 and 4632. Second external electrode 4640 may also be applied by means of deposition, or as an ink using a paintbrush.

In FIG. 46D, a flex cable 4650 having apertures (dotted outlines) is placed in proximity to the stacks of electrodes 4630, 4632, and 4640. A frame eye wire 4660, which may be metal or plastic, is placed on top of flex cable 4650. In one embodiment, frame eye wire 4660 has a cavity 4662 to facilitate placement of flex cable 4650.

In FIG. 46E, a conductive sealant 4670 is applied and cured. The conductive sealant may be, but it is not limited to, a conductive epoxy, a conductive caulk, or a conductive paint. Conductive sealant 4670 couples internal electrode 4630, flex cable 4650 and eye wire 4660 electrically and mechanically. After application of conductive sealant 4670, a curing step may follow to further strengthen the electrical and mechanical coupling, as discussed previously.

FIG. 47 depicts a method 4700 that summarizes process steps involved in the formation of electrical and mechanical contact between a flex cable, an internal lens electrode, and an eye wire frame, according to an embodiment. In step 4710, a lens is edged to the appropriate shape to fit inside a frame. In step 4712, a primer is applied to the edge of a lens, where an internal electrode is located. In step 4714, a conductive paint is applied.

In parallel steps 4720, 4730, a flex cable is mounted into a cavity of the frame. Then, method 4700 may have two branches. In a first branch, in step 4722 the lens is mounted onto the frame and in step 4724 epoxy is injected through holes in the frame to establish electrical and mechanical connectivity. In a second branch, in step 4732 conductive epoxy is applied first on the flex cable connector tabs and/or the lens electrodes, and in step 4734, the lens is mounted on the frame and electrically and mechanically coupled to the lens through the applied conductive epoxy.

FIG. 48 shows a portion of a flex cable 4800, with an individual tab 4810. Tab 4810 includes an electrical contact portion 4820 of flex cable 4800 that has no insulating layer and is therefore exposed. This exposed portion has, by example only, features 4824 that offer increased surface area for the application of conductive material. The conductive material is injected and flows through features 4824 to increase mechanical strength and electrical contact reliability. Paths 4830 are an illustration of the electrically conductive traces carrying each of the two poles of the circuit. The flex may contain other traces to carry additional signals for functions in addition to the signals activating the electro-active portion of the lenses. Insulating cover 4840, which may consist of polyimide in one embodiment, is also shown. The flex cable may also contain shielding layers to provide protection from electromagnetic interference (not shown).

FIG. 49A shows another flex cable 4910 according to an embodiment of the disclosure. Flex cable 4910 contains electrical connector tabs 4920 for connection to the lenses and electrical connector 4930 for connection to an electronic control module. FIG. 49B shows an exploded view of area 4940 showing individual connector tabs 4920. FIG. 49C shows an exploded view of electrical connector 4930.

FIGS. 50A, 50B and 50C show cross sectional schematics of the sections C-C, D-D, and E-E of flex cable 4910 in FIG. 49A. In one embodiment, flex cable 4910 comprises a polyimide (PI) substrate 5010, a conductor 5020, and a polyimide cover 5040. Through holes 5030 covered with conductor 5020 are also patterned on the flex cable. Conductor 5020 may be deposited or electroplated onto the polyimide material as previously described.

FIGS. 51A and 51B show optical images of an eyeglass frame, according to an embodiment. Specifically, holes 5150 (filled with conductive sealant herein) are shown on a frame front 5110. Frame front 5110 supports a lens 5130 and is connected to a temple 5120 through a hinge 5140. This figure depicts an embodiment of a method used to apply conductive sealant to couple the connector tabs of a flex cable (not shown) to the electrodes of lens 5130.

FIG. 52 shows a schematic of a lens fitting cut-out 5200. Prior to edging a lens a frame with a plano dummy lens, marked with the patient's pupil center is placed on top of cut-out chart 5200 to test if the manufacturing process has been completed successfully. The marked position of pupil center is aligned with the fitting point. Area 5210 corresponds to the area of the starting lens substrate. Lines 5220 are used for measurement (in mm, in one example) of the proper position of the lens with respect to a fitting point 5230. Fiducials 5280 are used for alignment.

Tabs 5240 correspond to the initial position of the electrodes of the lens. The ellipsoid 5250 corresponds to the area of the electro-active component of the lens. The curved line 5260 as well as lines 5270 on tabs 5240 define an area within which the edged lens needs to reside if the manufacturing has been completed successfully. For example, if portion of the lens lays inside curved line 5260, the edging process was not successful.

It is to be appreciated that cut-out 5200 is an example related to lenses of certain shapes and dimensions. Using a conceptually similar approach, various other apparatuses suitable for lenses of other shapes may be devised.

Embodiments in FIGS. 1-52 describe components, devices and methods of manufacturing thereof for electronic eyeglasses, focusing on the frame, the electronic components, and the electrical connections. Embodiments describe below address the lens design and manufacturing processes thereof for electronic eyeglasses.

FIG. 53 illustrates a graph of optical power distribution and the individual contributions of the electro-active (EA) component 5310 and static intermediate power component 5320 based on the "65% rule". According to the "65% rule", static intermediate power component 5320 corresponds to 65% of the total optical power required for full near vision correction whereas EA component 5310 corresponds to the remaining 35%. This ratio enables patients to attain proper vision for distances further than the wrist position (of an extended arm) through components 5320, and adjust for closer distances through component 5310. For example, for a near-vision prescription requiring a total optical power of +2.00D (diopters), according to the "65% rule", the power of EA component 5310 may be +0.7D and the power of static intermediate component may be +1.3D.

FIG. 54 is another illustration of the "65% rule", wherein x-axis 5410 plots various total power prescriptions and y-axis 5420 plots the corresponding static intermediate power component 5320 according to the "65% rule".

It should be noted that component 5310 is dynamically turned on and off by a patient through the electronic components of electronic eyeglasses, while component 5320 is fixed (static) through the lens substrate. It should be appreciated that, based on FIG. 53, a unique EA component may be in theory required for each prescription. However, such an implementation may be cost-prohibitive. Therefore, an acceptable compromise with only a few EA components for all prescriptions would be desirable.

FIG. 55 illustrates power distribution graph 5500 according to lens designs in prior art. It may be seen in the graph that only one EA component 5310 with power of +0.75D is used for all prescriptions. The remaining optical power is adjusted by static intermediate power component 5320.

FIG. 56 shows a plot of power distribution for various prescriptions vs. the contribution from the static component.

Line 5610 is the static intermediate power component according to the design of FIG. 55, and line 5620 is the theoretical static intermediate power component 5620 from the "65% model". It may be seen that for the design of FIG. 55, there is a mismatch between the achievable static intermediate power 5610 and theoretical 5620 for all prescriptions. The margin of mismatch may be large for low and high total powers (e.g.+1.25D, +1.50D, +2.75D) and smaller for intermediate total powers (e.g. +2.00D, +2.25D).

It is to be appreciated that an optimal distribution of electro-active power requires specific EA components 5310 for each total (ADD) power. However, 2 EA components or 3 EA components better match the "65% rule". For optimal power distribution, +0.50D, +0.75D, and +1.00D EA powers may be used.

FIG. 57 illustrates an optical power distribution graph 5700, according to an embodiment of the present disclosure. According to graph 5700, there are two powers for EA component 5310, a first of +0.75 for total optical powers between +1.25D and +2.75D, and a second of +1.25D for total optical powers between +3.00D and +3.75D.

FIG. 58 shows the corresponding plots of power distribution for various prescriptions vs. the contribution from the static component, according to the embodiment of FIG. 57. As in FIG. 56, line 5810 is the static intermediate power component according to the design of FIG. 57, and line 5820 is the theoretical static intermediate power component from the "65% model". It may be seen in the graph that, by using two powers for EA component 5310 instead of one, the mismatch between achievable and theoretical power may be decreased compared to FIG. 56.

A slightly overpowered partial add progressive is preferred to ensure good intermediate vision. The static progressive design must provide clear distance and intermediate vision without activating EA component 5310. Some wearers have intermediate viewing complaints when a design similar to that of FIGS. 57 and 58 is not present in their electronic eyeglasses.

FIG. 59 illustrates an optical power distribution graph 5900, according to an embodiment of the present disclosure. According to graph 5900, there are three powers for EA component 5310, a first of +0.75D for total optical powers between +1.25D and +2.00D, a second of +1.00D for total optical powers between +2.25D and +2.75D, and a third of +1.25D for total optical powers between +3.00D and +3.75D.

FIG. 60 shows the corresponding plots of power distribution for various prescriptions vs. the contribution from the static component, according to the embodiment of FIG. 59. As in FIG. 56, line 6010 is the static intermediate power component according to the design of FIG. 59, and line 6020 is the theoretical static intermediate power component from the "65% model". It may be seen in the graph that, by using three powers for EA component 5310 instead of one, the mismatch between achievable and theoretical power may be decreased compared to FIG. 56.

FIG. 61 illustrates an optical power distribution graph 6100, according to an embodiment of the present disclosure. According to graph 6100, there are three powers for EA component 5310, a first of +0.50D for total optical powers between +1.25D and +2.00D, a second of +0.75D for total optical powers between +2.25D and +2.75D, and a third of +1.00D for total optical powers between +3.00D and +3.75D.

FIG. 62 shows the corresponding plots of power distribution for various prescriptions vs. the contribution from the static component, according to the embodiment of FIG. 61.

As in FIG. 56, line 6210 is the static intermediate power component according to the design of FIG. 61, and line 6220 is the theoretical static intermediate power component from the "65% model". It may be seen in the graph that, by using three powers for EA component 5310 instead of one, the mismatch between achievable and theoretical power may be decreased compared to FIG. 56. It may also be seen that the margins are decreased compared to the two powers of FIG. 57.

Based on the lens design of FIG. 61, a doctor may prescribe distance and near prescription and the manufacturer may automatically assign the EA power. Alternatively, a doctor may prescribe distance, near prescription and EA power for customized wearer experience. A lower power EA may be used for activities such as using a desktop computer, and a higher power EA may be used for activities such as golfing.

FIG. 63A illustrates a lens substrate 6310. FIG. 63B shows a corresponding graph of optical power vs. distance from fitting point 6330. In addition to fitting point 6330, the lens substrate includes electro-active component 6320, which extends for 12 mm, approximately 5 mm in the below fitting point 6310, and lens electrodes 6340. The graph shows a first static partial add lens (PAL) 6350, overall power progression 6370, and a second static PAL 6360. Second PAL 6360 is an alternative to first PAL 6350. Overall Power Progression 6370 is a total of add powers from first static PAL 6450 and electro-active component 6320. In the specific example illustrated, electro-active component 6320, which is illustrated but not individually graphed, has a +0.75D constant add power. It may be seen that for a +2.00D of total (ADD) power, 85% of the ADD power may be reached around 11 mm, i.e. half way down the EA component.

FIG. 64 illustrates a pie chart of a lens having an electro-active component progressive corridor usage, showing 20% short, and 80% normal.

FIGS. 65A and 65B illustrate lens substrates 6510 and the relative location of electro-active components 6520 compared to fitting points 6530, according to an embodiment. In FIG. 65A, the center of electro-active component 6520 is located 11 mm below fitting point 6530. This configuration, as shown in FIG. 65A, may yield 85% of the total (ADD) power. FIG. 65B shows a configuration where EA component 6520 has been moved up by 2 mm. In this case, at 9 mm the total ADD power may not be achieved. The static PAL power needs to be bumped up to compensate for the shift, which may be increase unwanted astigmatism and narrows the viewing channel.

In one embodiment, there may be two lens designs. A first design may utilize the 11 mm corridor design. A second design may use a 9 mm corridor design, which may be more suitable for newer, shallower frames. A 9 mm corridor has no impact on the semi-finished blank (SFB) substrate inventory, and it may enable prescription software addition to use this design that has less visible edges. An ordering process for such a lens design may be simple. A physician may select the frame from an available display and measure segment height (SH), fitting height and pupillary distance (PD) before completing the order. Then, a software, such as Eagle software, may automatically choose optimal APL design based upon frame size, SH, fitting height and PD.

The goal of the new optics and SFB design is to reduce image jump at the peripheral edge of the EA segment, improve visual comfort, increase width of visual field, improve vision at intermediate viewing distances, reduce absolute minimum fitting height to enable the use of smaller, more fashionable frames (especially for women), and increase allowable fittings over a wide range of frame styles.

FIG. 66 shows a two-dimensional map of optical power for an electronic lens, according to an embodiment. Here, as an example, an EA segment with power of +0.75D is used. The lens also includes a +4.0D contribution for a base curve. It can be seen that the optical power may increase from +4.25D at the top of the electro-active component to +4.75D at about 2 mm from the bottom of the electro-active component. The optical power progression along the y-axis works with the partial add progressive to achieve the on-state, near vision correction. The bi-aspheric power progression allows to reduce magnitude of the on-state power discontinuity along the peripheral edge of the EA segment.

FIG. 67 shows an example of a prior art cut-out chart of a lens substrate 6710 that is used for evaluating fitting prior to the manufacturing process. Area 6720 corresponds to the electro-active component, connectors 6730 correspond to the lens electrodes, fiducials 6760 are used as alignment marks, along with fitting point 6770. The area defined by curved line 6750 and electrode lines 6740 outlines the area within the edged lens should be contained, as previously described.

According to this example, it may be seen that electrodes 6730 were originally located along the temporal edges. Having signal and ground electrical connections split across the rim-lock location restricts the allowable fittings. According to various embodiments of the present disclosure, with the availability of a flex cable wiring harness, the rim-lock restriction may be lifted and both contacts may be along the top edge of the lens.

FIG. 68 shows a lens substrate cut-out according to an embodiment of the present disclosure. According to this embodiment, electrodes 6830 are located along a top edge of the lens substrate and may form an angle between 10° and 60° with each other. In one embodiment, electrodes 6830 may be parallel to each other and vertically oriented (not shown in this figure).

EA component 6820 is an elliptical segment with dimensions of approximately 12 mm by 20 mm, and it may be located approximately 3 mm to 5 mm below fitting point 6870. According to this design, the hinge mid-point restriction has been eliminated. Electrodes 5830 begin approximately 8 to 15 mm on either side of fitting point 6870, with a preferable range of 11 to 13 mm. A minimum electrode length restriction (5 mm shown here, but it may be longer) also ensures sufficient distance from the vision region.

FIG. 69 shows the various layers of an electronic lens 6900, according to an embodiment. Lens 6900 is composed of two substrates bonded together, a diffractive substrate 6902 and a lid substrate 6928. In between, various layers, as well as the electro-active materials are applied, as discussed below.

Diffractive substrate 6902 has periodic grooved structures (circled, dotted component) which facilitate alignment of the liquid crystal electro-active material as well as better manipulation of the incoming light. In one embodiment, on top diffractive substrate 6902, several layers may be applied by means of deposition, spin coating, dispensing, ink-jet printing, or other techniques. First, a conductive polymer electrode 6904 may be coated (spin, spray, ink-jet, or other coating method) to form the first lens electrode. In one example, this may be an AGFA S305+ conductive polymer, with a nominal thickness of approximately 125 nm. Then, transparent conductor 6906 may be sputter deposited. In one example, this may be ITO with a nominal thickness of 20 nm. Deposition of transparent conductor 6906 is followed by deposition of insulator 6908. In one example, this may be $SiO_2$ with a nominal thickness of 140 nm. Then, a primer 6910 may be applied by spin coating. In one example, this may be a 0.5% wt silane primer with a nominal thickness of 10 nm. Finally, alignment layer 6914 (Rolic ROP 103/2CP) may be spin-coated to a nominal thicknesses of 25 nm and cured via UV exposure.

On top of lid substrate 6928, various layers are deposited. Similarly, a layer of conductive polymer electrode 6926 may be coated (spin, spray, ink-jet or other coating method) to form the second lens electrode. Conductive polymer electrode 6926 may have a similar composition and thickness to conductive polymer electrode 6904. This may be followed by sputter deposition of transparent conductor 6924 and insulator 6922, which may also have similar composition and thickness to transparent conductor 6906 and insulator 6908, respectively. This may be followed by a silane primer 6920 and may be spin coated with a similar thickness and composition to primer 6910. Finally, alignment layer 6918 (Rolic ROP 103/2CP) may be spin-coated to a nominal thicknesses of 25 nm and cured via UV exposure. Once both substrates have received all their coatings adhesive and electro-active material may be applied. Electro-active material 6916 (for example, DIC RDP-A3268CH1 cholesteric liquid crystal) may be applied by ink-jet printing over the diffractive structure to generate a thickness up to 3.3 μm once the SFB has been assembled. Lastly, a layer of a custom formulated high refractive index adhesive 6912 (matched to the refractive index of the diffractive substrate 6902), may be precision dispensed and patterned on top of the primer. The amount of adhesive dispensed is optimized to produce an SFB without voids or bubbles in a cured film with a nominal thickness of 10 μm.

FIG. 70 illustrates a process flow 7000 for the manufacturing of a SFB substrate. Merely for illustrative purposes, elements from FIG. 69 may be used as a reference to describe process 7000.

In step 7002, the starting substrates are cast. This may for example be substrates 6902 and 6928 of FIG. 69. In step 7004, the lids are coated with an anti-scratch material. Steps 7002 and 7004 may be performed by the substrate manufacturer.

In step 7006, the substrates are cribbed for the assembly process. This process is a "dirty" process and may be performed in a space that does not require a clean manufacturing environment.

In step 7008, a washing step begins a series of remaining steps that are performed in a clean, contaminant-free environment such as a class-10,000 or a class 1,000 and below clean-room facility. In step 7010, conductive polymer electrodes 6904 and 6926 are spray coated onto the substrates. In step 7012, transparent conductors (ITO) 6906 and 6924 and insulators ($SiO_2$) 6908 and 6922 are sputter deposited. In step 7014, transparent ITO conductors 6906 and 6924 are patterned onto the substrates using laser trimming.

In step 7016, primers 6910 and 6920 are spin-coated and heat-cured onto the substrates. In step 7018, a mask is applied (for example, a self-adhesive polymer film) onto the substrates and alignment layers 6914 and 6918 are spin-coated. In step 7020, the alignment layers are cured via UV light exposure.

In step 7022, electro-active, liquid crystal material 6916 is ink-jet printed. In step 7024, adhesive is dispensed onto both substrates, and in step 7026, the substrates are assembled together under vacuum and the assembly is UV-cured to strengthen the bond.

Figure 71B:
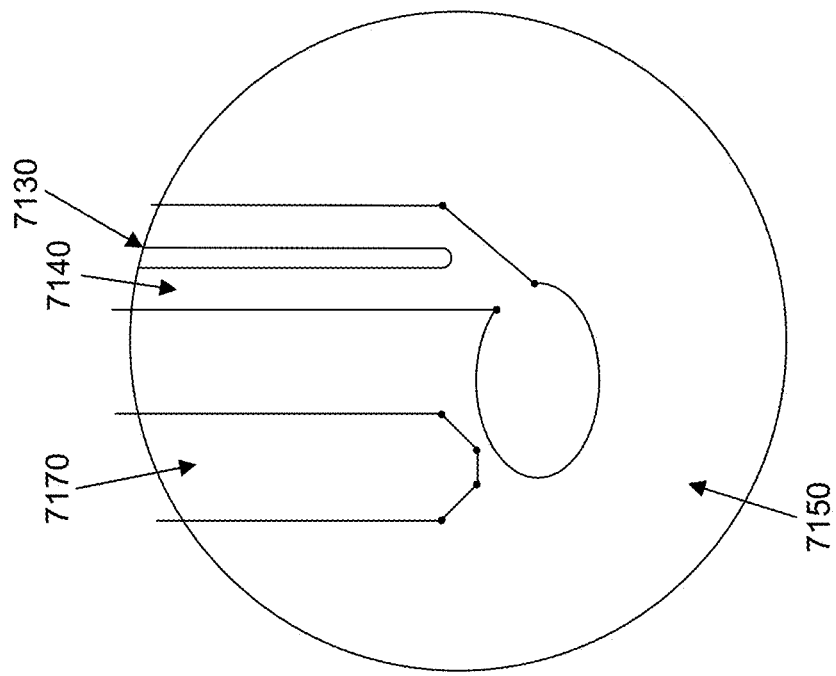
Figure 71A:
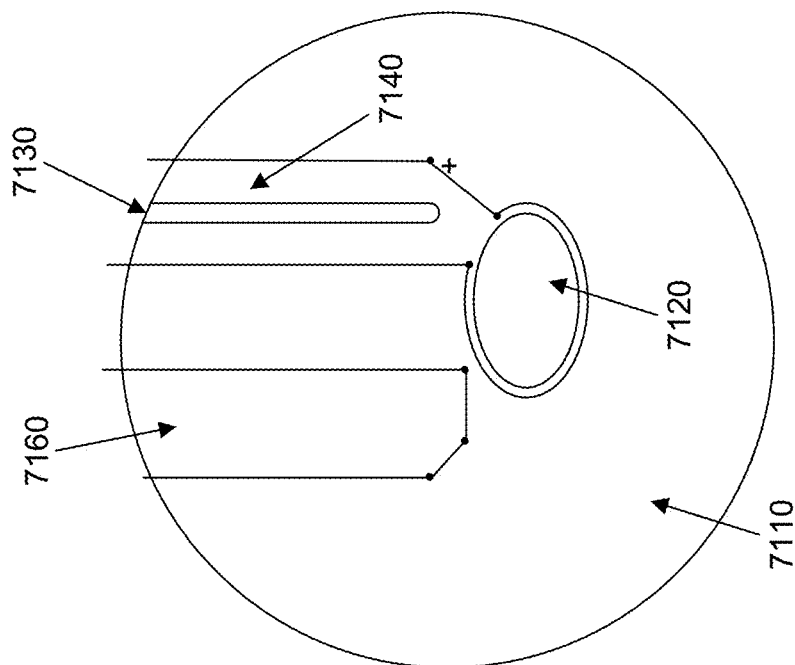

FIGS. 71A-D show, in part, steps of the manufacturing process. FIGS. 71A and 71B show the ITO laser trimming process. Substrate 7110 is the diffractive substrate and substrate 7150 is the lid substrate. The electro-active region 7120 is also shown on diffractive substrate 7110. To avoid electrical shorts between electrical contacts 7130, areas 7140, 7160, and 7170 are laser trimmed to remove ITO from substrates 7110 and 7150. In the final assembly, lid substrate 7150 for example, would be mirrored along the vertical direction and aligned and assembled on top of diffractive substrate 7110.

Figure 71C:
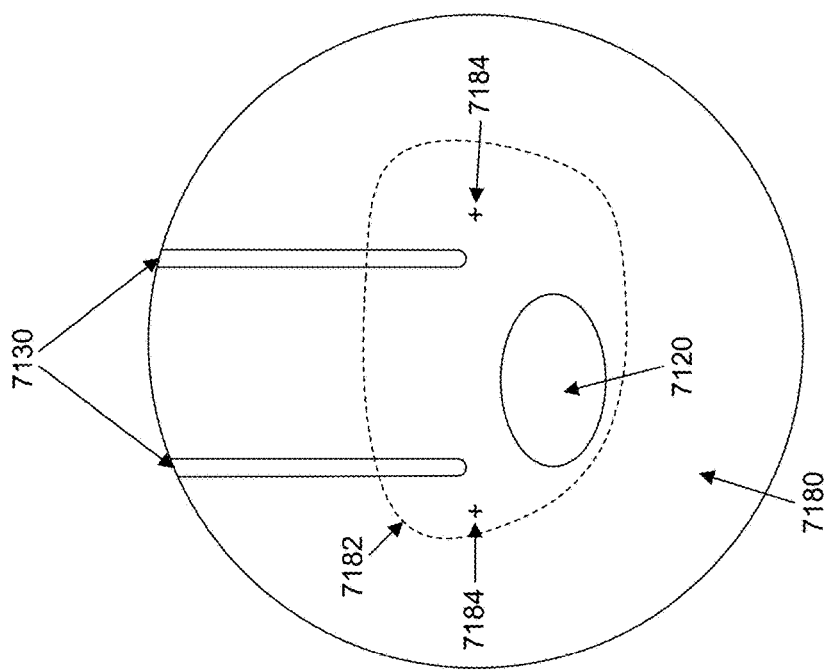
Figure 71D:
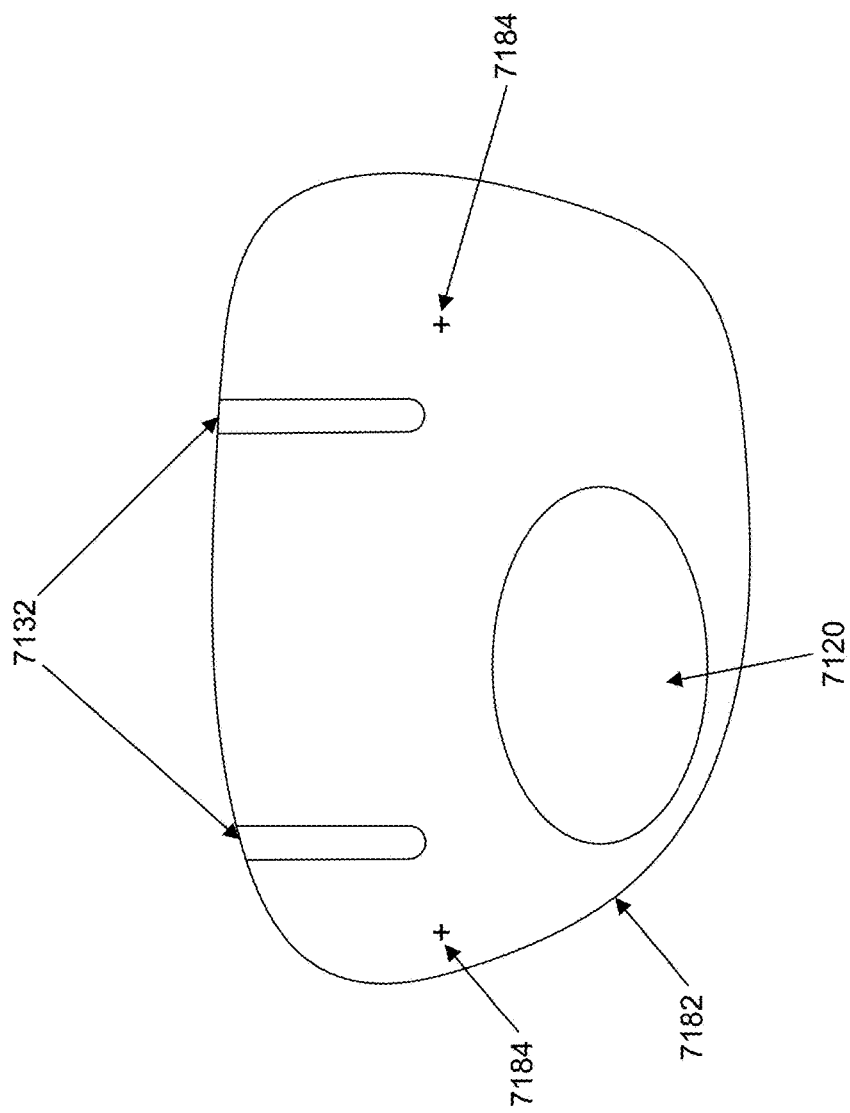

FIG. 71C shows an assembled lens 7180 before edging, along with alignment fiducials 7184 and lens outline 7182 (dotted line). The final lens is edged based on lens outline 7182. FIG. 71D shows the final lens product after edging.

FIG. 72 illustrates a front view of eyeglasses 7210, wherein the allowable fittings 7222 of the right lens 7220 represents a prior art design according to the cut-out chart shown in FIG. 67. The allowable fittings 7232 of left lens 7230 represents a lens design according to embodiments of the present disclosure as depicted in FIG. 68. Pupilary distances (PD) between 28 mm and 38 mm, as shown in the figure, include at least 90% of the population. In prior art, the frame allowed essentially only one or two fittings as indicated by region 7222. According to embodiments described herein, the frame may allow fittings over the entire range of PD values with very little dependence of the fitting height on the PD as indicated by region 7232.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the, hardware, methods and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. An electronic eyewear, comprising:
a temple;
an electronic lens;
a first electronic module and a second electronic module disposed in the temple;
a tube made of heat resistant materials and disposed in the temple; and
an electrical conductor inserted into the tube, wherein the electronic lens and the first electronic module are electrically connected to each other, and wherein the first electronic module is electrically connected to the second electronic module by the electrical conductor.

2. The electronic eyewear of claim 1, wherein the tube is over-molded inside the temple.

3. The electronic eyewear of claim 1, wherein the tube is made of metal.

4. The electronic eyewear of claim 1, wherein the first electronic module is an electronic control module, and the second electronic module is a power source.

5. The electronic eyewear of claim 4, wherein the electronic control module is powered by the power source.

6. The electronic eyewear of claim 4, wherein the power source is detachable from the temple.

7. The electronic eyewear of claim 1, further comprising:
a first metal box;
a second metal box;
wherein the tube has a first and a second end, and
wherein the first metal box is connected to the first end of the tube; and
the second metal box is connected to the second end of the tube.

8. The electronic eyewear of claim 7, wherein
the first metal box is welded on the first end of the tube, and
the second metal box is welded on the second end of the tube.

9. The electronic eyewear of claim 7, further comprising:
a first metal contact attached to the first metal box and electrically connected to the first electronic module; and
a second metal contact attached to the second metal box and electrically connected to the second electronic module.

10. The electronic eyewear of claim 1, wherein the electrical conductor is connected to the metal contact.

11. The electronic eyewear of claim 1, further comprising a lens with an electrode, and wherein an electronic signal from the first electronic module is provided to the electrode of the lens.

12. The electronic eyewear of claim 1, wherein the eyewear is a pair of spectacles.

13. The electronic eyewear of claim 1, wherein the electrical conductor comprises an electrically conductive wire embedded in an insulating material.

14. The electronic eyewear of claim 13, wherein the electrical conductor is a flexible cable, and wherein the flexible cable comprises:
a first insulative layer;
a second insulative layer; and
at least two separate conductive paths disposed between the insulative layers.

15. The electronic eyewear of claim 13, wherein the first and second insulative layers are made of poly(4,4'-oxydiphenylene-pyromellitimide).

16. The electronic eyewear of claim 1, wherein the first electronic module is separated from the second electronic module.

17. The electronic eyewear of claim 1, wherein:
the temple has a first and a second end;
the first electronic module is disposed at the first end of the temple; and
the second electronic module is disposed at the second end of the temple.

18. A temple of an eyewear having an electronic lens, the temple of eyewear comprising:
a tube made of heat resistant materials configured to enclose a conductive wire; and
a metal box connected to an end of the tube, wherein the tube and metal box are over-molded in the temple.

19. A temple of an eyewear having an electronic lens, the temple of eyewear comprising:
a tube made of heat resistant materials configured to enclose a conductive wire; and
an electronic contact provided at each end of the tube for connecting to an
electronic module, wherein the electronic module is electrically connected to the electronic lens, and
wherein at least the tube is over-molded in the temple.

* * * * *